United States Patent
Enomoto

(10) Patent No.: US 7,047,557 B2
(45) Date of Patent: May 16, 2006

(54) SECURITY SYSTEM IN A SERVICE PROVISION SYSTEM

(75) Inventor: Hajime Enomoto, Funabashi (JP)

(73) Assignee: Fujitsu Limited, Kawasaki (JP)

( * ) Notice: Subject to any disclaimer, the term of this patent is extended or adjusted under 35 U.S.C. 154(b) by 1018 days.

(21) Appl. No.: 09/961,320

(22) Filed: Sep. 25, 2001

(65) Prior Publication Data

US 2002/0144106 A1    Oct. 3, 2002

(30) Foreign Application Priority Data

Mar. 27, 2001  (JP) .............................. 2001-089207

(51) Int. Cl.
*H04L 9/00*      (2006.01)
*G06F 17/00*     (2006.01)

(52) U.S. Cl. ........................... 726/1; 726/3; 707/103 X

(58) Field of Classification Search ..................... None
See application file for complete search history.

(56) References Cited

U.S. PATENT DOCUMENTS

| | | | | |
|---|---|---|---|---|
| 5,797,128 A | * | 8/1998 | Birnbaum ........................ 707/5 |
| 5,895,459 A | * | 4/1999 | Enomoto ....................... 706/10 |
| 6,138,238 A | * | 10/2000 | Scheifler et al. ............. 713/200 |
| 6,738,908 B1 | * | 5/2004 | Bonn et al. ................... 713/201 |
| 6,745,168 B1 | * | 6/2004 | Enomoto ....................... 706/11 |
| 2002/0019889 A1 | * | 2/2002 | Enomoto ..................... 709/332 |
| 2003/0200262 A1 | * | 10/2003 | Enomoto ..................... 709/205 |
| 2004/0111468 A1 | * | 6/2004 | Enomoto ..................... 709/203 |
| 2005/0210281 A1 | * | 9/2005 | Enomoto ..................... 713/200 |

FOREIGN PATENT DOCUMENTS

| | | |
|---|---|---|
| JP | A-5-233690 | 9/1993 |
| JP | A-7-295929 | 11/1995 |
| JP | A-9-297684 | 11/1997 |

\* cited by examiner

*Primary Examiner*—Christopher Revak
(74) *Attorney, Agent, or Firm*—Staas & Halsey LLP

(57) ABSTRACT

It is an objective of the present invention to integrate the architectures for security of a variety of systems for providing a variety of services or to save a special object for security in an object-oriented system. To achieve this objective, in a system comprising an object network and a common platform, said object network is hierarchically composed of a data model in which the attribute structure is determined as a template, an object model, a role model and a process model in ascending order from the bottom, and comprises a matching constraint check means for ensuring the security of a system by checking matching constraints attached to a template.

14 Claims, 46 Drawing Sheets

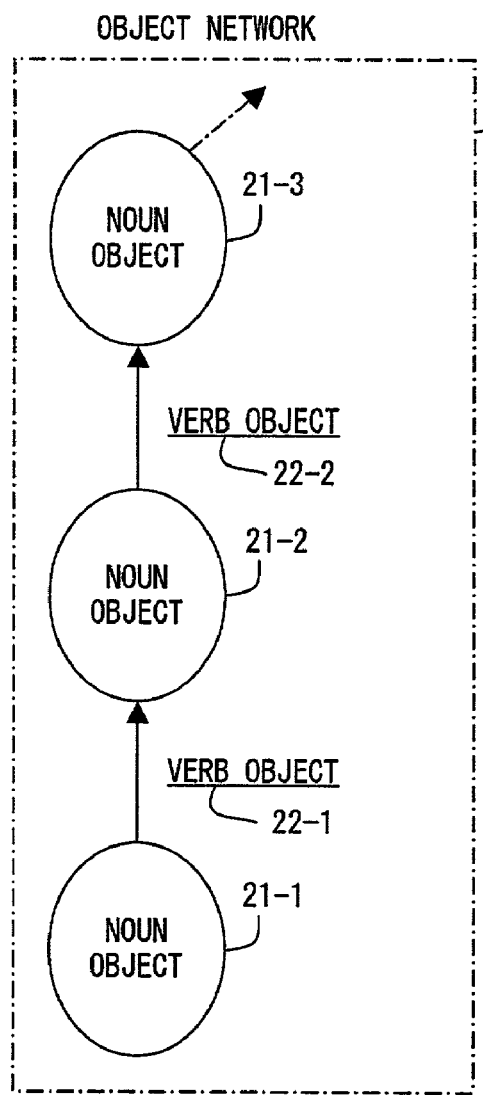
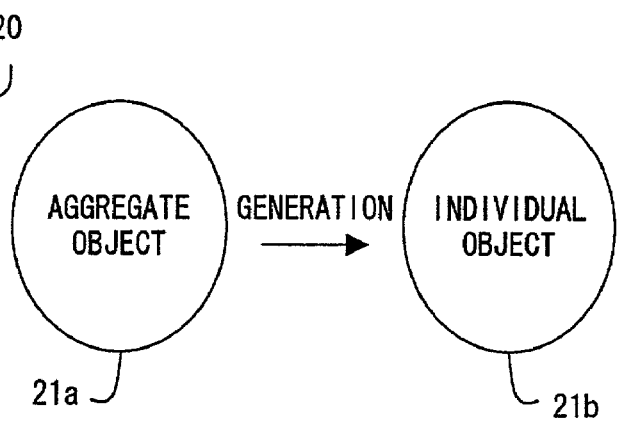
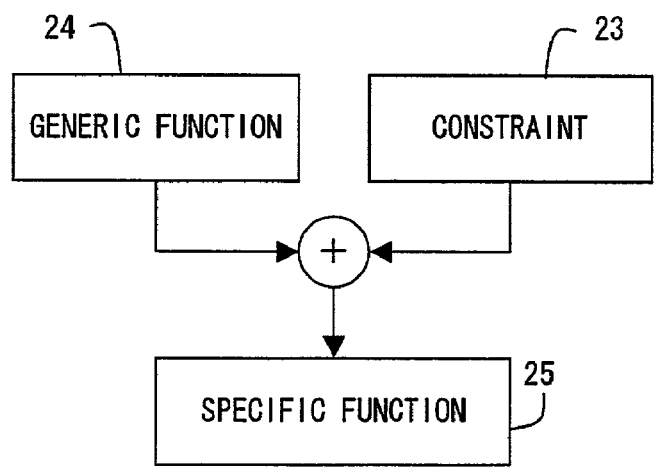
FIG. 3A
FIG. 3B
FIG. 3C

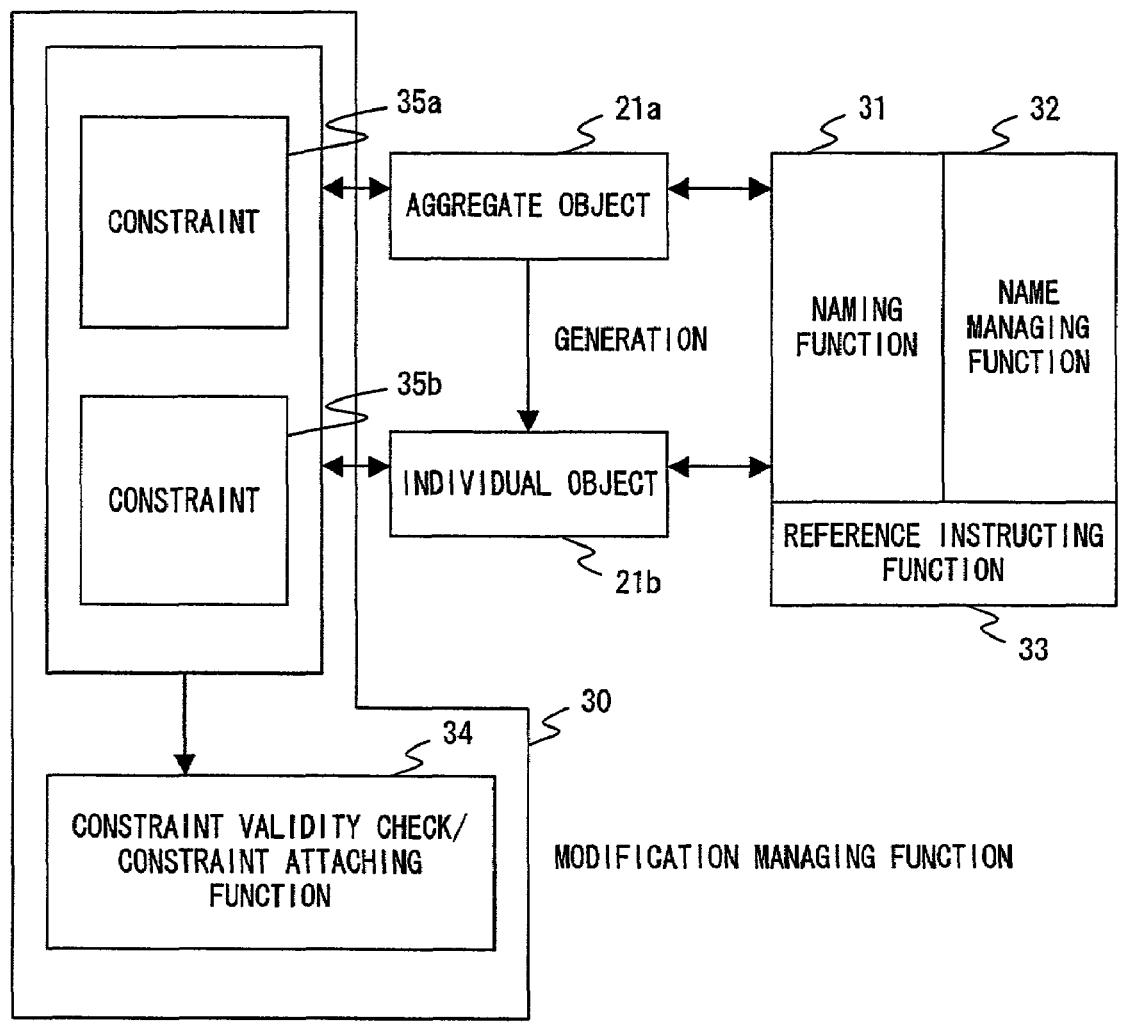
F I G. 5

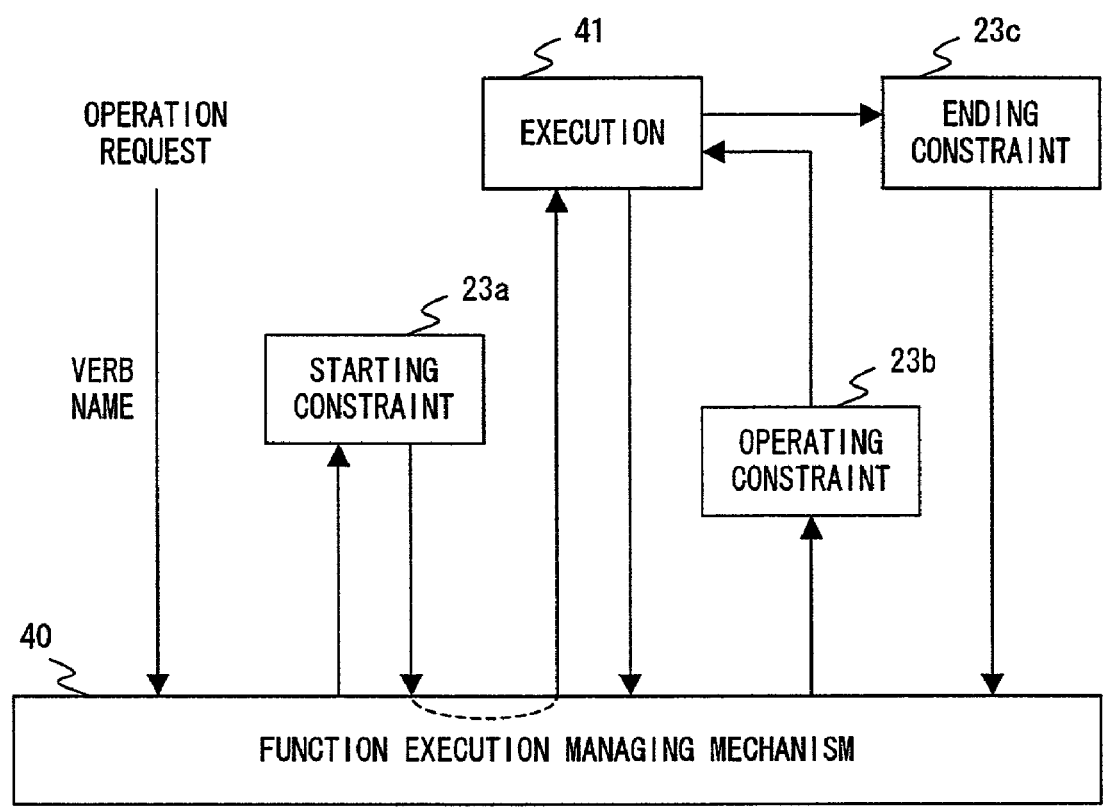
F I G. 6

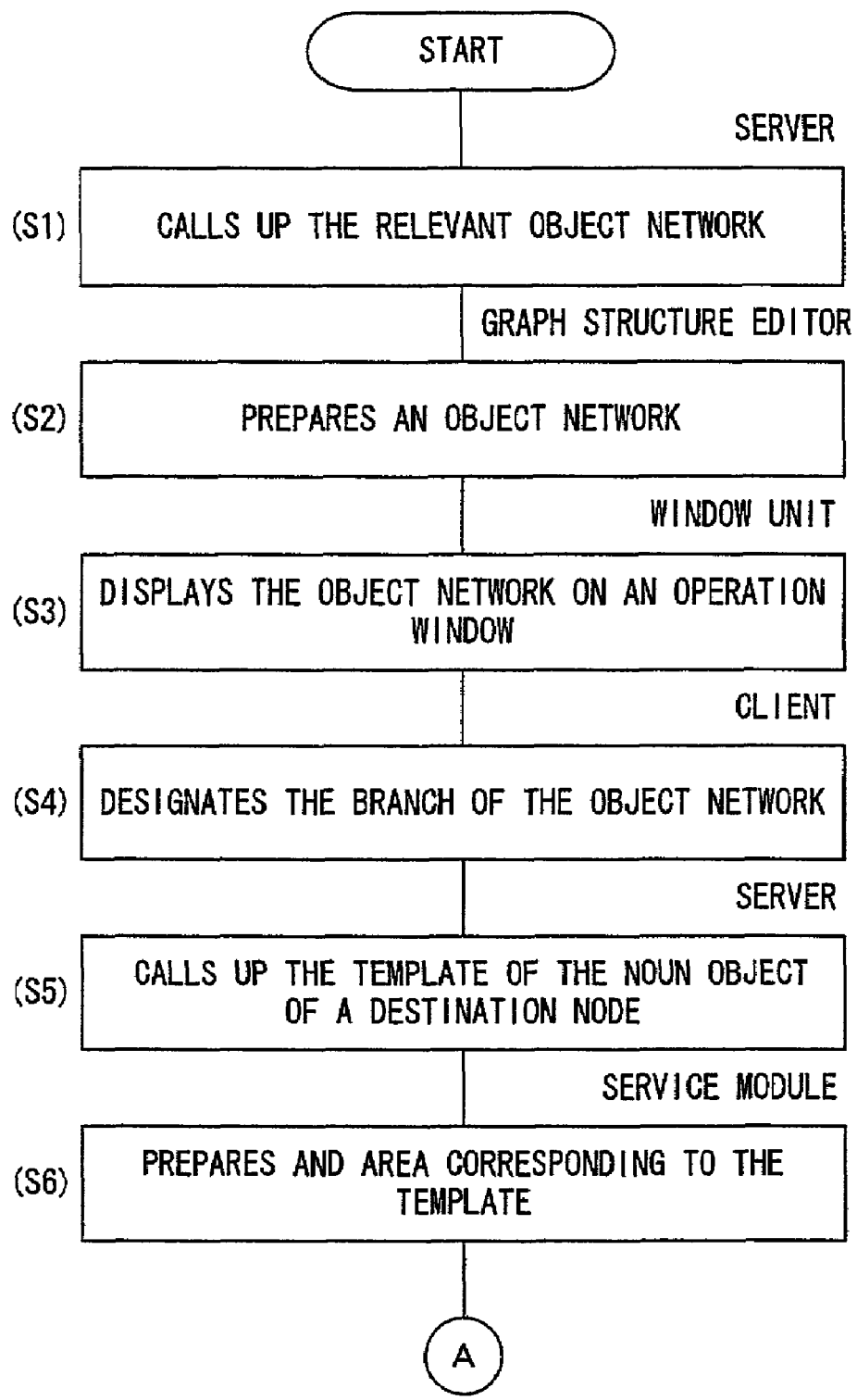
F I G. 9

| index | X | Y | attributes for Point(X, Y) |
|---|---|---|---|

F I G. 1 2

TEMPLATE FOR MAJOR POINT NO. 1

| INDEX | X | Y | LUMINANCE | CHROMINANCE VECTOR | POIN-TER |
|---|---|---|---|---|---|

TEMPLATE FOR MAJOR POINT NO. 2

| INDEX | X | Y | LUMINANCE | CHROMINANCE VECTOR | POIN-TER |
|---|---|---|---|---|---|

TEMPLATE FOR MAJOR POINT NO. 3

| INDEX | X | Y | LUMINANCE | CHROMINANCE VECTOR | POIN-TER |
|---|---|---|---|---|---|

TEMPLATE FOR MAJOR POINT NO. n

| INDEX | X | Y | LUMINANCE | CHROMINANCE VECTOR | POIN-TER |
|---|---|---|---|---|---|

F I G. 1 3

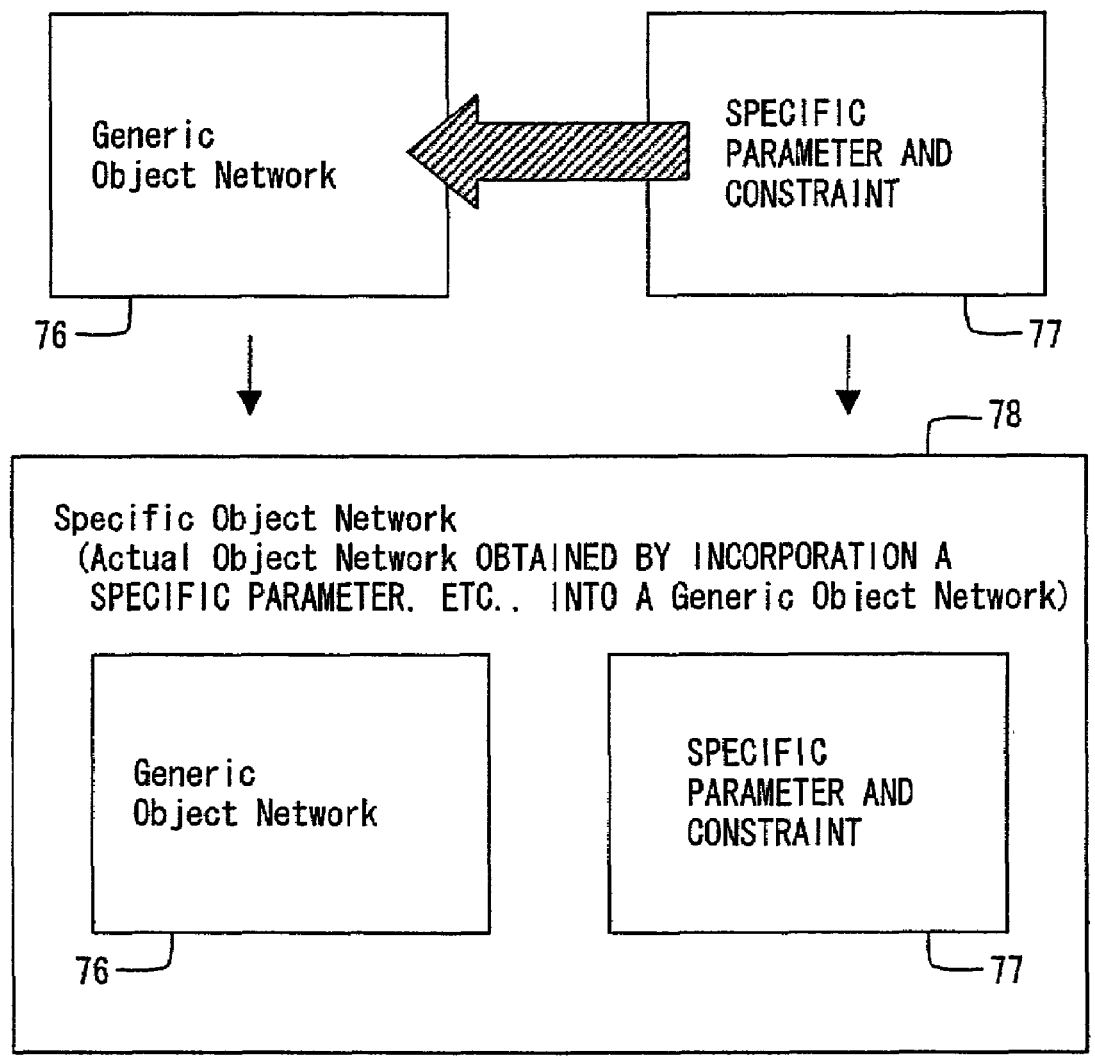
F I G. 1 4

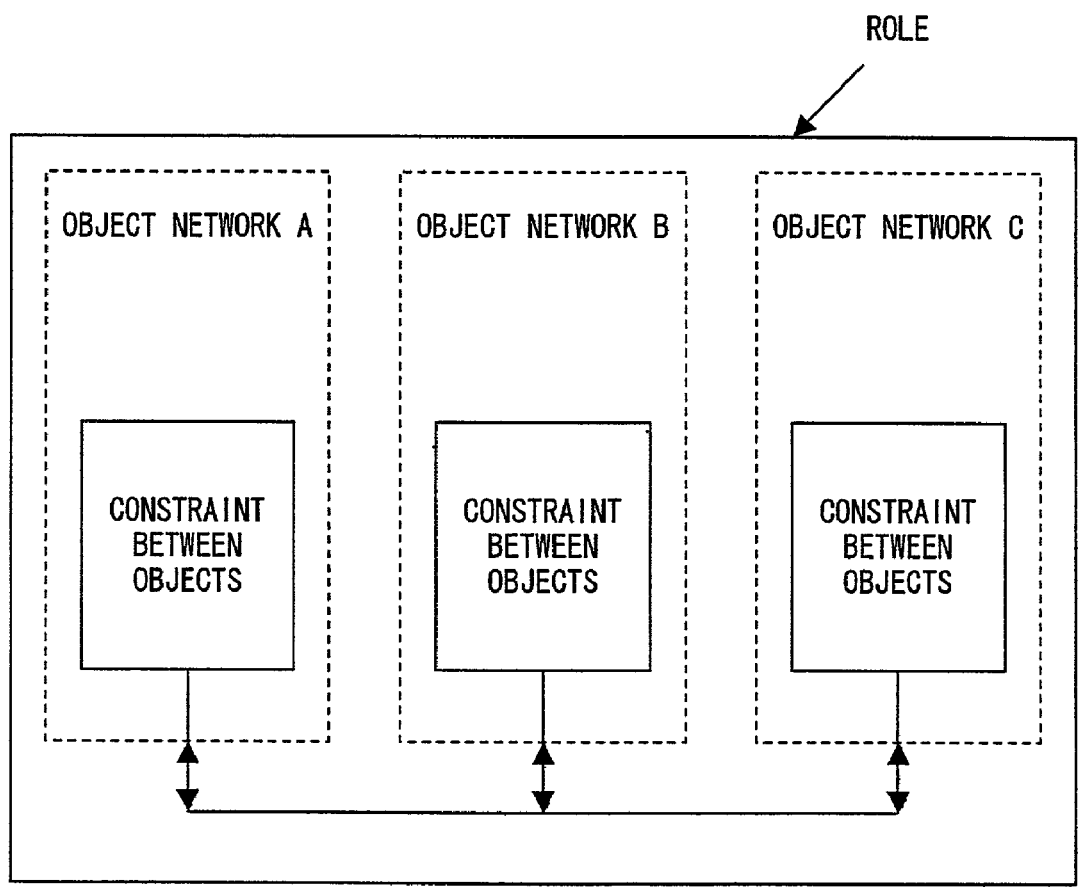
F I G. 1 7

| |
|---|
| TARGET AREA<br>ATTRIBUTE STRUCTURE OF<br>TARGET AREA |
| NATURE STRUCTURE OF<br>INTENSION<br>OPERABILITY STRUCTURE OF<br>INTENSION<br>INTENSION GOAL |
| SUPPORTING STRUCTURE FOR<br>ENVIRONMENT<br>SPECIFICATION OF<br>RECOGNITION FUNCTION |
| CONSTRAINT OF OPERATION<br>OPERATION CONSTRAINT FOR<br>GOAL ACHIEVEMENT |
| SPECIFICATION ON USER<br>OPERATION<br>CONVERSION FROM GENERIC<br>NESS TO EMBODIMENT |

TARGET AREA: RESTRICTS A RELATIONSHIP WITH
A PERSON CONCERNED.
(ACCESS RIGHT) → DESCRIBES THE
ATTRIBUTE STRUCTURE
OF A TARGET.

INTENSION: INTENSION DEFINITION PREPARING PROCESS
FOR AN INTENSION ACCOMPLISHMENT
SUPPORTING FUNCTION
(TEMPLATE SETTING)

SUPPORT: FEATURE STRUCTURE OF ENVIRONMENT DATA

STRATEGY/TACTICS: DESCRIBES OPERABILITY

FIG. 34

SECURITY SYSTEM IN A SERVICE PROVISION SYSTEM

BACKGROUND OF THE INVENTION

1. Field of the Invention

The present invention relates to a security technology in a system and in particular, relates to a security system in a service provision system for checking, for example, matching constraint attached to the template of a data model for an object and ensuring the security of a system in a service provision system that comprises an object network as a language process function and a common platform as an interface function between the network and a client and has a hierarchical structure in which an object network is composed of a data model, an object model, a role model and a process model.

2. Description of the Related Art

As comprehensive network systems, including the Internet, have been widely used, it has become necessary to provide a network system with a security system for ensuring the security of the entire services provided by the network system, including access authorization in using a network, authorization in giving/receiving services, prevention of data from being stolen and the like.

There is a tendency that a security system is classified by the types of services and is increasingly diversified. In a so-called e-business, a variety of types of services, such as a direct mail service, a transportation settlement service, agency service, a special function provision service, an organization service of a variety of communications services, such as a gate way, a system operation service, a diagnosis service, a security service and the like, are provided, and correlation between the services has increased.

For example, as a system for realizing a client's request, that is, providing a service intentionally requested by a client, there is a WELL system using a functional language abbreviated as WELL (window-based elaboration language). This WELL system is not limited to a specific service field, and in this WELL system, using object networks corresponding to respective service fields can provide services in a variety of fields.

An object network can be obtained by modeling both data and a variety of operations against data. The WELL system comprises a common platform as an interface with a variety of windows for a user providing instructions and data to this object network and displaying the provision result of the system and the like. Such object network, common platform and WELL system are disclosed in the following references.

Japanese Patent Laid-open No. 5-233690: Language Processing System using an Object Network Japanese Patent Laid-open No. 7-295929: Interactive Information Processing Device using a Common Platform Function Japanese Patent Laid-open No. 9-297684: Information Processing Device using an Object Network As described above, for example, an exclusive security system is necessary for a network system, and a security system has a tendency to be increasingly diversified as the number of service types increases. Therefore, it is difficult to unify the architecture of security systems for providing a variety of services, which is a problem.

Generally, in a system using an object-oriented language, an object for checking security must be provided separately from an object for providing a basic service in order to ensure the security, which is also a problem.

SUMMARY OF THE INVENTION

It is an object of the present invention to unify the architecture for ensuring the security of a variety of systems that provide a variety of services and to ensure the security by inputting conditions for security as the matching constraint of all objects to be transmitted, without a special object for security check in a service provision system by using an object-oriented language.

The service provision system of the present invention comprises a common platform as an interface function with a client and an object network for providing a service intentionally requested by a client. The service provision system has a hierarchical structure and further comprises a matching security constraint check unit.

In the first aspect of the present invention, the hierarchical structure of the object network is composed of a data model in which the attribute structure is determined as a template, an object model that is positioned higher in rank than the data model and has matching security constraints, a role model that is positioned higher in rank than the object model and expresses the content of a process to be performed in an environment as an aggregate of a plurality of object models and a process model that is positioned highest in rank and defines a dynamic process cooperatively performed by a plurality of role models as one process. The matching security constraint checking means ensures the security of the system by judging the matching constraints for security that are attached to the template.

BRIEF DESCRIPTION OF THE DRAWINGS

The present invention will become more apparent from the following description of the preferred embodiments, with reference to the accompanying drawings, in which:

FIGS. 3A, 3B and 3C show a general object network;

FIG. 5 shows the detailed configuration of a noun-object management mechanism;

FIG. 6 shows the provision management of a specific function corresponding to a verb-object;

FIG. 9 is a flowchart showing a data processing using an object network (No. 1);

FIG. 12 shows a template;

FIG. 13 shows a template for a line segment;

FIG. 14 shows how to generally generate a specific object network from a generic object network;

FIG. 17 shows the definition of a role function;

FIG. 34 shows the definition structure of intention;

DESCRIPTION OF THE PREFERRED EMBODIMENTS

The preferred embodiments of the present invention are described in detail below with reference to the drawings.

Figure 1:
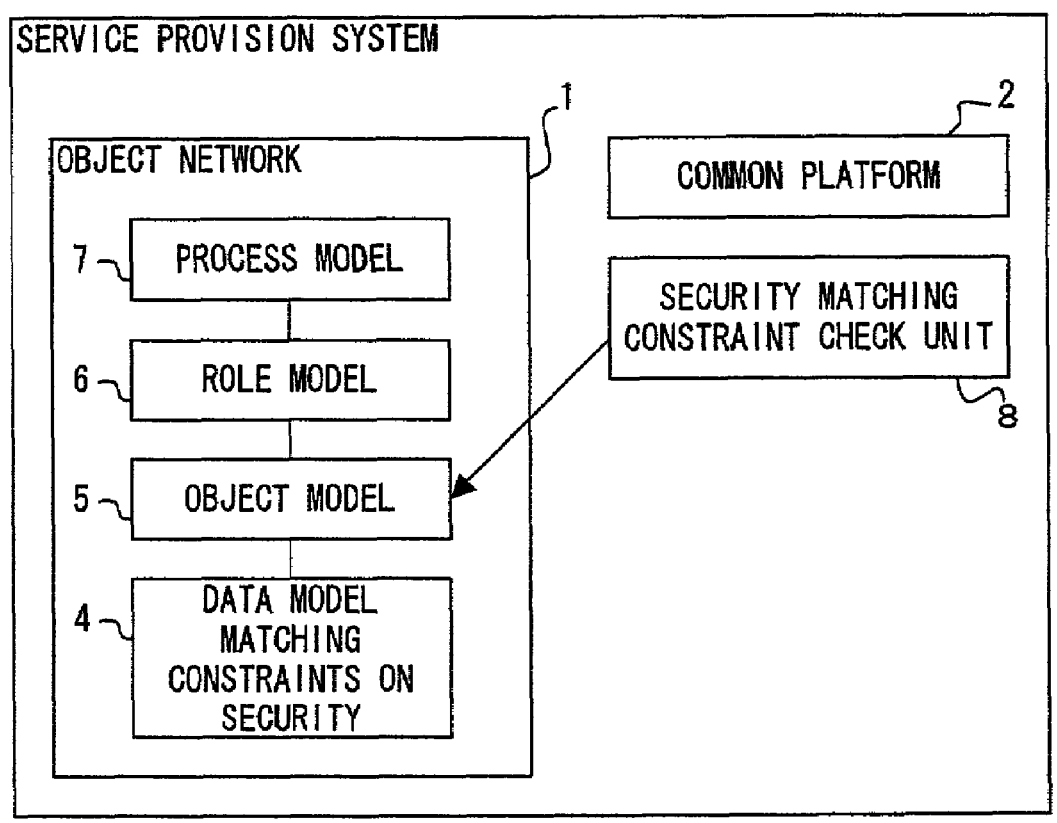
FIG. 1 shows the basic configuration of the present invention.

FIG. 1 shows the basic configuration of the present invention. FIG. 1 comprises an object network 1 as a language processing function and a common platform 2 as an interface function between clients, and shows the basic configuration of a security system in a service provision system for providing a service intentionally requested by a client.

In FIG. 1, the object network 1 has a hierarchical structure composed of four models. A data dele 4 is positioned the lowest in this hierarchical structure. The attribute structure of the data model 4 is determined as a template and the data model 4 has security matching constraint.

An object model 5 is positioned higher in rank than the data model 4. A role model 6 for expressing the contents of process to be performed in an environment as an aggregate of a plurality of object models 5 is positioned higher in rank than the object model 5, A process model 7 for defining a dynamic process cooperatively performed by a plurality of role models 6 is positioned highest in rank.

A security matching constraint check unit 8 ensures the security of a system by judging security matching constraints attached to a template.

In the preferred embodiment, the security matching constraint check unit 8 can also access a system, which does not present sufficient data to recognize the reasonable intention to request a service.

In one preferred embodiment, the communications of the system can also be implemented by a communication role function corresponding to the role model 6 and the security matching constraint check unit 8 further can comprise gate means for checking the attribute structure data of the communications medium by the security matching constraint in a role model corresponding to a communications role function.

Alternatively, in the provision process of a service intentionally requested by a client, the security matching constraint check unit 8 can also check an access right to the system of a person concerned that is related to the intention.

In one preferred embodiment, the object model 5 can also comprise a format model for expressing both the pattern of a noun object and a verb object in the form of formats, a feature model for expressing the features based on the attribute value of an object and to which constraints are attached depending an environment and an object network model with a graphic structure having the name of a verb object as a branch. By further comprising a cell, in which security matching constraints for indicating the relationship between the format and feature models in the system are described in a template corresponding to both the format and feature models, security matching constraints can also be checked and the security of the system is ensured.

One preferred embodiment can also further comprise a sentence structure analyzing means for conducting the sentence structure analysis of an object, displaying the sentence structure on the common platform 2 as a result of the analysis and improving a client's visibility in order to sustain the security of the system. Alternatively, one preferred embodiment can further comprise integration processing means for improving the efficiency of an entire system process using the matching constraint attached to a template when a process is cooperatively performed by a plurality of role models.

In one preferred embodiment, by further comprising conflicting operation modeling means for modeling a conflicting-operation model that has a possibility of providing a person concerned that receives the service of a system with a malicious service as a result, as a matching constraint, the security matching constraint check unit 8 can also check such a conflicting operation using the model. In this case, the conflicting operation modeling means can also describe a security matching constraint using the relationship between a specific language and a specific operation.

Furthermore, in one preferred embodiment of the present invention, a service provision system can also use an waterwork pattern and the security matching constraint check unit 8 can also identify a target pattern using a security matching constraint, including the location relation between an original pattern in which an waterwork is embedded and an waterwork pattern.

As described above, according to the present invention, for example, in a service provision system implemented as a WELL system, an object in an object network can have a hierarchical structure with four models positioned from lower to higher in rank: a data model in which the attribute structure is determined as a template, an object model, a role model for expressing the process content to be performed in an environment as an aggregate of a plurality of object models and a process model for defining a dynamic process cooperatively performed by role models as one process, and can ensure the security of the system by judging security matching constraints attached to a template.

A security method in a service provision system is described below using as an example an extensible WELL system (EWELL) that uses both an object network as a language processing function and a common platform as an interface between a client and a server as key concepts.

As described earlier, such a WELL system is not limited to a specific field and services can be provided in a variety of fields. The subject matter of the present invention is to provide a uniform architecture regardless of a field in order to ensure the security of a system in such a WELL system. However, before describing this subject matter, an intention accomplishment processing system for accomplishing the intention of the person concerned of the system, such as an object network, a common platform, a client and the like, which are technical premises, is described.

Figure 2:
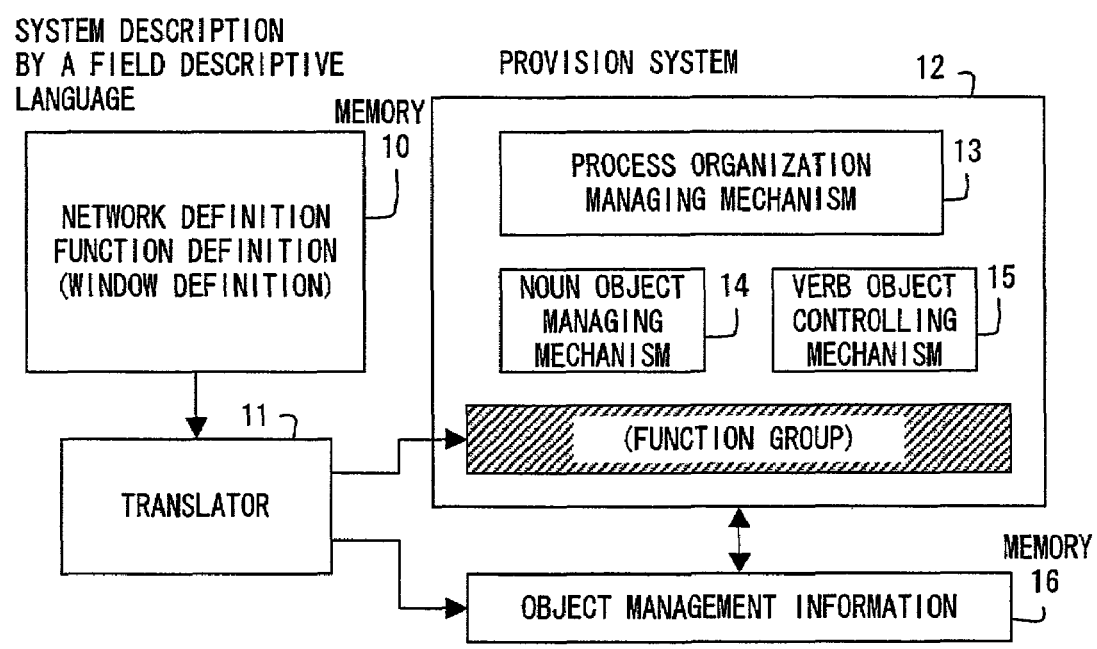
FIG. 2 shows the basic configuration of an information-processing device using an object network.

FIG. 2 shows the basic configuration of an information-processing device using an object network. The information-processing device shown in FIG. 2 comprises a memory 10 for storing a system description described in a field descriptive language, a translator 11 for receiving the input of the system description, analyzing the sentence structure and generating data for a provision system 12, a provision system 12 and a memory 16 for storing the management information of the object network out of data generated by the translator 11.

The memory 10 for storing the system description using a field descriptive language stores the definition of an object network, the definitions of necessary functions, the definitions of windows and the like. The windows are described with reference to the common platform described later.

The provision system 12 comprises a process organizing/managing mechanism 13, a noun-object managing mechanism 14 for managing noun objects of objects composing an object network and a verb-object controlling mechanism 15 with the provision control function of the verb-objects.

FIGS. 3A, 3B and 3C show a general object network. An object network is used to manage data and the operating means of the data, and the objects are largely categorized into two types: a noun object and a verb object. As shown in FIG. 3A, an object network 20 in which noun and verb objects are expressed as nodes and branches, respectively, is organized. If the content of a function corresponding to a verb-object as a branch is operated against a noun object as anode in this object network, a network is organized in which a noun object located at the tip of a branch corresponding to the verb object can be obtained as a target.

As shown in FIG. 3B, there are an aggregate object 21a corresponding to a common noun and an individual object 21b corresponding to a proper noun in the noun object 21, and the individual object 21b is generated from the aggregate object 21a.

As shown in FIG. 3C, there are two types of the verb object: a generic function 24 and a specific function 25. The specific function 25 can actually perform a provision process against a noun object when obtaining a noun object as a target. The specific function 25 can be obtained by adding a constraint 23 to a generic function 24. Conversion from this generic function 24 to a specific function 25 is controlled by the verb-object controlling mechanism 15.

Figure 4A:
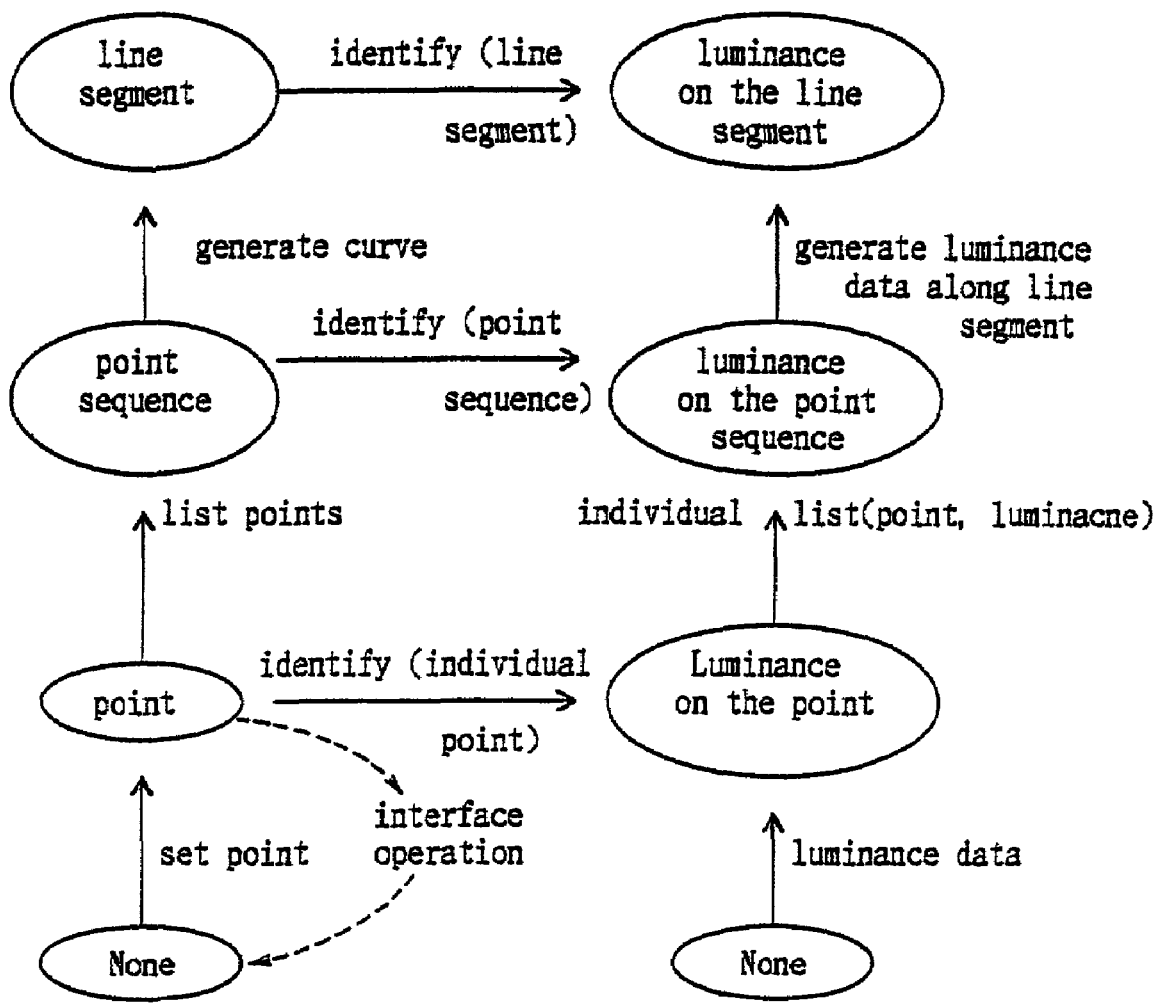
FIGS. 4A and 4B show a specific example of an object network.
Figure 4B:
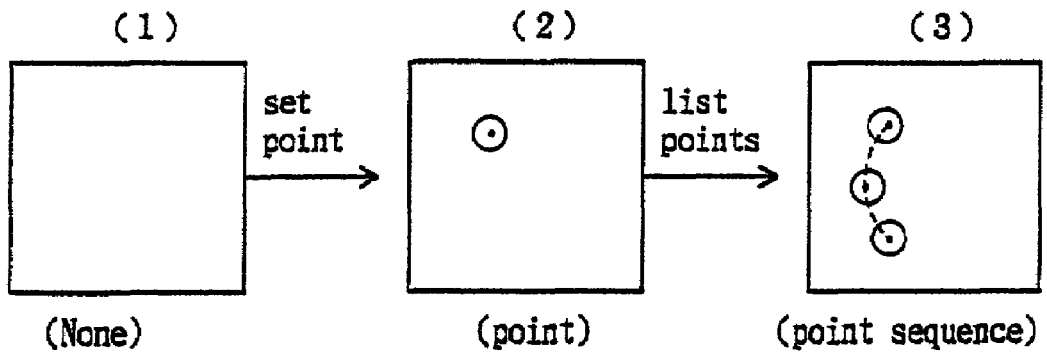

FIGS. 4A and 4B are specific examples of an object network. The system description field by a field descriptive language of this network that is stored in the memory 10 shown in FIG. 2 relates to a picture field, and this is used to plot pictures. The left and right sides of FIG. 4A are an item network and an attribute network, respectively, and these two networks composes an object network.

First, the item network at the left of FIG. 4A is described. As shown in FIG. 4B, when a picture is plotted, there is nothing (FIG. 4B(1)). If, for example, a user designates a point on a display with a mouse and the like, the operation of a verb object called a "set point" is performed and a noun point called a "point" is obtained. For example, a plurality of points corresponding to this set point are plotted by an interface operation with a user, and by performing the operation of a verb object, to "list point" against the points, a noun object called a "point sequence" shown in FIG. 4B(3) is obtained. Furthermore, by operating a verb object, to "generate curve" against this noun object, a line segment, for example, a noun object corresponding to a line segment, is obtained.

The attribute network at the right of FIG. 4A is used to conduct coloring in conjunction with the item network at the left when a picture is plotted. A corresponding noun object in the item network identifies each noun object in the network. In the attribute network, by the operation of the verb object to brighten data, the noun object on a luminance on the point for designating the luminance of each point is obtained from a state that there is nothing. Furthermore, by a list of points called an "individual list" and the operation of an object for designating the luminance of the points, a noun object called a "luminance on the point sequence" is obtained. Furthermore, by operating a verb object, to "generate luminance data along line segment", a noun object called a "luminance on the line segment" is obtained. Based on the luminance on the line segment, a color picture is finally obtained.

FIG. 5 shows the detailed configuration of the noun-object managing mechanism 14 shown in FIG. 2. The noun object managing mechanism 14 comprises a modification managing function 30, a naming function 31, a name managing function 32 and a reference designating function 33. The noun object managing mechanism 14 manages aggregate objects 21a and individual objects 21b.

The modification managing function 30 is provided with both the respective constraints for each of the aggregate objects 21a and individual objects 21b, such as constraints 35a and 35b as adjectives for modifying a noun object and a constraint validity check/constraint attaching function 34.

The naming function 31, for example, enables a user or a system to name individual objects 21b, and the name managing function 32 manages the names. The reference designating function 33, for example, enables a user or a system to distinguish a specific individual object 21b from another object and to refer to the individual object 21b.

FIG. 6 shows the execution management of a specific function corresponding to a verb object. The execution management of a function shown in FIG. 6 is exercised by a function execution managing mechanism 40, which is not shown in FIG. 2.

The function execution managing mechanism 40 manages the execution 41 of a specific function based on the starting constraint 23a, operating constraint 23b and ending constraint 23c of the function execution when a specific function corresponding to a designated verb object is executed. Specifically, after in response to the operation request of a function, the starting constraint 23a are checked along with other constraints, the execution 41 of a specific function is conducted, the operating constraint 23b are checked while the function is being executed and at the end of the function execution, the ending constraint 23c are checked.

For example, if a circular arc is plotted, the coordinate values of at least three points must be determined. If the coordinate values of only two points are determined, a function to plot a circular arc cannot be executed. However, the check of the starting constraint 23a enables the function execution managing mechanism 40 to check such constraints in advance and also enables the automatic activation of a function to request a user to input the coordinate values of the third point as requested.

Figure 7:
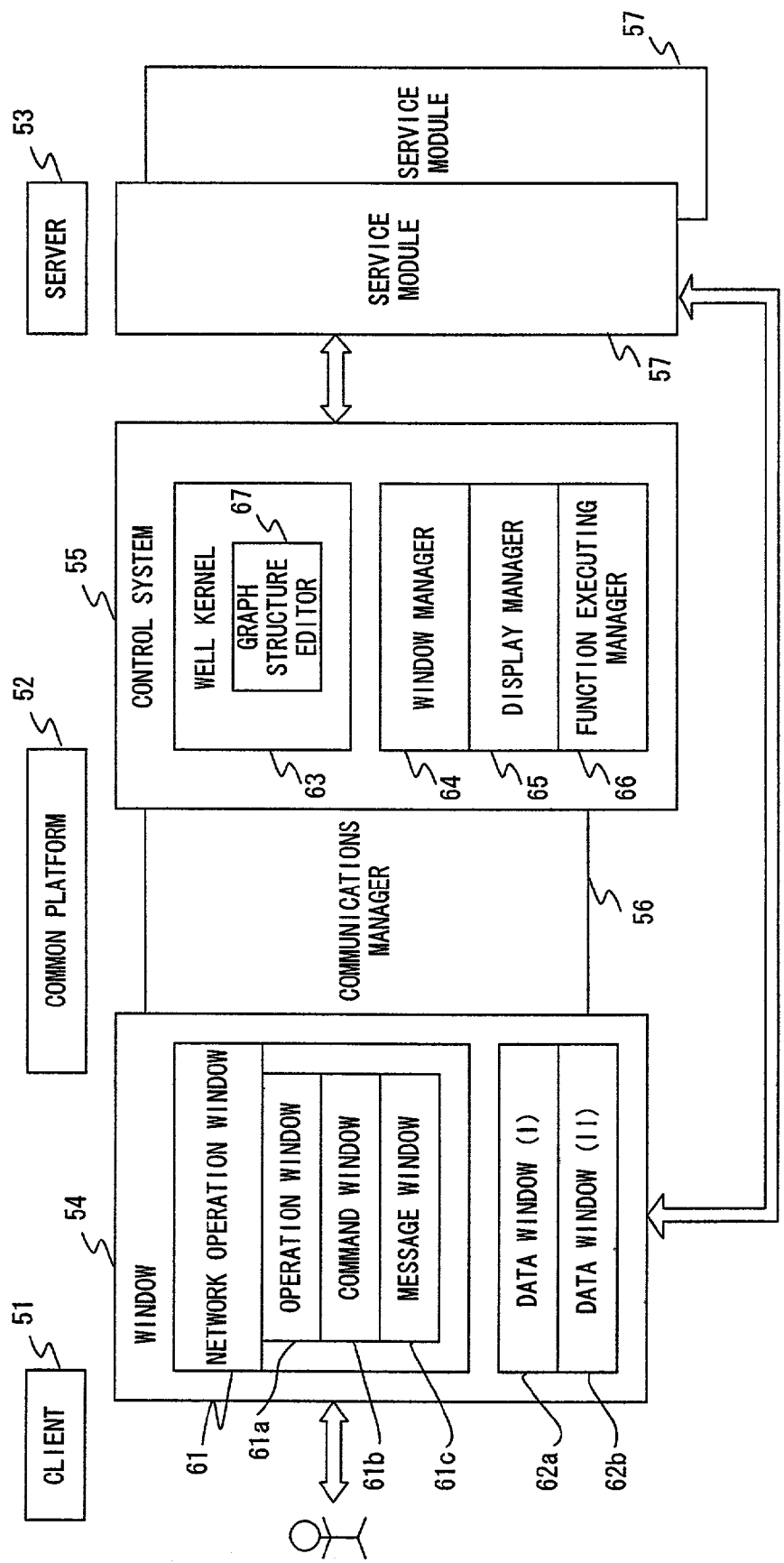
FIG. 7 shows the basic configuration of an information-processing device with a common platform as interface with a user.

Next, the common platform is described. FIG. 7 shows the basic configuration of an information-processing device with a common platform 52 provided as an interface between a client, such as a user 51, and a server 53 for performing a process designated by the client. The common platform 52 shown in FIG. 7 comprises a window 54 for inputting/outputting data to/from a client 51, a control system 55 and a communications manager 56 for matching data display format between the window 54 and the control system 55 and the like. The server 53 is assumed to be generally composed of a plurality of service modules 57.

The window 54 comprises a network operation window 61 and a data window 62. The operation window 61a in the network operation window 61, for example, displays pictures and characters for enabling the client 51 side to designate a variety of operations. A command window 61b, for example, displays pictures and characters for enabling a client side to designate a variety of commands. A message window 61c, for example, displays messages from a system side to a client. A data window 62 also comprises a data window (I) 62a for displaying process results and a data window (II) 62b for displaying constraint data and the like needed for a process.

The communication manager 56 converts the notation method of data exchanged between a client 51 and a server 53 through the window 54. This conversion of a notation method is described in detail later.

The control system 55, for example, is a part of a WELL system, which is described later. The control system 55 comprises a WELL kernel 63 for performing control of a process corresponding to an object network, a window manager 64 for performing control of the selection of a variety of windows and the like at the window 54, a display manager 65 for performing control of data display and the like at a window and a function execution manager 66 for performing control of the execution of a function corresponding to a verb object in the object network. The WELL kernel 63 further comprises a graphic editor 67 for handling the graphic structure of a network also regarding the object as a kind of data.

In FIG. 7, when the client 51 designates a process target, the server 53 calls up an object network that represents the process target area. The graphic editor 67 stores the object network in the work area of the WELL kernel 63. Based on this storage result, the object network is displayed on the operation window 61a under the control of the window manager 64 and the like and through the agency of the communications manager 56.

The client 51 specifies all or a part of nodes in the object network displayed on the window 61a and issues an instruction to a system. In response to this instruction, the communications manager 56 interprets the content of this instruction and enables the server 53 to call up a template corresponding to the designated noun object. This template is described later.

On the data window (II) 62b, for example, constrain data are displayed that exists in relation to a noun object and the like. Then, the client 51 selects the constraint data. Then, based on the selection result, the server 53 performs a process corresponding to the instruction of the client 51, and the execution result is displayed at the data window (I) 62a. The client 51 evaluates the execution result and a subsequent instruction is issued.

In the information-processing device using a common platform shown in FIG. 7, a data display format most suitable for a user, which is the client 51, is used in the window 54, and the data are converted into a data format for processing in the data processing device by the common platform 52. Therefore, a user can easily use the system.

For a human being as the client 51, a data format, such as graphics and pictures, is easier to understand to issue instructions than a text format. In particulars, as to points or lines, it is preferable to issue instructions directly or using a mouse on the data window 62.

If points are digitized as coordinates (x, y) and lines are expressed in the form of a list of pixels from the top to the end, the processing efficiency of a computer, which is the server side 53, can be improved.

Specifically, between the common platform 52 and client 51, it is preferable that data representing points and lines are displayed as they are and designations can be performed while referring. With the server 53, it is preferable that data are specified in an index format, for example, the result data of designations by the client 51 are collectively transferred and the data are jointly processed.

As for data representing graphics and pictures, with the client 51, they are displayed as they are, and thereby the client 51 can designate the data using the graphics and pictures. With the server 53, a notation method for specifying data using a list or raster structure is used.

As for data elements, with the client 51, designations by name are available. With the server 53, a notation method for specifying a data element using its name header is used.

According to the preferred embodiment of the present invention, in the information-processing device comprising the common platform 52 and server 53 shown in FIG. 7, data and the data process are handled as objects, and the data are processed by a WELL system using a functional language abbreviated as WELL (window-based elaboration language) for performing an information process using an object network that expresses the data in graphics.

Figure 8:
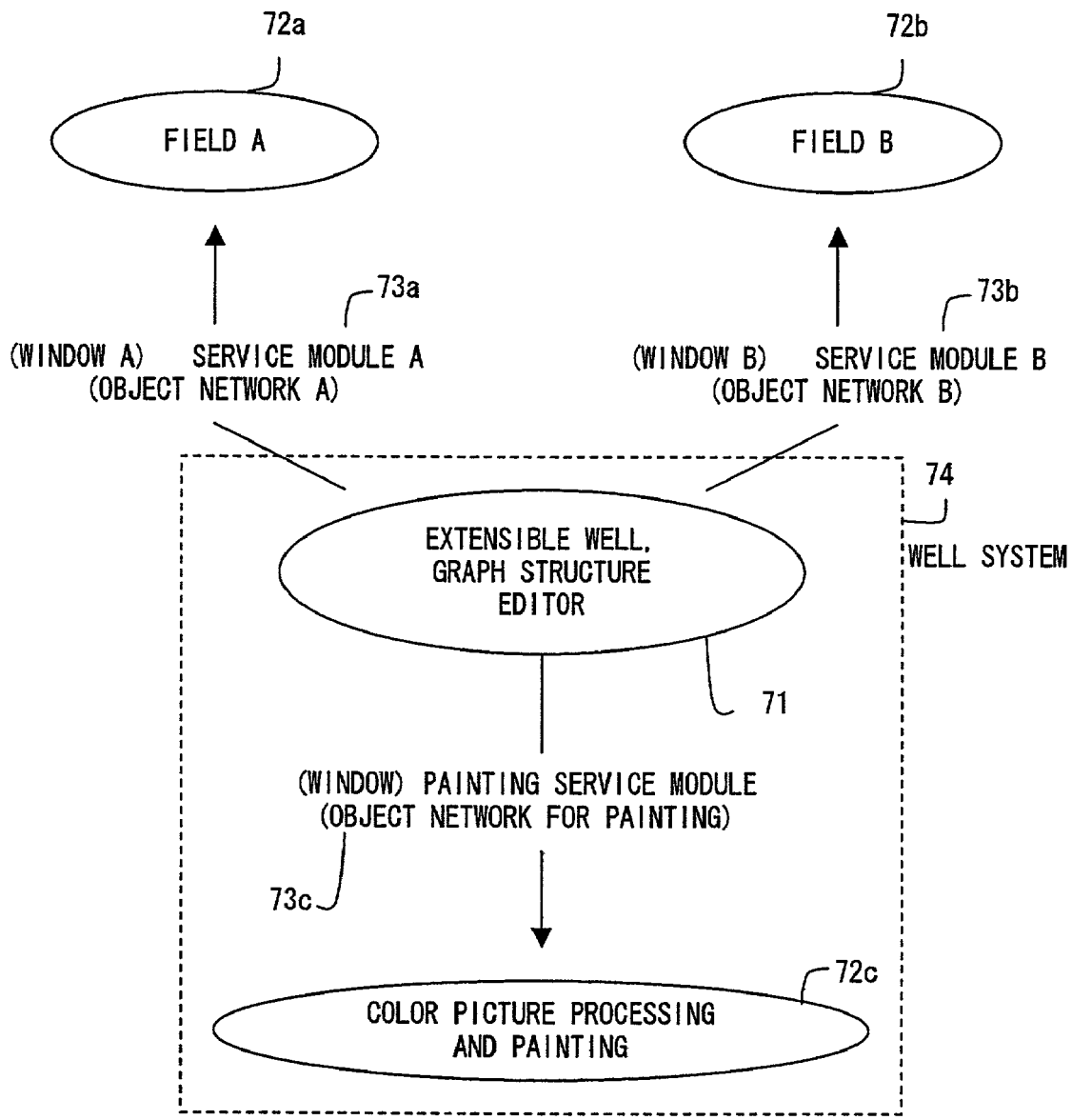
FIG. 8 shows a WELL system for a color-picture generation/coloring-processing field.

FIG. 8 shows the relationship between a WELL system and an object network. In FIG. 8, specific process fields are represented by 72a, 72b and 72c. In particular, a color picture generating/coloring processing field is represented by 72c. Object networks corresponding to fields 73a, 73b and 73c are represented by 73a, 73b and 73c, respectively. An object network for painting that is combined with a service module for painting is represented by 73c. The graphic editor 71 is an extended extensible WELL system that can be applied to a variety of object networks.

If an object network corresponding to a specific field is inputted to this functional language abbreviated as WELL, the object network is processed without a program. This language is a window-oriented language, and by using a window as interface with a client, a client server model is implemented.

In FIG. 8, by combining a window needed in relation to the color picture generating/coloring process field 72c with an object network 73c corresponding to a service module that performs a corresponding process, a WELL system becomes a WELL system 74 corresponding to the color picture generating/coloring process field 72c. By combining the window with an object network 73a or 73b corresponding to another field, a system corresponding to fields 72a or 72b is generated.

Figure 10:
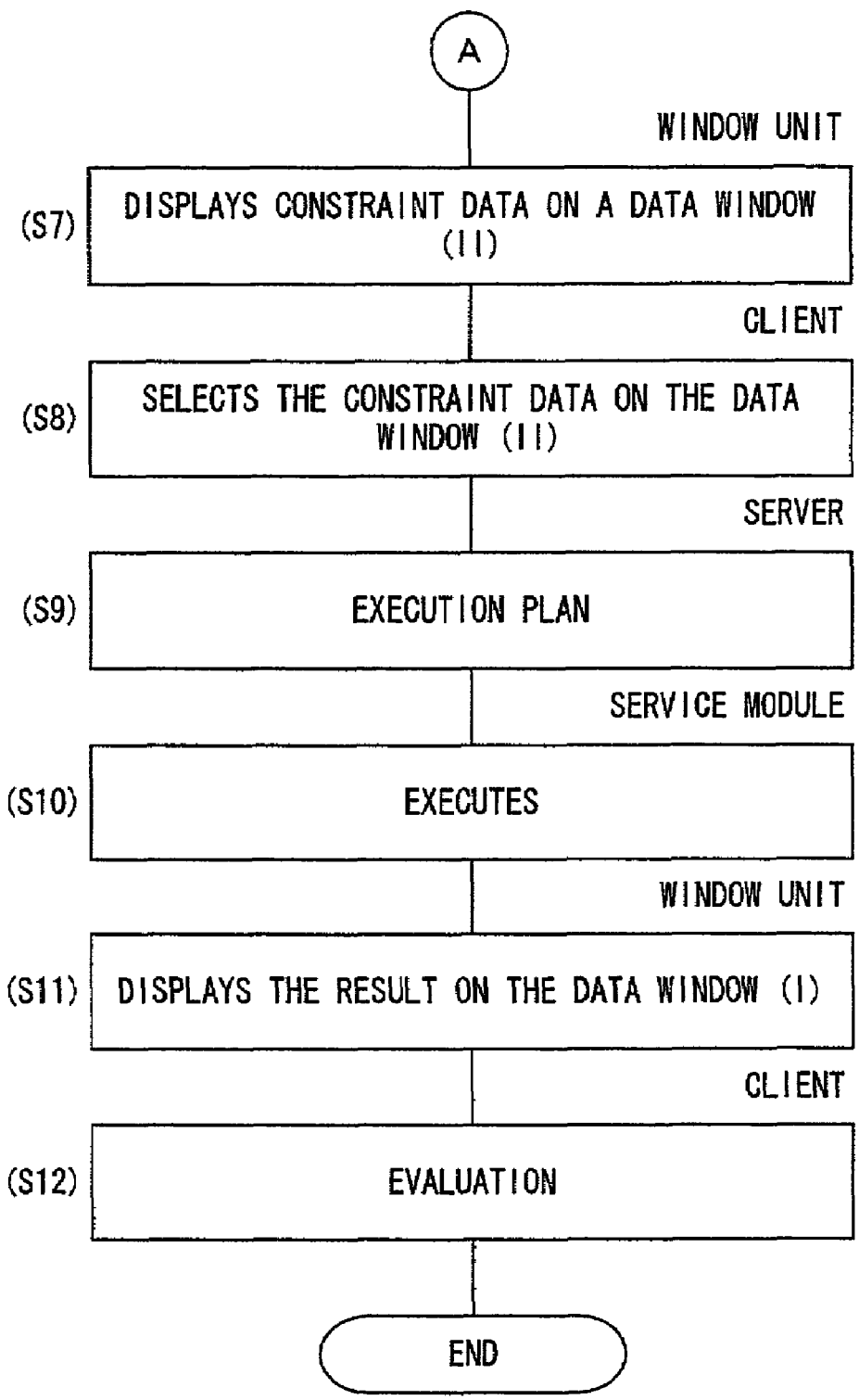
FIG. 10 is a flowchart showing a data processing using an object network (No. 2)

FIGS. 9 and 10 are flowcharts showing a data process using an object network. In FIG. 9, when the process is started, in step S1, first, the server 53 shown in FIG. 7 calls up the relevant object network. For example, if a process in a color picture generating/coloring process field is performed, the object network shown in FIG. 4A or 4B is called up. In step S2, the graphic editor 67 stores the called object network in the work area of the WELL kernel 63. Then, in step S3, the WELL kernel 63 activates both the window manager 64 and display manager 65, and the operation window 61a is displayed through the intermediation of the communications manager 56.

In step S4, the client 51 designates a part of the displayed object network, such as a branch and issues an instruction to the system. This instruction is identified by the communications manager 56, and in step S5 the server 53 calls up a destination node, that is, a template for a noun object located at the end of the branch through the intermediation of the WELL kernel 63. In step S6, the service module 57 prepares an area corresponding to the template.

Then, in step S7 of FIG. 10, constraint data corresponding to the template are extracted on the common platform 52 side, are displayed on the data window (II) 62b. In step S8, the client 51 selects specific constraint data of the displayed constraint. The selection result is identified by the communications manager 56 and is transmitted to the server 53 through the intermediation of the WELL kernel 63. In step S9, an execution plan is generated.

In step S10, according to the execution plan, the service module 67 performs a process designated by a user, such as line plotting, coloring and the like. In step S11, the result is displayed on the data window (I) 62a. Instep S12, the client 51 evaluates the process result and issues a subsequent instruction.

Figure 11:
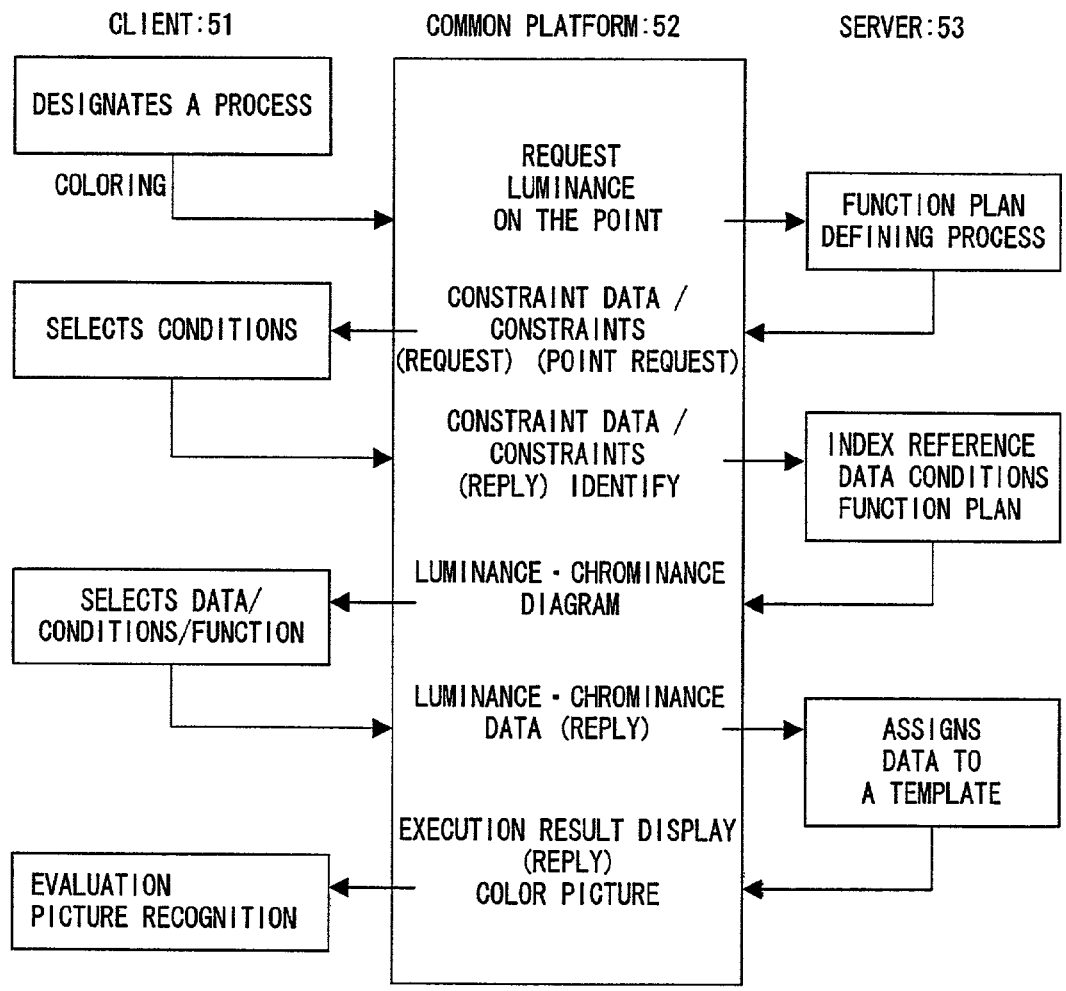
FIG. 11 shows the process method of the color-picture generation/coloring process.

FIG. 11 shows a process method used when a color picture generating/coloring process is performed in an information-processing device provided with a common platform. Here, the generation process of a luminance on the point for providing points with luminance is described.

First, when the client 51 issues a generation request of luminance on the point as a process instruction through the common platform 52, the server 53 issues a request for information about a point to which luminance is provided as constraint data/condition needed to plan an execution function. Then, the client 51 side identifies a point for condition selection, designates the point, that is, recognizes the point by referring to the index of a template on the server 53 side, which is described later, and the selection of luminance data to be inputted to the point as data needed to plan the function execution is requested of the client side.

This request is issued to the client 51 side as a luminance/chrominance diagram. In response to this request, the client 51 side provides the server 53 side with the luminance/chrominance data to be inputted to the point on the luminance/chrominance diagram as data/condition/function selection. The server 53 side assigns the data to a template, performs the process and presents a color picture to the client 51 side through the common platform as the execution result. The client 51 side evaluates the execution result by picture recognition and moves to the designation of a subsequent process.

FIG. 12 shows a template used in a process on the server 53 side. This template corresponds to the noun object of, for example, the point shown in FIG. 4A or 4B and stores both an index for specifying the point without using coordinates on the coordinate X Y system side of the display screen and the attribute data of the point, such as luminance, chrominance and the like.

FIG. 13 shows a template corresponding to, for example, the noun object called a "line segment" shown in FIGS. 4A and 4B. A template for a line segment stores a pointer that points another point in the attribute data storage area on the template of each of major points No. 1, No. 2, . . . , No. n composing a line segment in addition to the luminance and chrominance vectors of the point. These points define a template corresponding to one line segment as a whole.

FIG. 14 shows a method for generating a specific object network for performing a specific process from a general generic object network. For example, a generic object network 76 in which parameters, constraints and the like are generalized is prepared as a formula in which variables are generalized, is prepared in mathematics. By incorporating parameters and constraints 77 required to perform a specific process into the generic object network 76, a specific object network 78 is generated.

Figure 15:
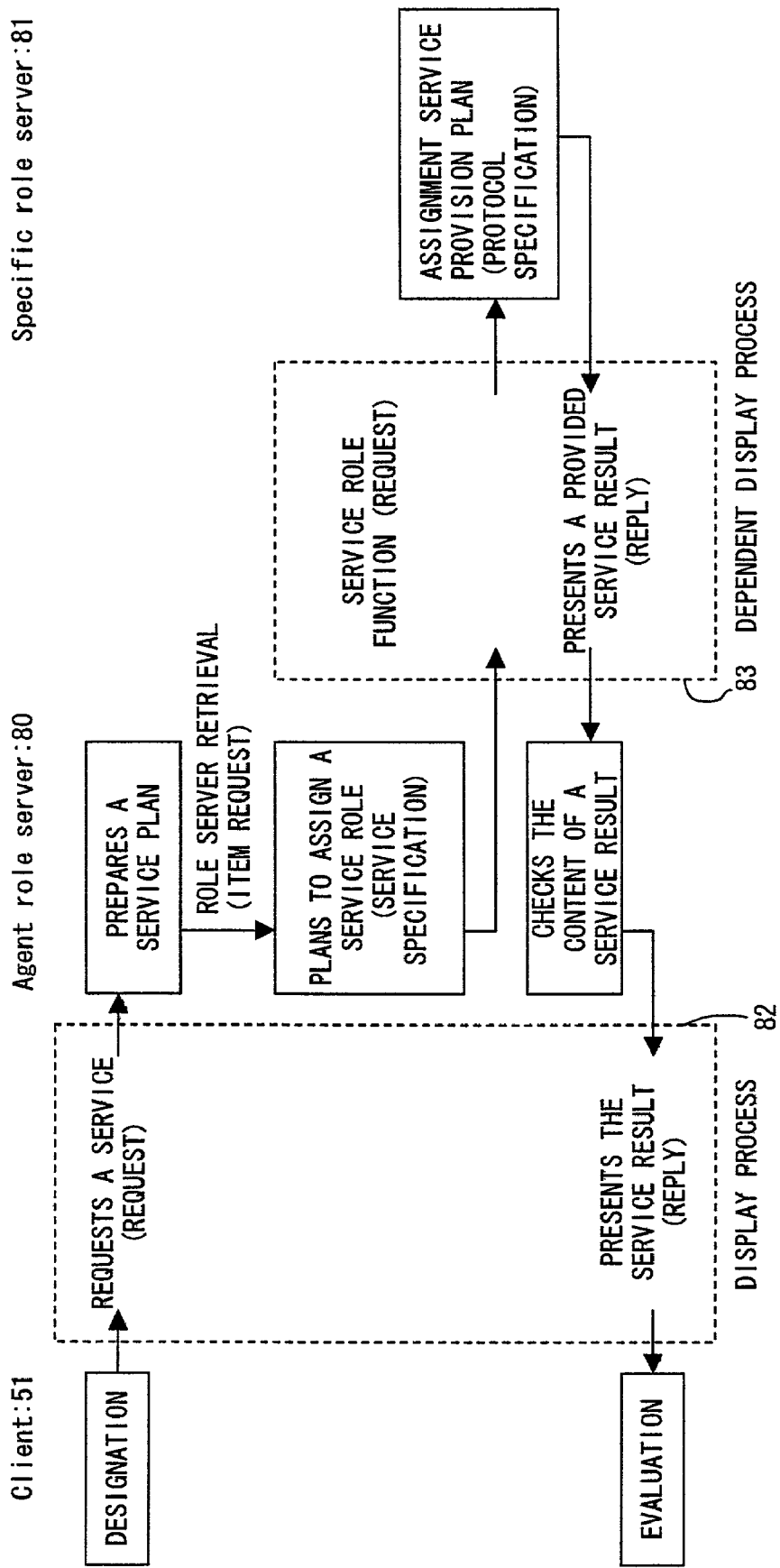
FIG. 15 shows the configuration of an information-processing device with an agent.

FIG. 15 shows the configuration of an information-processing device with an agent. When compared with the configuration shown in FIG. 7, the configuration comprises an agent role server 80 between the client 51 and a specific role server 81 corresponding to the server 53 shown in FIG. 7. In FIG. 15, the agent role server 80 plays the role of, for example, a travel agent between the client 51 and the specific role server 81 for actually performing a specific process.

A display process 82 and a dependent display process 83 perform necessary data display and the like between the client 51 and agent role server 80, and between the agent role server 80 and specific role server 81, respectively. Between the client 51 and agent role server 80, the request and reply of a service is made using the display process 82.

The agent role server 80 prepares a service plan according to the instructions of the client 51, retrieves data from a service to play the role, that is, a specific role server 81, makes a service role assignment plan and requests the specific role server 81 to execute the role function through the dependent display process 83.

The specific role server 81 performs the process of the assigned service provision plan and presents the process result to the agent role server 80 through the dependent display process 83. The agent role server 80 checks the content of the service result and presents the result to the client 51 through the display process 82.

The display process 82 and dependent display process 83 shown in FIG. 15 are implemented by the respective display formats of a common platform described with reference to FIG. 7. The agent role server 80 can be considered to be implemented as one of the service modules 57.

Figure 16:
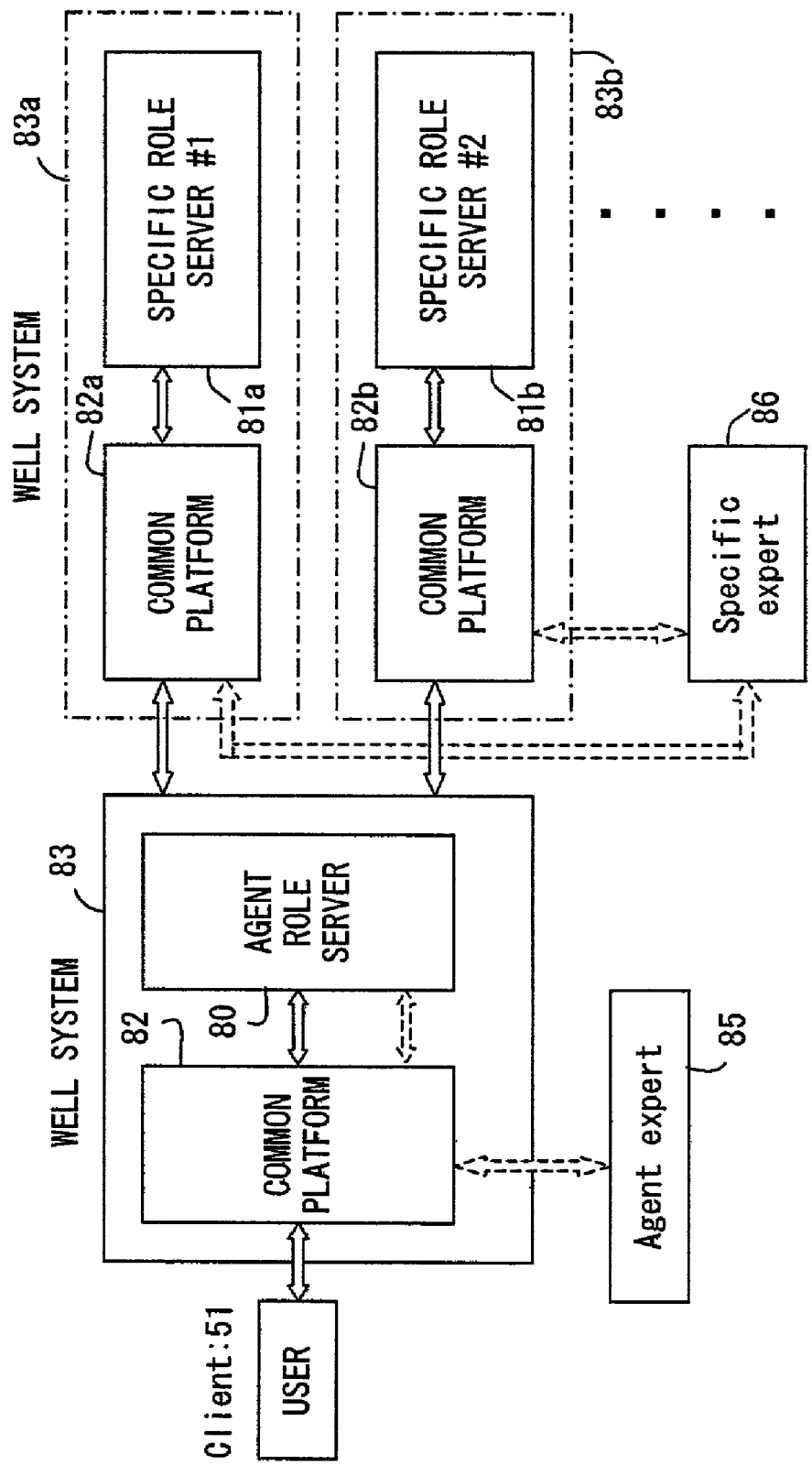
FIG. 16 shows the configuration of an information device taking into consideration the existence of an expert.

FIG. 16 shows the configuration of an information-processing device that takes the existence of an expert into consideration. In FIG. 16, a plurality of specific role servers 81a, 81b, . . . , are provided not as in FIG. 15. Each specific role server independently provides each specific assigned service. Then, the agent role server 80 integrates these results and performs processes according to the instructions of the client 51. The agent role server 80 as well as the common platform 82 composes a WELL system 83. For example, the specific role server 81a as well as the common platform 82a compose a WELL system 83a.

In FIG. 16, an agent expert 85 assists the information exchange between the client 51 and agent role server 80, and a specific expert 86 assists the information exchange between the agent role server 80 and a plurality of specific role servers 81a, 81b, . . . .

The client 51, for example, is a human being as a user. However, the agent expert 85 and specific expert 86 are not limited to human beings and can be implemented by a process unit with an intelligent function.

In FIG. 16, the client 51 requests the agent role server 80 to solve a specific problem. However, in response to this request, the agent expert 85 organizes a generic object network for a process to be performed by the agent role server 80, as an expert, then usually generates a plurality of specific object networks for providing a plurality of specific object networks with specific parameters and constraints actually incorporated and assists for the agent role server 80 to make a service plan.

Similarly, the specific expert 86 corresponds to a service plan made by the agent role server 80, designs an object network to implement a service assigned to each specific role server and its related template, and assists the process of the respective specific role server.

Next, both the role function and interaction function of an information-processing device using both an object network and a common platform are described. FIG. 17 shows the definition of a role. As shown in FIG. 17, a role is defined as a structure of an object network and functions as an execution process unit. A name is given to a role, and by the name, roles inside and outside a system are referenced.

The relationship among a plurality of object networks inside one role corresponds to a constraint to be defined against an object composing each object network and is stipulated as a relation expression between the attributes of the object. A role can also be composed of only one object network.

In the information-processing device of the present invention, for example, for each of a plurality of roles to perform a respective execution process and to meet a user's instruction as a whole, a cooperative operation between the plurality of roles is needed. For that purpose, the interaction function between the plurality of roles must be improved and free communications must be conducted. To meet a user's request, an efficient interaction function must be provided between a user, which can be considered to be one of supporting roles, and a service provision system. As described earlier, an interface function between a user and the system can be implemented by a common platform.

For the efficient interaction function between a user and the system or between a plurality of roles in such a data processing device, two types are used: event drive and data drive.

First, by the event drive, for example, a client makes a request to the system so as to implement a noun object on a common platform. On the system side, upon receipt of the request from the common platform, a server returns the execution result to the client side as a response.

By the data drive, for example, if a value corresponding to a specific attribute is not defined in a template corresponding to a noun object currently handled in the system, the setting of the value is requested of the client side. In response to the request, the non-definition of an attribute value is displayed on a data window, and the definition of a necessary attribute value is requested of the client side on this data window.

Figure 18:
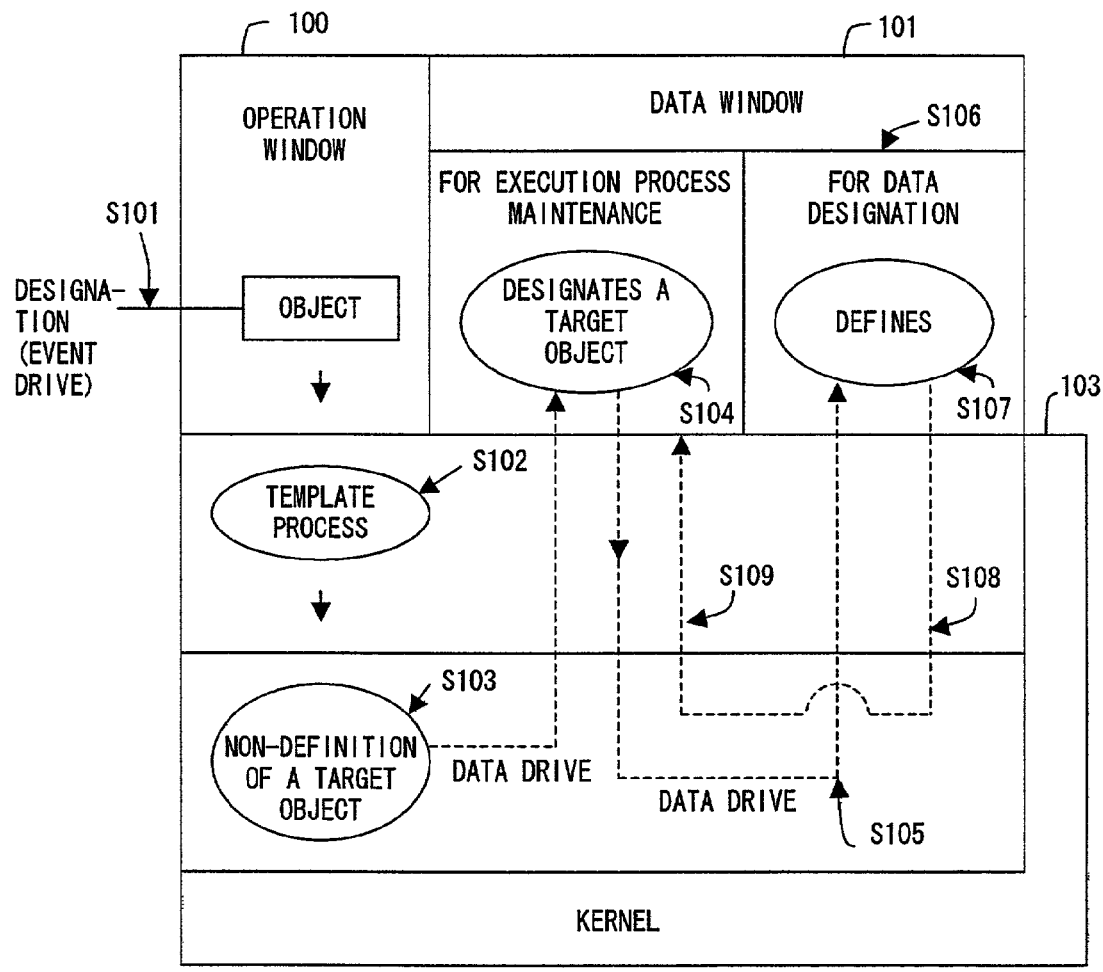
FIG. 18 shows the process in a WELL system for implementing an interaction function.
Figure 19:
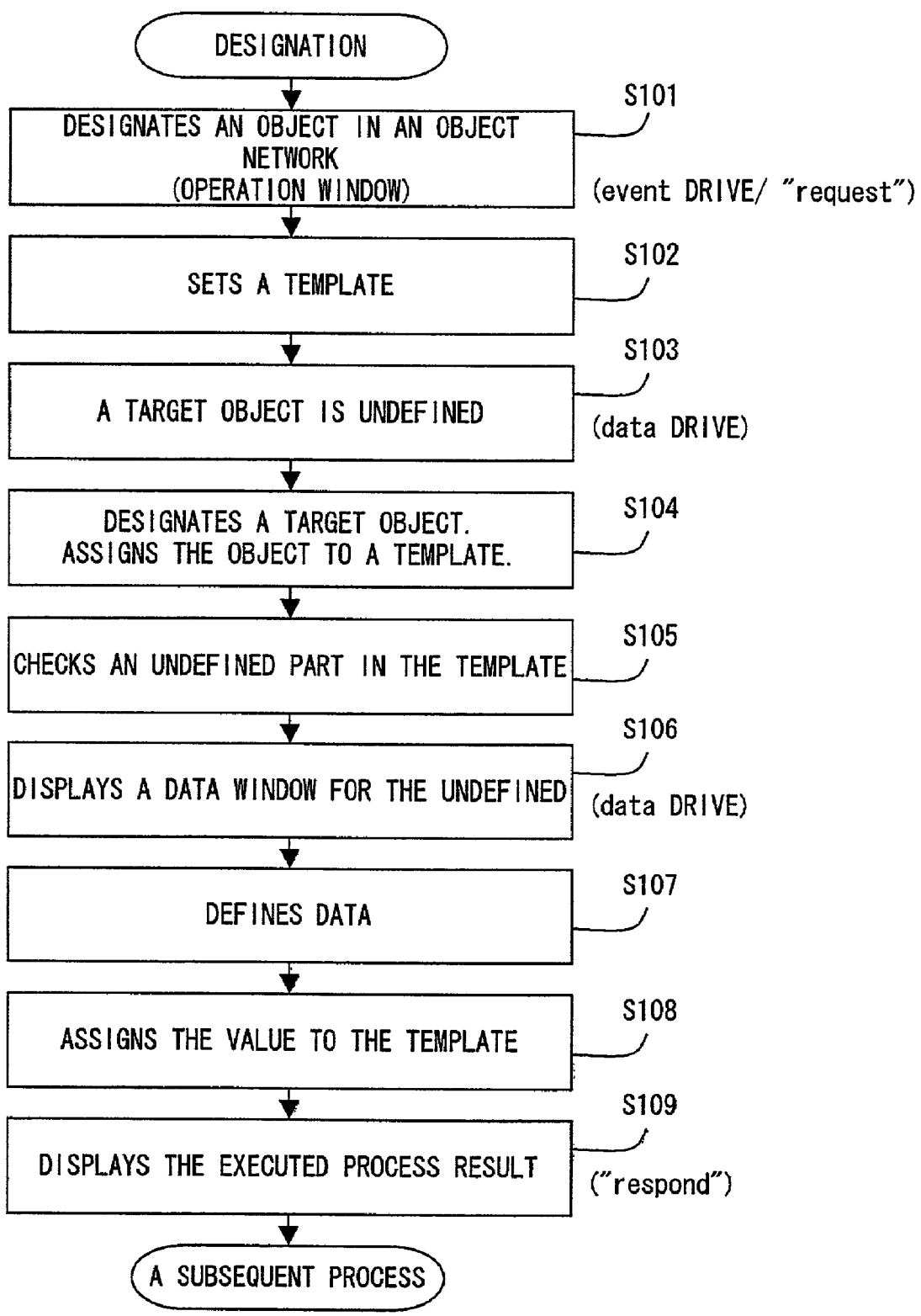
FIG. 19 is a flowchart showing the process of the interaction function.

FIG. 18 shows a process flow in a WELL system in order to show an interactive function based on both such an event drive and a data drive. FIG. 19 is a flowchart showing the process of an interactive function based on both the event drive and data drive shown in FIG. 18. A process based on both the event drive and data drive is described with reference to FIGS. 18 and 19.

First, in step S101 of FIG. 19, a client, for example, a user designates, for example, one object in an object network displayed on the operation window 100 of the common platform shown in FIG. 18 as a request for a system. This corresponds to event drive (request). In response to this user's designation, in step S102 a template corresponding to the object is set.

If the specific name of a target object corresponding to the currently set template and the like is undefined, the kernel 103 of the WELL system detects the fact, and in step S103 the designation of the target object is requested of the client as data drive. For example, the case where the name of object in a specific object network corresponding to an object composing a generic object network is undefined, as described with reference FIG. 14 corresponds to this.

The client designates the target object on the data window 101, and in step S104 this target object is assigned to the template. Furthermore, in step S105 the kernel 103 judges whether there is an undefined attribute value in the template. If there is an undefined attribute value, in step S106 the kernel 103 requests the client to input the undefined attribute value as data drive on the data window 101.

Then, the client defines the undefined attribute value on the data window 101. In step S107, the system side receives this data definition. In step S108, the attribute value is assigned to the template and the WELL system performs a process using the template to which the attribute value is assigned. In step S109, the WELL system displays the process result on the data window 101 and the process in response to the client's designation (response) is completed.

Thus, by an interactive function based on both event drive and data drive, user-friendly and efficient interface can be implemented. Between a plurality of roles, such as an agent role server and a specific role server and the like, communications function can be implemented to support the cooperative operation between role functions. By implementing the communications function using the kernel of a WELL system, a variety of systems, in particular, software architecture for a personal computer system can be handled.

If a cooperative operation is performed between a plurality of roles, it is preferable to execute an interactive function based on shared data between a main role for providing a role function as a main system and a supporting role for providing a service function to support the main role. The main role is played in a specific environment related to the main role, and environment data for the environment must be always monitored. If a supporting role shares the environment data with the main role and when there is a change in the environment data, the characteristics of the change can be reported to the main role, and the main role can operate so as to match the change in the environment.

Figure 20:
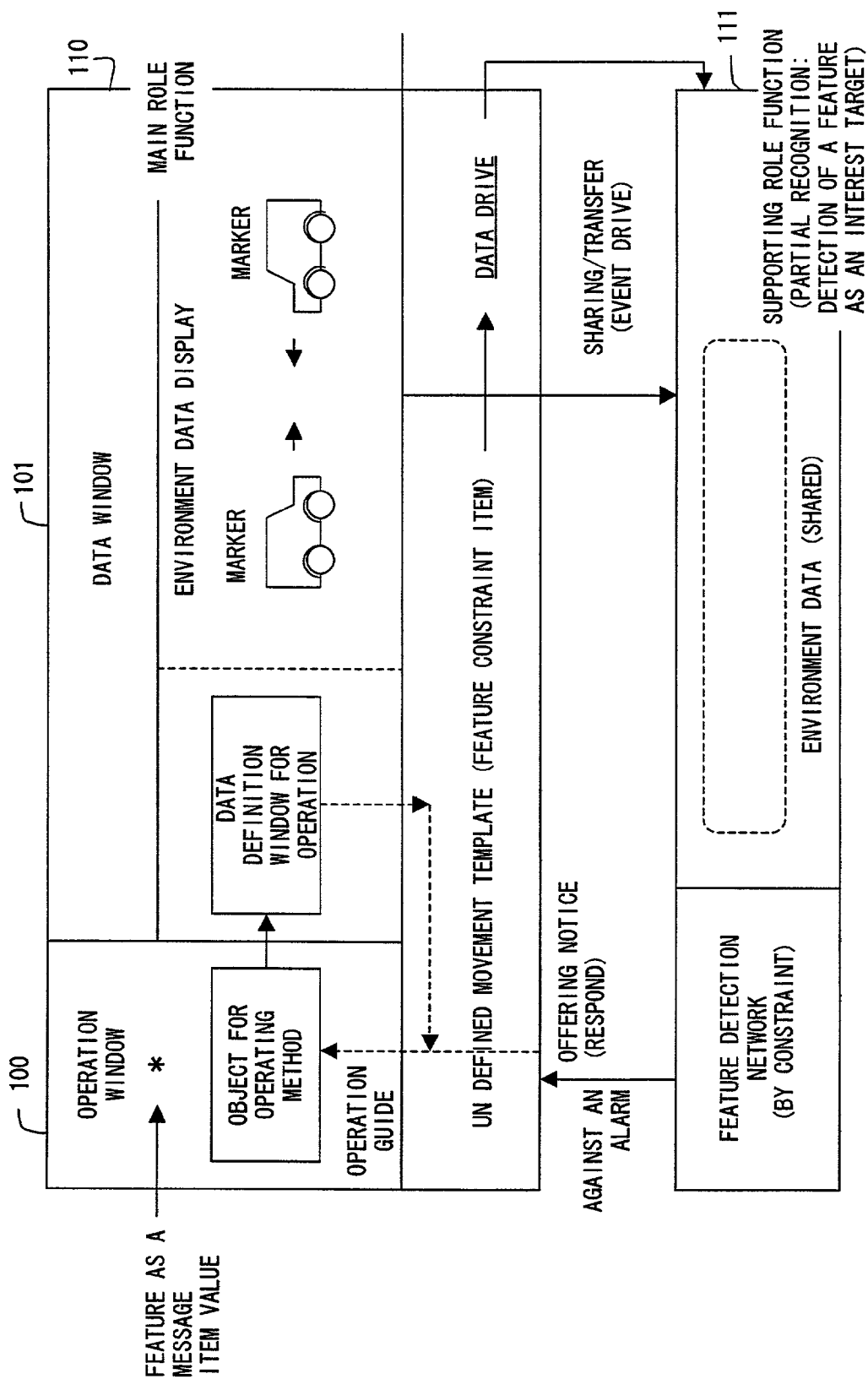
FIG. 20 shows an interaction function between a main role function and a supporting role function.

FIG. 20 shows the interactive function between a main role function and a supporting role function based on environment data. In FIG. 20, the semi-automatic drive of two cars is used as an example. It is assumed that such a system is built in each of the cars and the cars run on a course where there is the possibility that the cars may collide with each other.

The main role 110 built in one car is provided with the object of a semi-automatic drive method, and this object is displayed on the operation window 100 of a common platform. On the data window 101, environment data are displayed.

If the displayed environment data change, the change is transferred to a supporting role 111 as event drive. The supporting role 111 detects the features of the environment data. An object network for feature detection provided in the supporting role 111 detects this.

For example, if a feature indicating that the two cars are so close to each other that the collision of the cars cannot be avoided without any measure is detected, the supporting role 111 notifies the main role 110 of the fact by offering, that is, responding to the detection. In response to this offering, the main role sets a movement template corresponding to the operation method object.

If there is an undefined part in this movement template, for example, if data about the movement direction and degree of the cars are not defined, the setting of the undefined data is requested by data drive. If the cars are not semi-automatically driven, this setting of the undefined data is requested of a user, that is, a driver. However, since the cars are semi-automatically driven, the setting is requested of, for example, the supporting role 111. The supporting role detects a necessary feature from the environment data and provides data requested based on the detection result. If the data are assigned to the movement template, the main role 110 starts interaction with the user to enable the user to actually drive his/her car using the operation method object as a drive guide.

Further to smoothly perform cooperative operations between a plurality of role functions, it is necessary for a main role function to play a specific role to perform one vs. multi broadcast for dependent role functions to play its related role.

Figure 21:
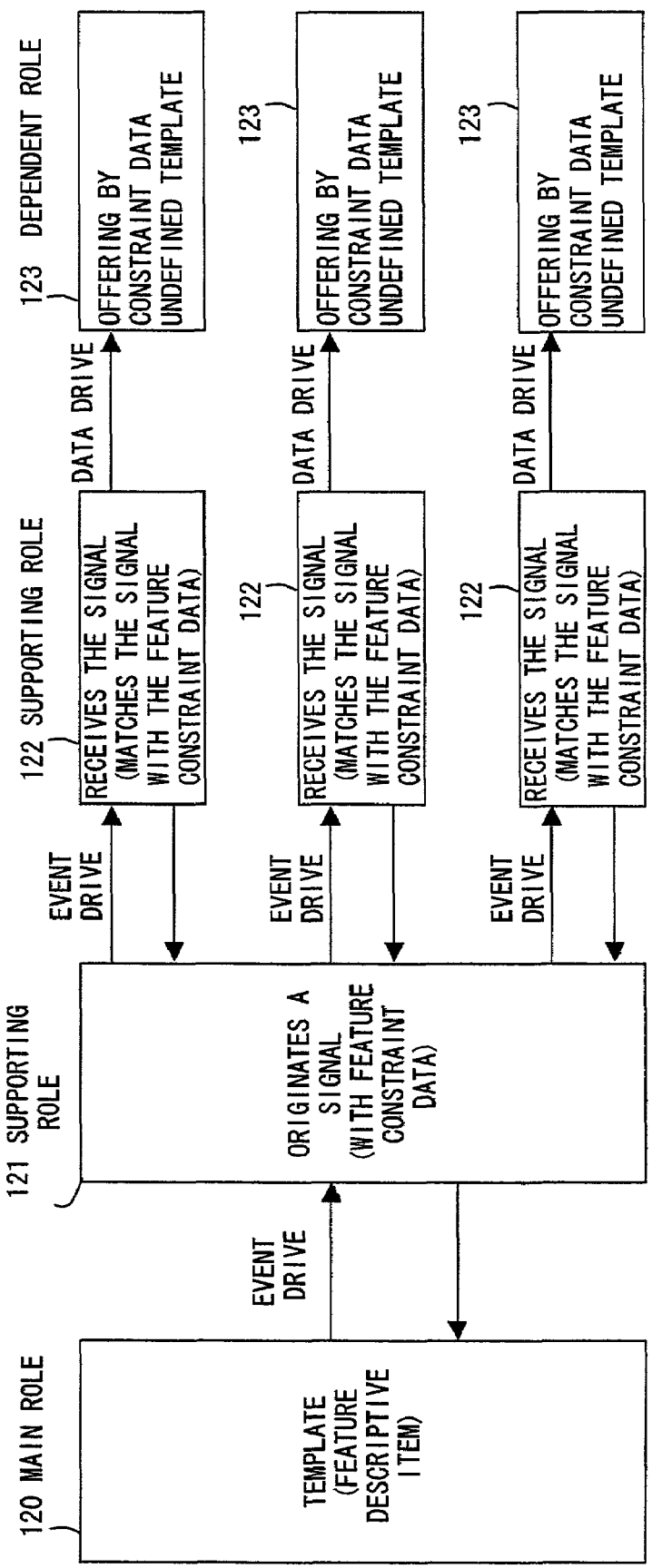
FIG. 21 shows one-to-multiple broadcasting from a main function to dependent role functions.

FIG. 21 shows one vs. multi broadcast from a main role function to dependent role functions. In FIG. 21 it is assumed that a main role 120 and a plurality of dependent functions 123 cooperatively operate as a whole. The main role 120 performs control of the operation of the plurality of dependent functions 123 by conducting one vs. multi broadcast for the plurality of dependent functions 123. For that purpose, a supporting role 121 broadcasts signals with feature constraint data attached to a plurality of supporting roles 122 based on event drive from the main role 120. Upon receipt of the broadcast, the plurality of supporting roles 122 extract both the name of the role function of a broadcaster and constraint data.

Each dependent role 123 has a template with an undefined part. Each dependent role 123 receives the constraint data from the supporting role 122 by offering based on data drive and executes the dependent role functions of the main role 120 based on the constraint data.

Figure 22:
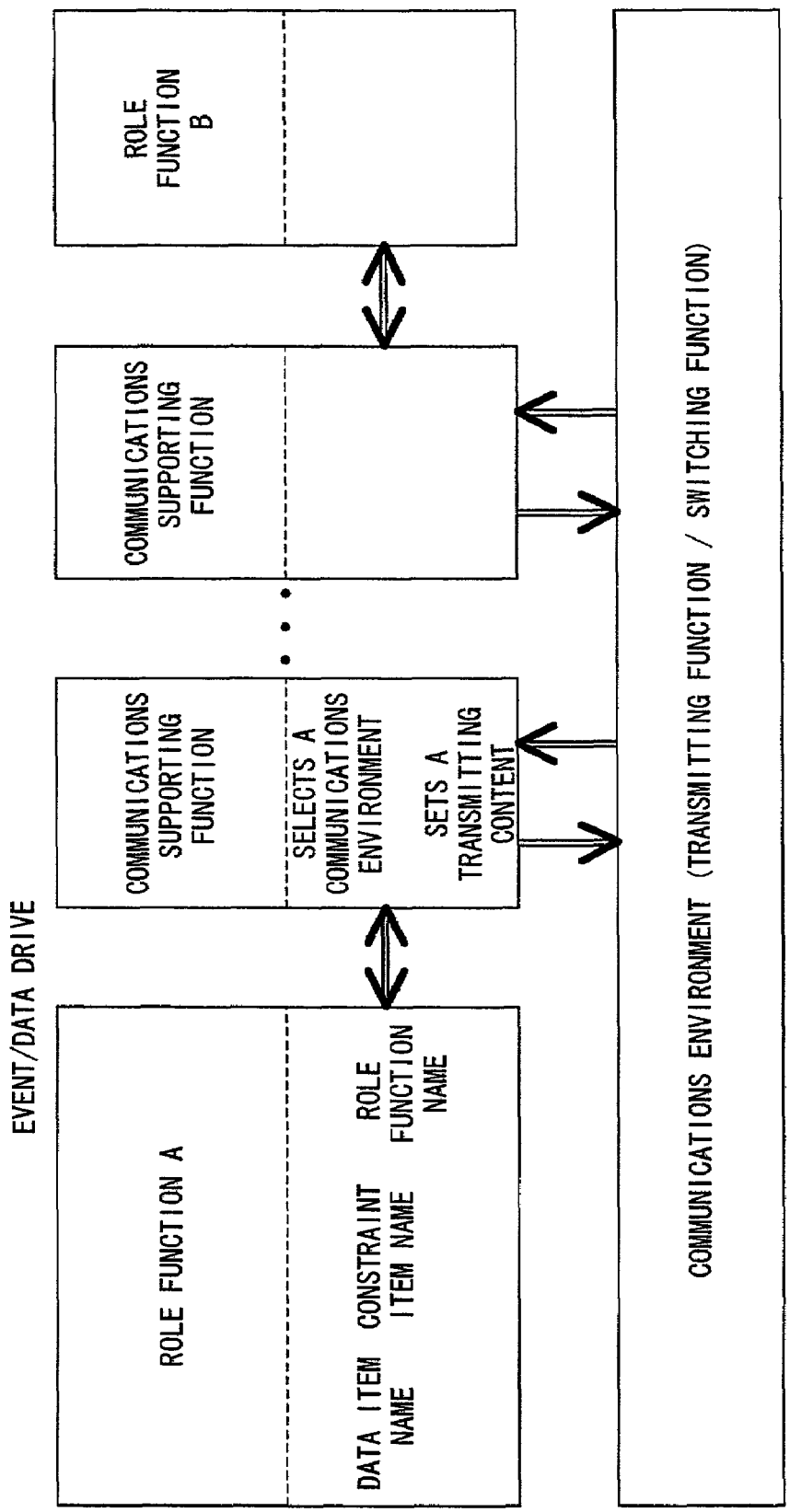
FIG. 22 shows communications between role functions.

FIG. 22 shows communications between a plurality of role functions. In FIG. 22, role functions A and B and a plurality of role functions, which are not shown in FIG. 22, can communicate with each other through a communications environment. A communications supporting function to support communications is provided between role functions A and B and the communications environment. Communications between these are conducted by an interactive function based on both event drive and data drive.

For example, B is designated as an opposite role function name by role function A, a content, such as a data item name, a constraint item name and the like is reported to role function B through the communications supporting function and the execution process of role function B is controlled. The communications supporting function selects a communications environment, sets a transmitting content and so on. An opposite role function can be freely selected and communicated between a plurality of role functions.

The descriptions of both the object network and common platform are finished. Next, information processing for accomplishing intention is described.

Intention to be targeted in the present invention does not mean a fairly small partial instruction, such as an instruction to plot a point on a screen or an instruction to generate a point sequence, as described with reference to FIGS. 4A or 4B, but means fairly large intention, such as each of users, that is, drivers' intention to semi-automatically drive the respective car so as to avoid the collision with the opposite car each other, as described with reference to FIG. 20.

There are largely three types of intention: shared intention, conflicting intention and independent intention. First, shared intention is commonly shared by two clients, for example, human beings, where intention to semi-automatically drive a car not so as to collide with each other, which, is shared by the respective users, for example, car drivers, of two systems.

In conflicting intention, for example, a bird flying in the air cherishes intention to eat a fish when finding out the fish, while the fish cherishes intention to escape from the bird without being caught. Furthermore, for example, a gorilla meddles with the movement of an owl without hurting the owl and leans a general lesson on an owl through play, while the owl learns how to escape from the gorilla from the reciprocal movement. In such a case, each of the gorilla and owl can be considered to have a conflicting intention each other. In this case, the aim of the gorilla is not to catch or kill the owl, but is to stop the movement immediately before catching or killing the owl and to restore the original state. This aim can be achieved if the supporting role function of the gorilla detects that the reaction of the owl as a feature constraint reaches the limit.

Independent intention is cherished by a human being, for example, when in particular, the user of another system, for example, a human being acts for a specific purpose regardless of the intentions of other human beings, unlike shared intention and conflicting intention. For example, when a human being paints or generates animation by integrating multimedia information, as described earlier, the human being cherishes this intention.

Figure 23:
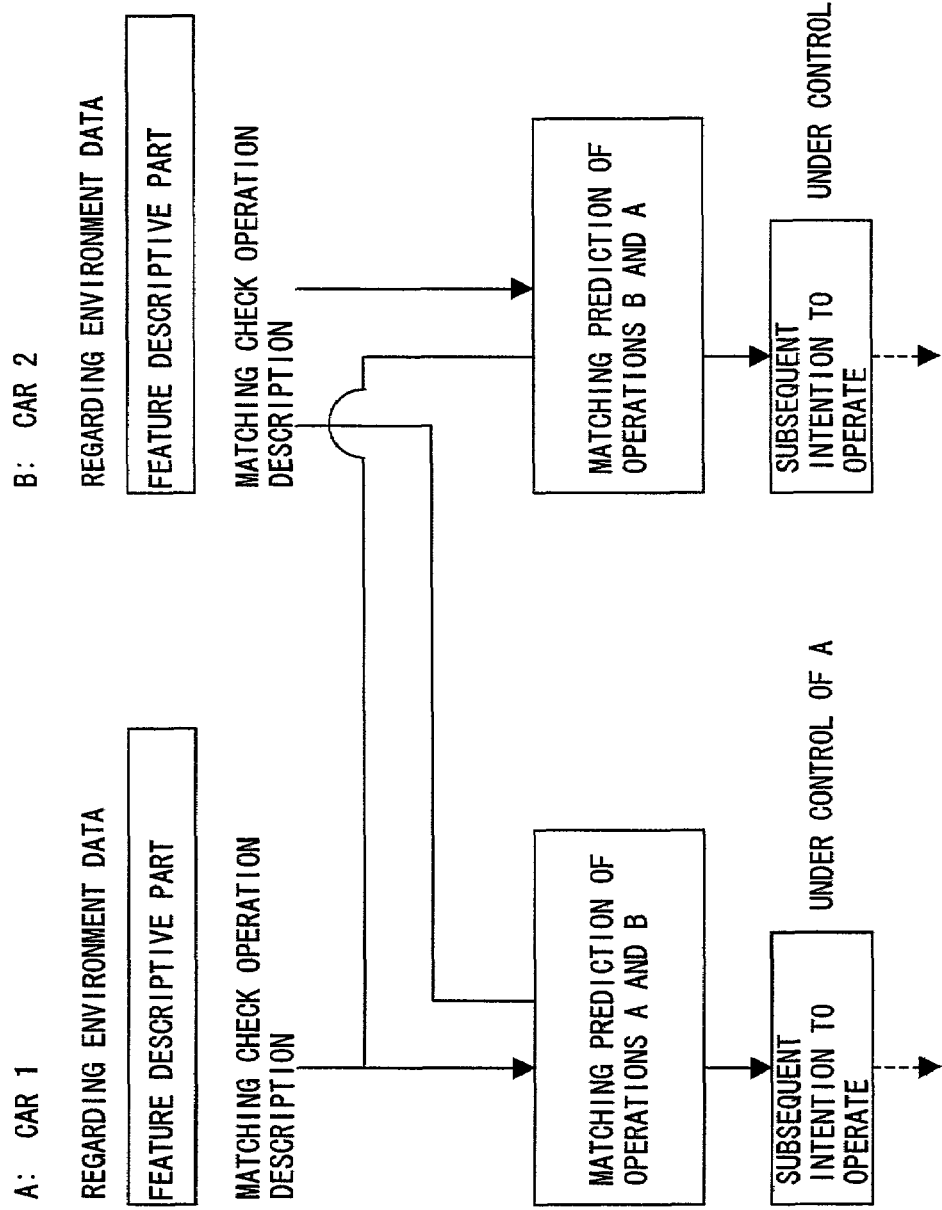
FIG. 23 shows the matching prediction process of shared intention.

FIG. 23 shows the matching prediction process performed when, for example, each of users A and B cherishes shared intention to semi-automatically drive the respective cars while avoiding a collision each other. In FIG. 23, each of users A and B predicts the operation of the opposite car based on the feature description result of the respective environment data and performs a matching operation as a subsequent operation in order to avoid a collision specified by the constraints.

Figure 24:
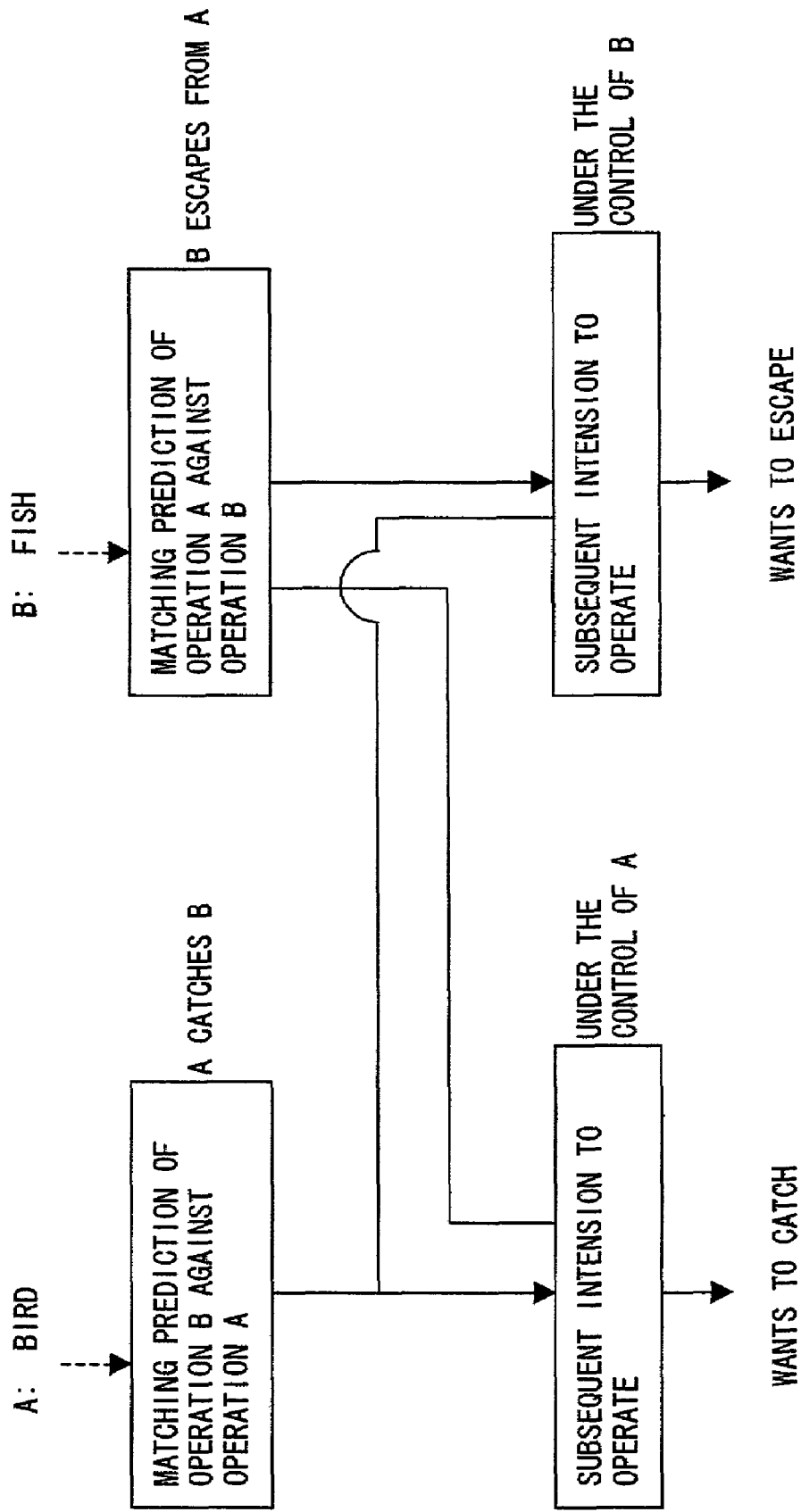
FIG. 24 shows the matching/non-matching prediction process of conflicting intention.

FIG. 24 shows a matching/non-matching prediction process performed when each of two users cherishes conflicting intention, like the bird and fish described earlier. In FIG. 24, the bird tries to catch the fish, while the fish tries to escape from the bird. For this purpose, the bird and the fish predict the route of the fish and the approach route of the bird, respectively, and both act against the respective predictions. However, in this case, the respective subsequent operations are performed under the respective constraints. The bird and the fish subsequently act for the purposes of catching the fish and escaping from the bird, respectively.

Figure 25:
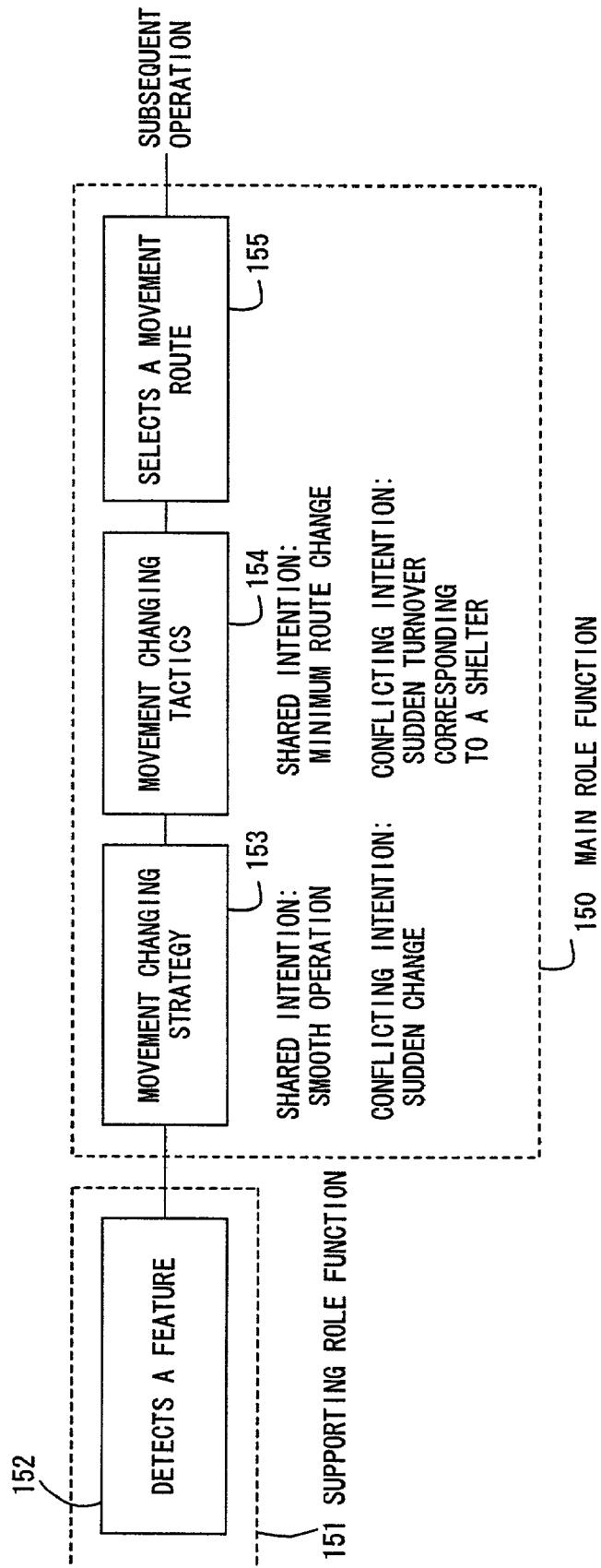
FIG. 25 shows movement change due to strategy and tactics on shared intention/conflicting intention.

In information processing for accomplishing an intention, for example, in order to prevent two cars to collide, it is very important to determine a strategy and tactics on a subsequent operation based on the detection result of features, such as road situations and the like, that is, under the constraints. FIG. 25 shows the movement change as a subsequent operation due to the strategy and tactics on both the shared intention to avoid the collision and the conflicting intention between the bird and fish, described earlier.

In FIG. 25, a subsequent operation based on a strategy and tactics is determined by a main role function 150 for playing a main role, and features, such as environment data and the like are detected by a supporting role function 151 for playing a supporting role. First, by the supporting role function 151, the detection 152 of features, such as road situations, speed of the opposite car and the like is conducted, and the result is provided to the main role function 150. The main role function 150 first determines a movement change strategy 153. In the case of the common intention for two cars to avoid the collision, this strategy 153 is to maintain a smooth operation as much as possible when the movement is changed. In the case of the conflicting intention for a bird to catch a fish, in order to act against the prediction of the opposite party, a sudden movement change is adopted as a strategy.

Then, the main role function 110 determines a movement change tactics 154. In the case of the shared intention, for example, a tactics for minimizing a route change is adopted in order to avoid the shock of the passengers as much as possible. In the case of the conflicting intention, for example, since the fish takes refuge behind a shelter, such as a rock, a sudden inverse action is adopted as a tactics in connection with the shelter. Based on such a tactics, the selection 155 of a movement route is made and a subsequent operation is determined.

Figure 26:
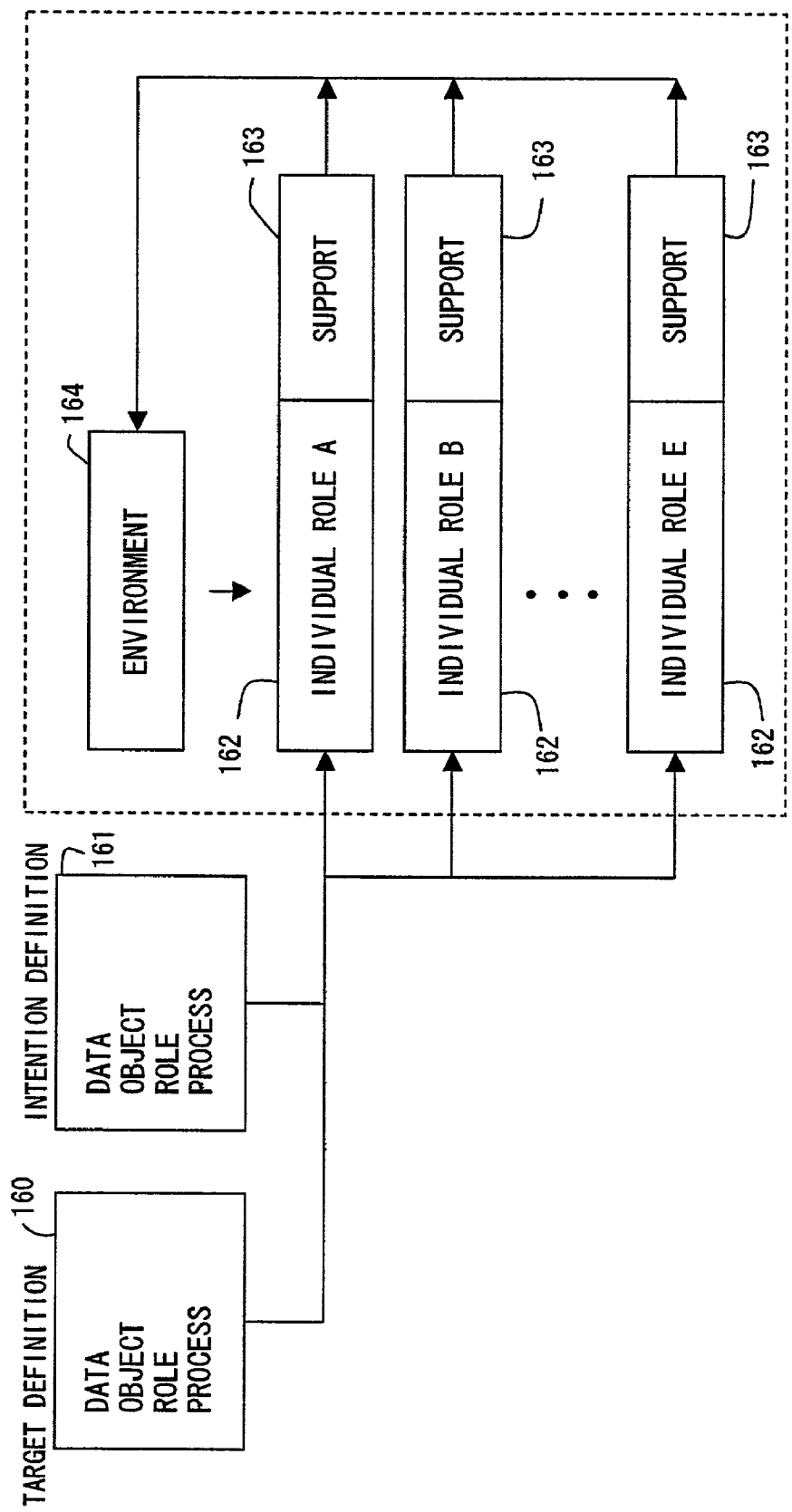
FIG. 26 shows the basic overall configuration of an intention-accomplishing information-processing device.

FIG. 26 shows the basic comprehensive configuration of an information processing method for accomplishing intention. In FIG. 26, first both a target definition 160 and an intention definition 161 are defined. The target of a target definition 160 is, for example, two cars running face-to-face, and the content of an intention definition 161 is to semi-automatically drive a car while each avoiding the collision. Each definition is formulated using a data model for providing a format, such as a template and the like, which is described later, an object model provided in the form of a noun object, a verb object and an object network, a role model expressed as an aggregate of a plurality of object networks as described with reference to FIG. 17 and a process model representing integrated multiple roles for performing a cooperative process.

Based on the contents of these target definition 160 and intention definition 161, a process for accomplishing intention is performed by both a plurality of individual roles 162 and supporting roles 163 for supporting each individual role. However, each supporting role 163, for example, detects features by observing an environment 164, and provides the features as constraint data for each individual role 162.

The hierarchical structure of an object network in this preferred embodiment is described. The hierarchical structure of the object network in this preferred embodiment is composed of four models: a data model, an object model, a role model and a process model. An expert plans and proposes a service is planned based on such a hierarchical structure. Such a service is provided, for example, by a user's request. However, it is assumed that a user does not know the attributes of the service.

First, the attribute structure of a data model, which is positioned lowest in rank in the hierarchical structure, is planned, for example, as the template shown in FIG. 12, and is inputted to the kernel of the WELL system. The input format is a list format for data. The kernel sets a process request in a work area for providing a service in connection with event drive and also designates a cell position in the template where data definition is required, by data drive.

Next, an object model is categorized into three types: a format model, a feature model and object network model. A format model expresses the patterns of a noun object and verb object as formats. For example, the "point" shown in FIG. 4A or 4B and the like is a format model.

For the noun model, a common noun, a proper noun and a generic noun obtained by aggregating common nouns can be used. In an object network, a common noun is usually used as a noun, an expert expresses a template in a data model using a list structure and the template is stored in a WELL kernel. At this stage, a common noun has the attribute of an indefinite article "a". For example, if a user designates a common noun by event drive, data definition preparatory work is performed. Then, for example, if the user performs data definition work in response to the data drive of the system, the common noun is converted into a proper noun with the attribute of a definite article "the".

A verb object as a format model takes a format pairing with a noun object. For example, a noun object and a verb object take the relationship between a subject and a predicate. Both verb service provision preparation and the service provision are conducted in the course of the provision process of the object network.

Figure 27:
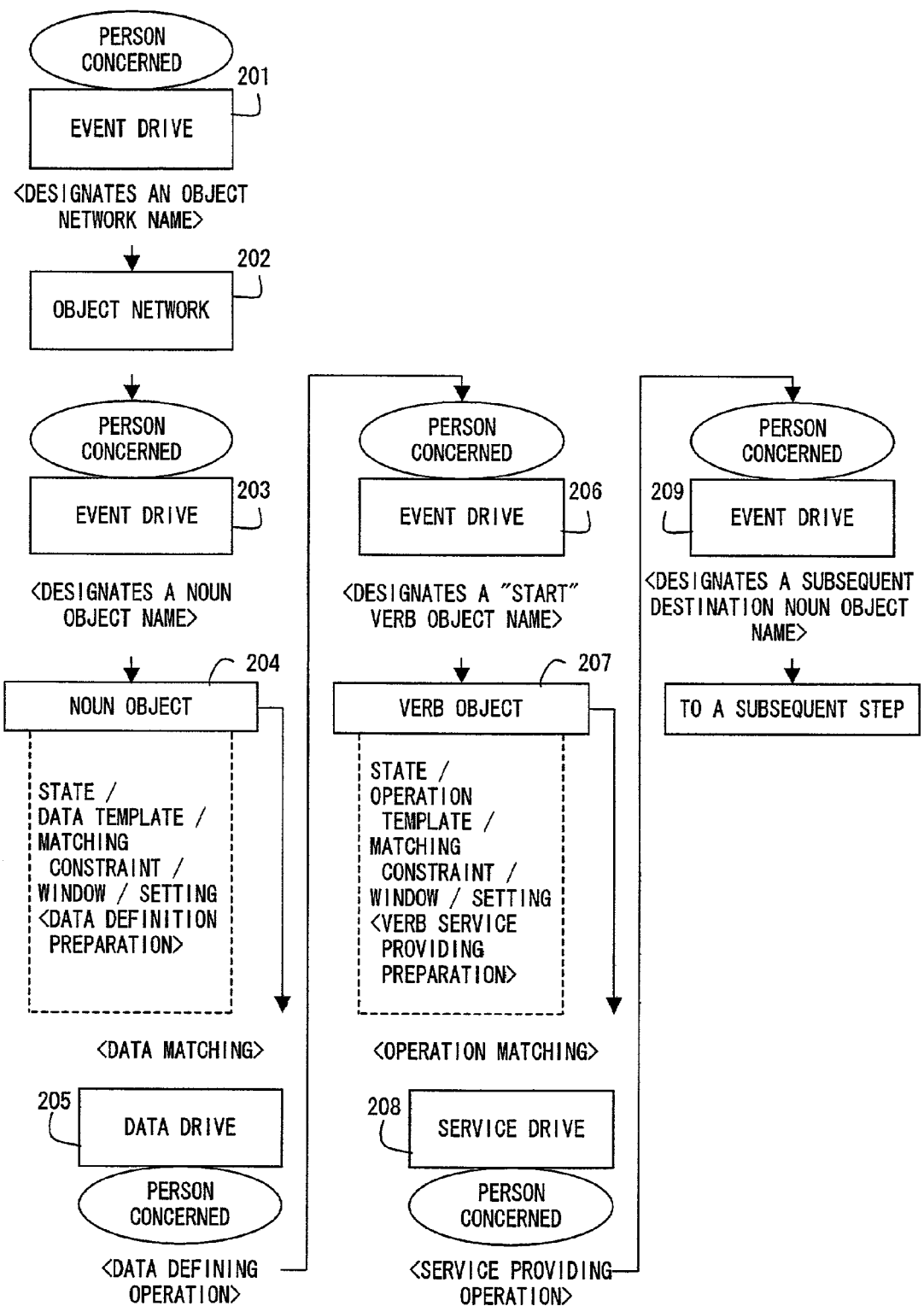
FIG. 27 shows the user's process of an object network.

FIG. 27 shows a user process against an object network. In FIG. 27, for example, a person concerned as a user designates the name of an object network 202 by event drive 201, and then the person concerned further designates the name of a noun object 204 in the object network 202 by event drive 203.

The data matching of the designated noun object is checked by the system. For example, if there are undefined data, the system requests the person concerned that should define data to perform data definition by data drive.

If the person concerned defines the undefined data and the person, for example, a user, further designates the name of a verb object by event drive, the object is pointed and an instruction to start is issued to the system. The system checks the operation matching in response to this instruction and performs service drive 208 for providing a necessary service as event drive for a person concerned that executes the service. Then, the person concerned provides the service.

Then, for example, the person concerned as a user designates the name of a noun object to be a subsequent address by event drive 209 and continues subsequent processes.

Of object models, a feature model expresses features, such as a "color point" that composes an object network for painting and the like, based on the attribute value of a noun object and is provided with constraints depending on an environment.

For example, when the WELL kernel requests another server, such as a specific role server to provide a service related to a position where the content of a matching constraint item in the template structure of an object by event drive, the server requests data for specifying a feature model by data drive. This process corresponds to communications between a plurality of servers and is one of the duties of the WELL kernel.

Then, the object network is stored in a work area managed by the WELL kernel as graphic structure where the name of a noun object inputted to the template as a data model and the name of a verb object are used as a node and a branch, respectively, and is displayed on the common platform. Thus, an expert must express the noun and verb objects that are expressed as format and feature models, respectively, in a specification format and must express noun and verb objects in a graphic structure in such a way that the noun and verb objects can be executed. For this reason, a graphic structure editor for describing a graphic structure and displaying the graphic structure on the common platform becomes necessary as tools.

If an object is an abstract noun, both an object network for embodying the abstraction and an aggregate of data for providing the abstraction are needed. Thus, a mechanism related to a process model, which is described later, is needed. An object network model has the name of a network as a header and can be referenced by the name. Alternatively, an object network model can be referenced by providing a function to index noun and verb objects as its constituent elements.

A role model constitutes the third model in the hierarchical structure of an object network. The role model corresponds to the roll function described with reference to FIGS. 20 through 22 and expresses a content to be processed in an environment by a person concerned as an aggregate of a plurality of object networks.

Therefore, the role model has a role name and can be referenced by the name. Furthermore, a matching constraint item name can be attached and retrieving using the item name can also reference the role model.

A role expresses a fact to be executed by an individual person concerned and relates to an environment surrounding the person. Therefore, a content to be processed varies depending on the change of an environment. Specifically, the structure of an object network and the like must be appropriately modified depending on an environment.

Figure 28:
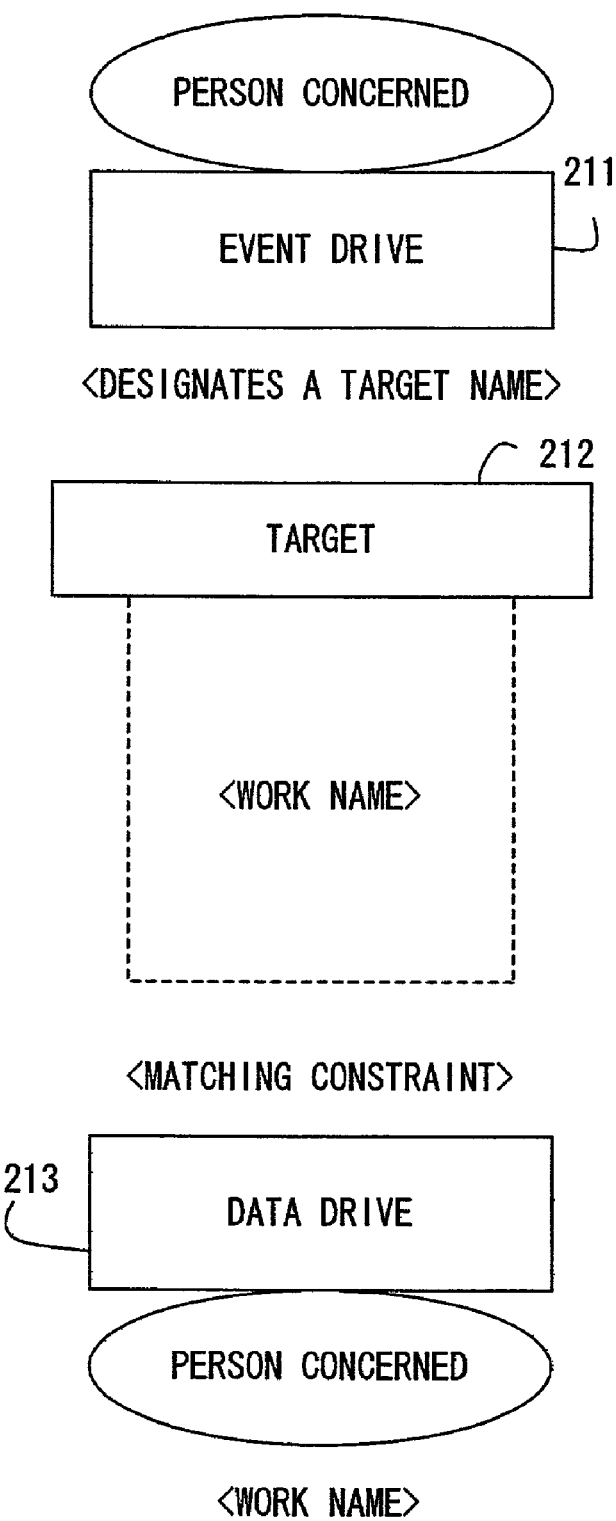
FIG. 28 shows the relationship between a person concerned and a drive system related to a matching constraint.

For this reason, a matching constraint item is used. The content of a matching constraint item is described as the cell content of a template that is defined as a data model corresponding to a noun object or verb object in an object network. As shown in FIG. 28, in the case of a noun object, the content is data definition preparation. In the case of a verb object, an attribute item related to the verb service provision preparatory work is defined in the object network and a person concerned, for example, a user, handles the attribute item by a drive method corresponding to the work name.

FIG. 28 shows the relationship between a person concerned and a drive system related to such a matching constraint. In FIG. 28, a person concerned designates, for example, the name of a noun object as a target name and instructs the WELL system to perform a process as event drive 211. The Well kernel handles work with the work name related to items that are described in the template of an object with a target name 212 and verifies matching constraints. Then, the WELL system instructs a person concerned that do work by data drive 213 to do work with the work name through the common platform.

For example, the communications function described with reference to FIG. 22 uses the matching constraint item that is defined and embedded in an object by an expert in a joint operation with an object network to be processed in conjunction with the matching constraint item of another object that is the process result of a supporting role function to recognize the constraint feature item of environment data.

Figure 29:
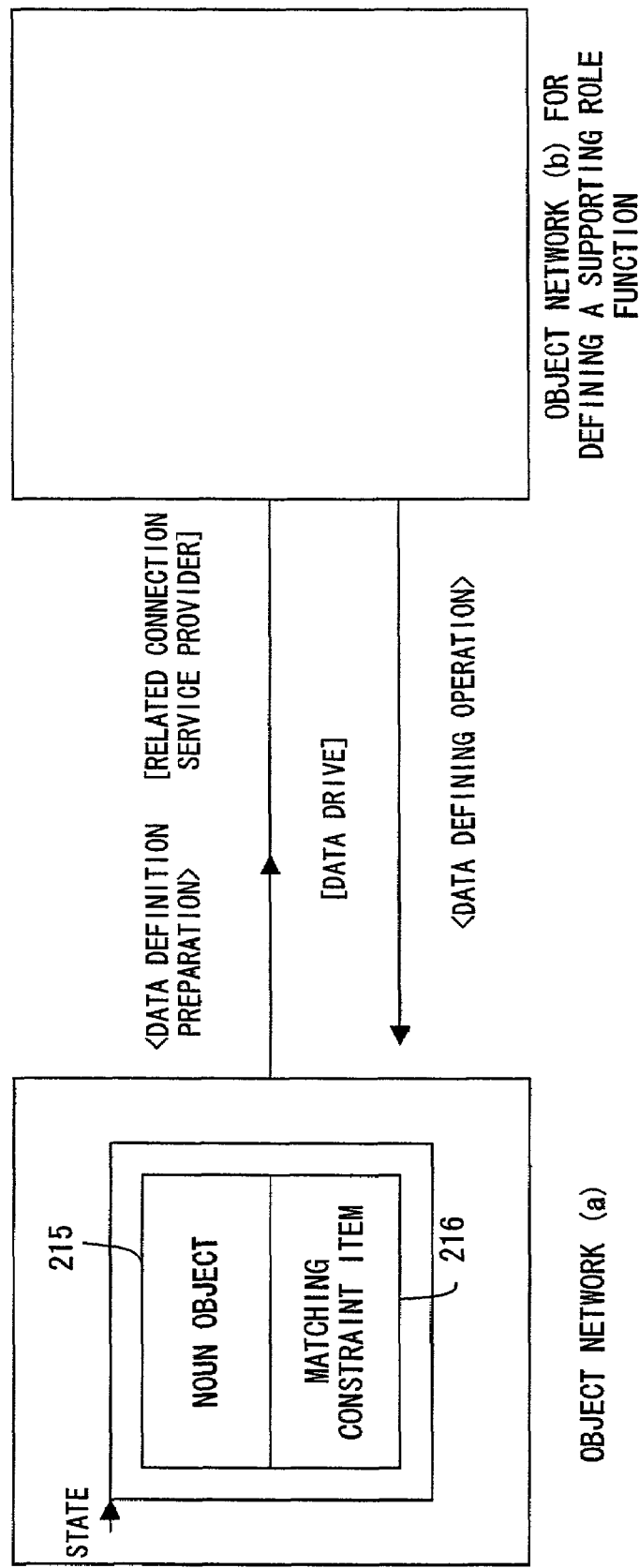
FIG. 29 shows the associated operation of an individual object network in a role function.
Figure 30:
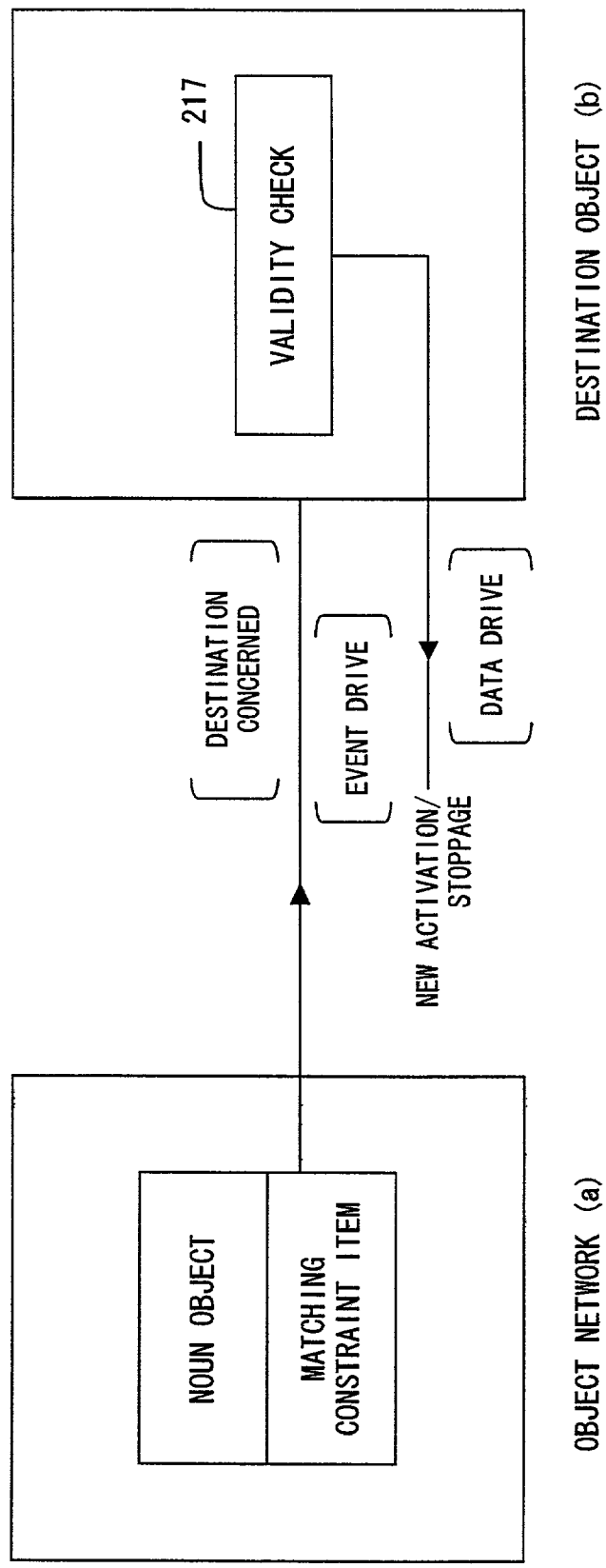
FIG. 30 shows the validity check operation of a matching constraint item.
Figure 31:
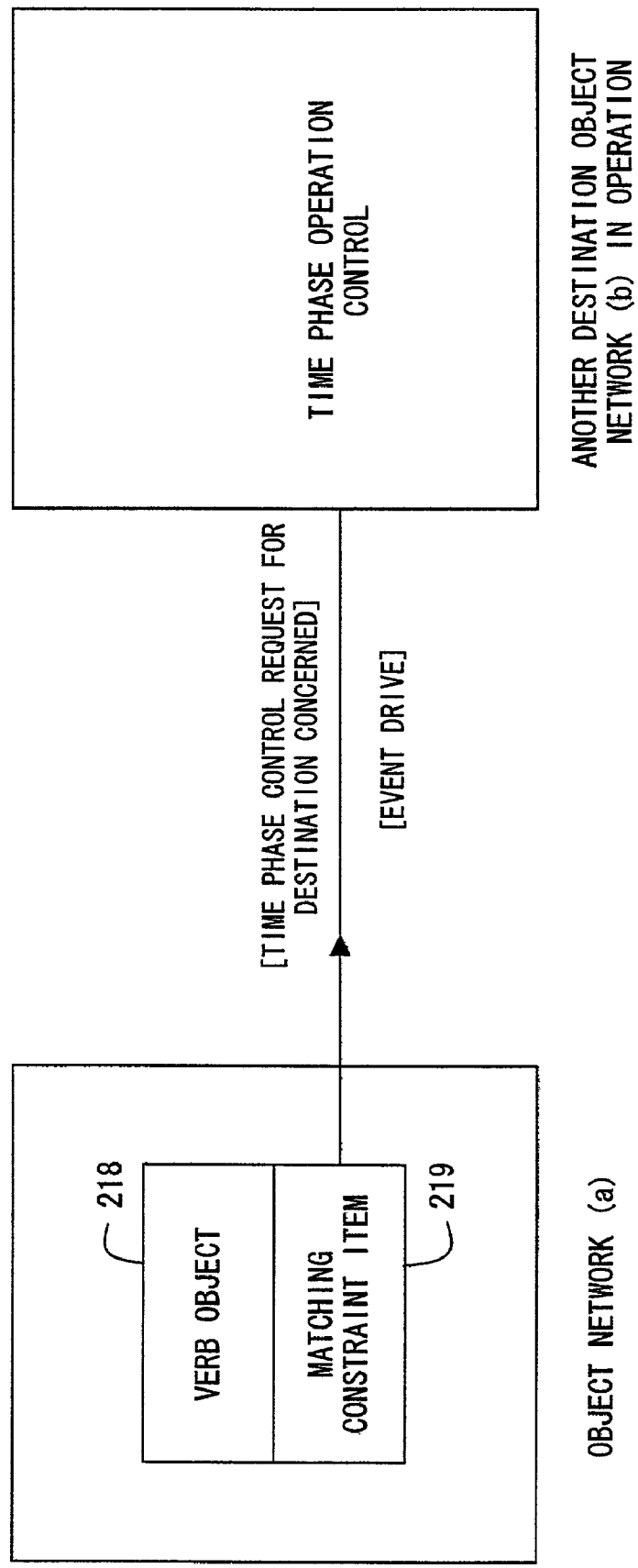
FIG. 31 shows the time-phase operation control of a plurality of object networks in a role function.

FIGS. 29 through 31 show the related operation of an individual object network in such a role function. In FIG. 29, data definition preparation is instructed for a person concerned that provides the service of a data content required in relation to a matching constraint item 216 that is attached to a name object 215 in the currently processed object network (a), that is, an object network (b) for defining the supporting role function as the service provider of related connections by data drive from the object network, for example, as a work request to define undefined data in a template. Then, the object network (b) performs the data definition according to the instruction. This means that data provision is requested of another person concerned by data drive.

FIG. 30 shows the validity check operation of a matching constraint item. If the data content of the matching constraint item defined in FIG. 29 includes information required for the data to transfer its control to a destination object as another object network (b) in the role function, the destination object (b) side must check the validity.

Thus, the object network (a) requests a destination concerned, that is, the destination object network (b) to check the validity. The destination object network (b) side performs a validity check 217 depending on the name of a destination object network or a destination noun object or the content of a validity verb, which is described later. If, for example, a destination concerned side intentionally judges that new data definition and the like is needed, the destination concerned requests for the start/stoppage of such a new operation by data drive in order to obtain necessary data. Thus, this enables the dynamic change of a role function depending on the change of environmental conditions.

FIG. 31 shows the time phase operation control of a plurality of object networks in a role function. As a role function, sometimes time phase control, such as a synchronous process, parallel process, continuous process, stoppage process, re-start process and the like, is required among the plurality of object networks. Thus, for example, a time phase control request for a destination concerned is issued to another object network (b) that requires a synchronous process as event drive depending on the data content of a matching constraint item 219 that is defined for a verb object 218, and the object network (b) side exercises control over the time phase operation.

A process model is positioned highest in rank in the object hierarchical structure as the fourth model. This model defines a dynamic process where a plurality of roles are cooperatively played as a set of processes and implements the integrated performance of a variety of roles. This dynamic process is basically implemented by two drive methods: event drive and data drive.

To implement a service expressed by a process model, the cooperation process of a variety of roles is performed using communications between a client and a server or between roles. Tools for implementing such communications are event drive and data drive.

A process model conducts the start/stoppage of such a process depending on the dynamic change of a system environment and the like. In a process model, the name of each process is defined, each process has a hierarchical structure and if a process has a child process, the child process also has a name. Thus, any process can be referenced by sequentially following its name.

The definitions of the specifications of a data model, object model, role model and process model with such a hierarchical structure are described below. The specifications of a data model, object model and role model are basically defined by a static declarative method.

Figure 33:
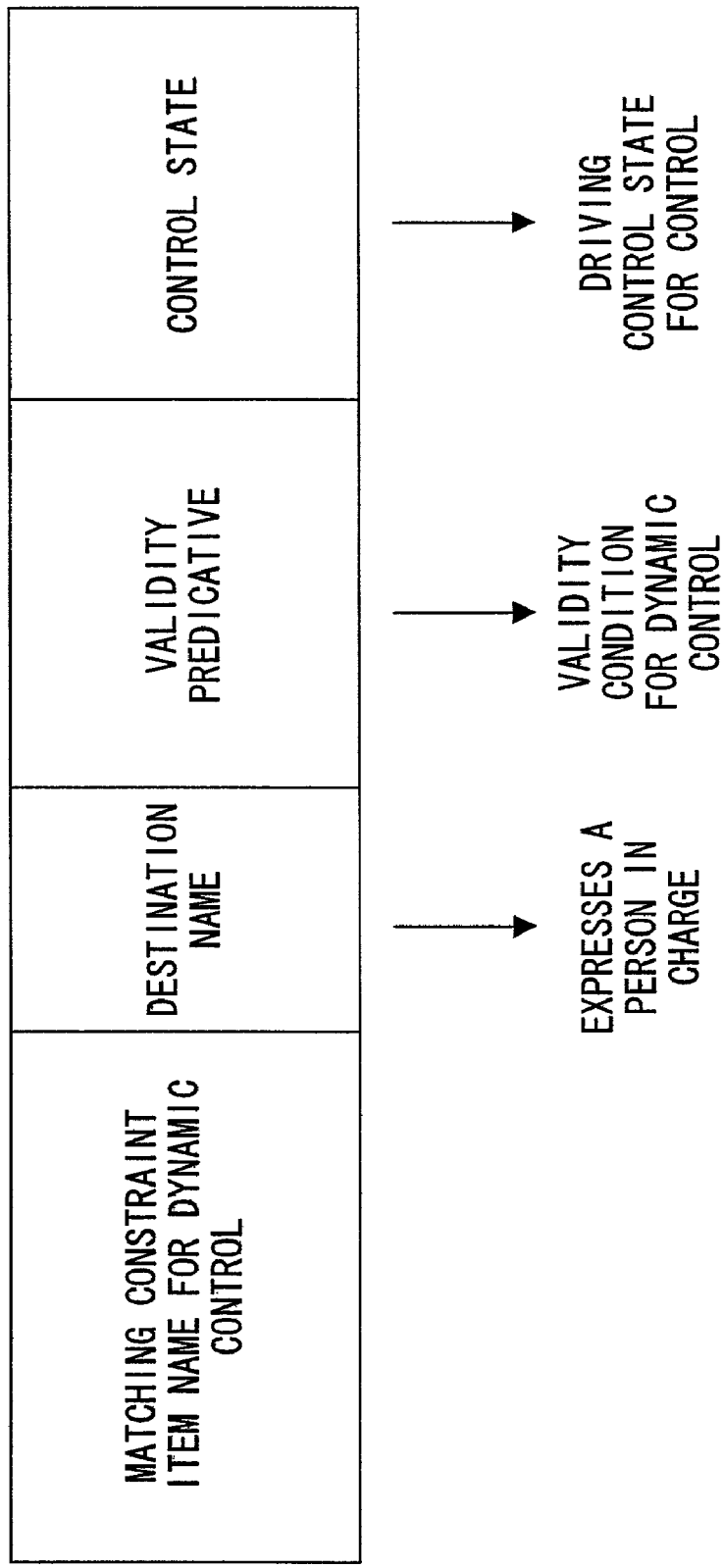
FIG. 33 shows the content of a template for dynamically controlling a verb-object.

An object network is defined by a graphic structure composed of a noun object as a node and a verb object as a branch, as described earlier. FIG. 33 shows the template of an object. As the cell content of a template, four items of a name, state display, a data content and a matching constraint item are defined. As for a genetic object, having an object name as a parameter for specifying a data content forms the hierarchical structure link of an object network. A hierarchical parameter can be sequentially specified by a matching constraint item.

The basic data content of a noun object consists of numeric values and symbols and the like, as specific primitive data, and abstract names, such as object names as a parameter for specifying described earlier, and the like.

The most specific data content of a verb object is a function name. A function name has to be able to be referenced as a viable algorithm.

In a function too, there is a conversion process from the abstract into the specific like a noun object content, and its structure is digitized. Generally the structure is implemented in such a way that a specific role server can conduct the conversion through the intermediation of an agent role server or is digitized so that the provision request can be made by event drive.

In the designing/planning of a process, a process is planned that is performed by a plurality of role functions in relation to matching constraint items defined by verb objects in the plurality of role functions. As described above with reference to FIG. 31, as the control method at the time, control based on time phase constraints, such as a continuous process, a synchronous process, a stoppage process, a re-start process and the like, are performed.

Figure 32:
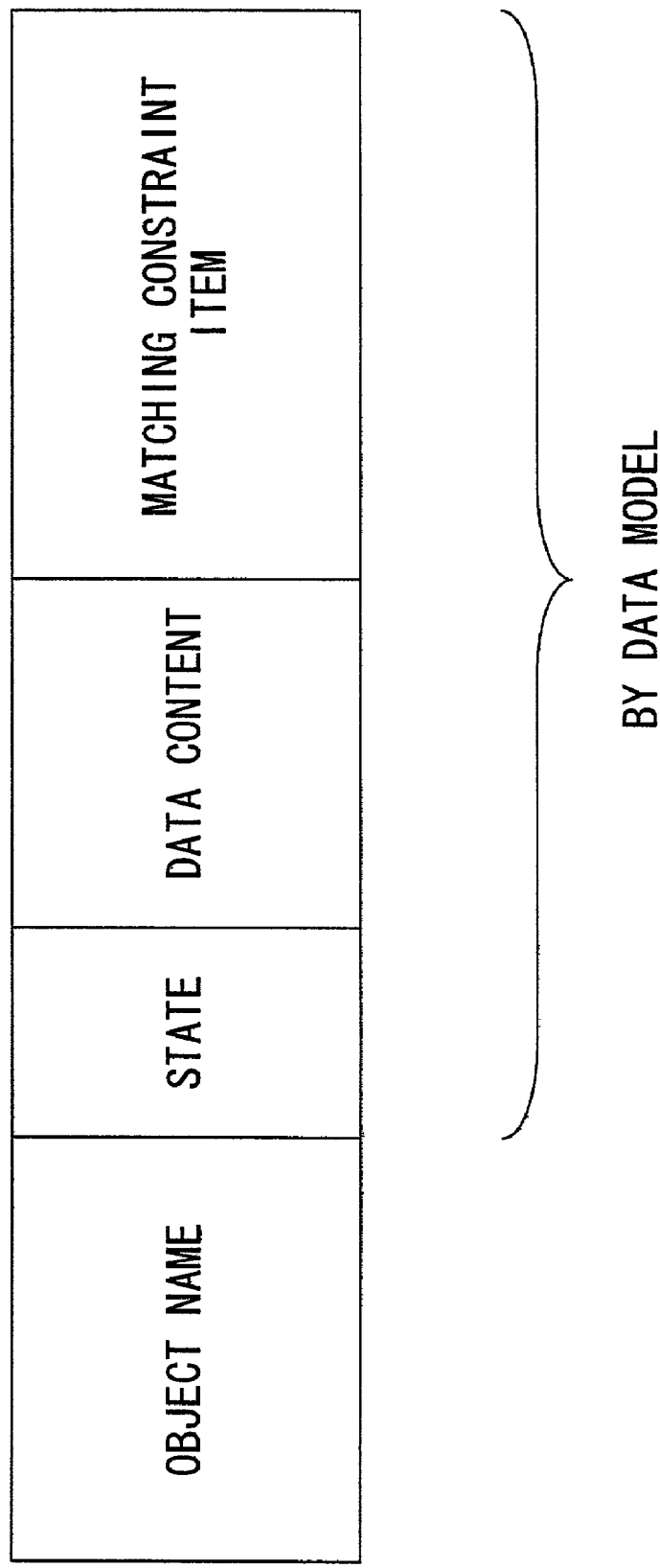
FIG. 32 shows the cell content of the template of an object.

FIG. 33 shows the contents of a template for dynamically controlling a verb object in this way and shows the detailed cell contents of the matching constraint item shown in FIG. 32. In FIG. 32, a destination name means a person in charge. A validity predicative is paired with a noun object as a subject and indicates the validity conditions of synchronous control in a dynamically selected verb object. A control state indicates the viability of services for a person concerned in the current state of the person concerned in response to a process request for the person concerned.

Next, the process of intention expression is described in more detail. FIG. 34 shows the definition structure of intention. First, as the first step, both a target area name and the attribute structure of the target area are defined. In the example of two cars described earlier, face-to-face traffic is a target area, and the attribute structure of the target area is data on whether the road is a privileged way, how many lanes does the road have and the like.

In this first step, to judge whether the person concerned is authorized to accomplish his/her intention on a target, a validity check is conducted for the attribute data of a target area of the concerned person by interaction with a service system. For example, for a person concerned to accomplish his/her intention to drive a car on a specific road, a qualification for safe driving is one access right of road conditions. This can be considered to be an access right in a social system to enable a plurality of drivers to drive cars without an accident.

To conduct Internet communications, a person concerned must have both an authorized terminal and a communications line, and a specific access is permitted by interaction with a system, using data, including codes for obtaining authentication for his/her qualification, such as an account number, password and the like.

Specifically, if the person concerned plans to accomplish his/her intention on a target area and performs the "designation of a target name" by event drive as shown in FIG. 28, the service system starts the process of an object network corresponding to a "work name". It is the first step forward the insurance of security to verify "matching constraints" attached to an object corresponding to the "work name" and to perform the "data drive" of item data needed for security at the time.

In the definition structure of intention shown in FIG. 34, following the definition of a target area, generic intention corresponding to a generic object network is sequentially converted into specific intention corresponding to a specific network. If the validity of conditions described in matching constraint items attached to a generic or specific noun object are checked in the flow, the service system requests the person concerned to perform "data drive". Then, when necessary data or a necessary operation is obtained, a corresponding security operation is activated.

Specifically, as the second step, the nature structure of intention, that is, which the intention is, independent, shared or conflicting, the operability structure of intention, such as the operable range of a brake or a steering wheel used to avoid collision, the target of intention (object function), such as the avoidance of collision, and the like are defined. In this step, a template for an operability structure is also set as an intention definition preparatory process for support.

Then, as the definition of supporting structure for intention accomplishment, the specification of a partial recognition function is determined in order to extract the feature structure of the environment data of an object, such as whether the road has a curve.

Lastly, a strategy and tactics are defined. A strategy is the generic constraint on the operation for accomplishing intention, and constraints on an environment and a physical operation, operations for attaining a goal and the like are defined.

Then, tactics is determined. Tactics is the embodiment of the generic nature of an operation as a strategy. If a user's instruction for an operation is received by data drive, generic nature is converted into specific nature.

Figure 35:
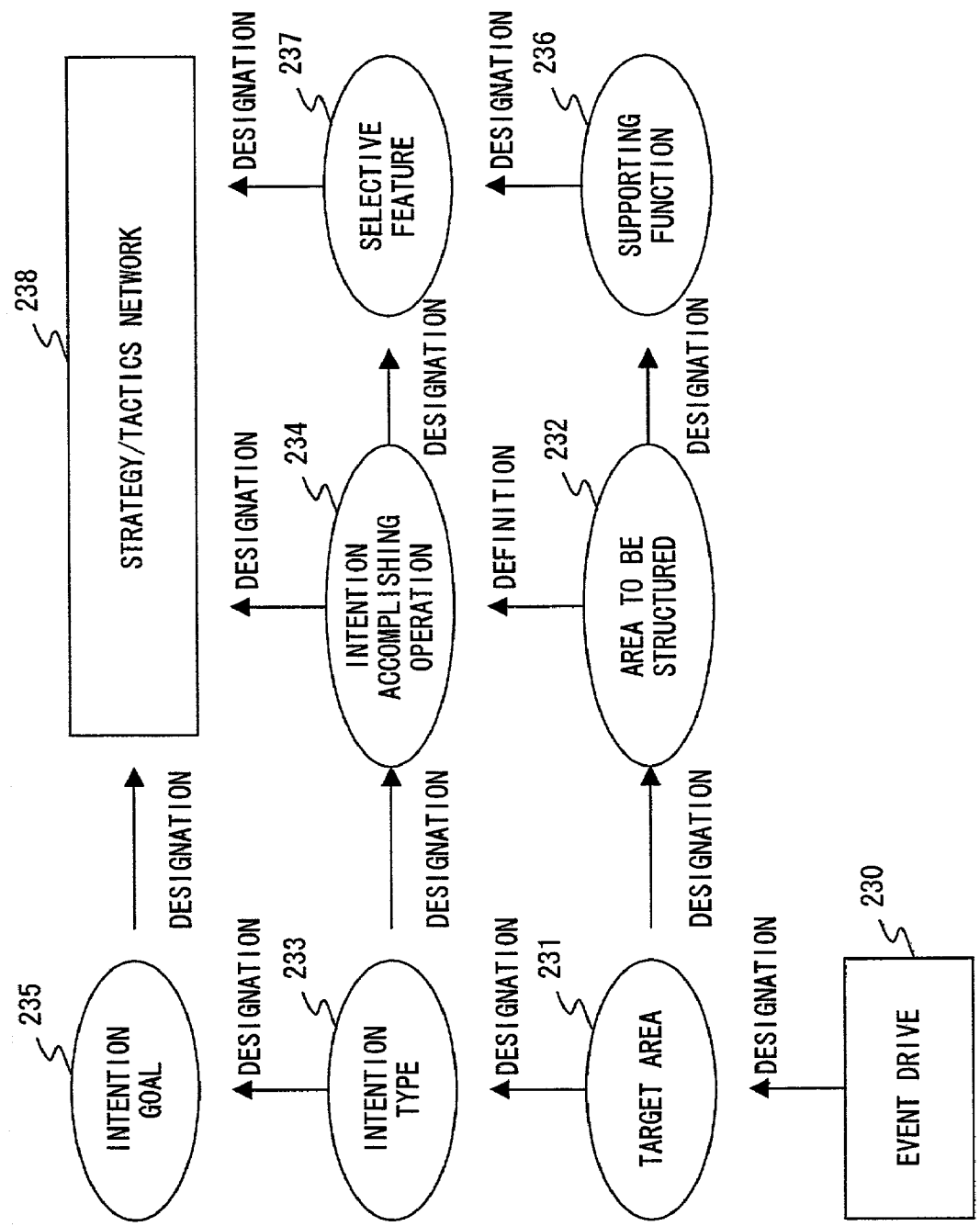
FIG. 35 shows the overall configuration of a generic object network for accomplishing intention.

FIG. 35 shows the overall configuration of a generic object network for determining a strategy and tactics in order to finally accomplish intention. As shown in FIG. 34, the target area of intention accomplishment is a generic noun object. When a target area suitable for the intention from a list that is displayed on a common platform by "event drive" 230 is designated, the targeted intention is accomplished according to the flow in the network shown in FIG. 35. In this case, first, in the definition structure of intention, including the attribute structure of a target area, generic items are sequentially specified, as described with reference to FIG. 34.

In FIG. 35, first, a person concerned, for example a client as a user, starts without any intention, and then designates his/her interest target, that is, a target area 231. At this moment, since no specific target area is not defined, the system displays the list of available target areas on a common platform by a data drive system, and the attribute structure of the target area 231 designated by the user, that is, a structured target area 232 is defined. If face-to-face traffic is selected as the target area 231, for example, two cars are defined as the attributes of the structured target area 232.

Then, if the user designates intention type 233 on an operation window as event drive, the system side makes an inquiry about which is the intention is, independent/shared/conflicting, as data drive, and the user designates one of "independent/shared/conflicting" intention on a data window. In this example, shared intention is selected.

If both the intention type 233 and structured target area 232 supplements undefined data in a template, the operable ranges of an accelerator, brake and steering wheel described earlier are determined to be the content of the operability structure of intention, that is, an intention implementing operation 234. Then, intention to cooperatively avoid collision is defined as the goal of intention 235. However, as a specific goal, the intention is expressed as the passing each other of two cars at the minimum allowable distance, and the content is displayed on a message window as a message from the system.

To accomplish intention, environment data are also needed as described earlier. Specifically, a role for extracting a feature amount from environment data and supporting the determination of an operation amount is needed. The user selects a supporting function 236 as this supporting role function suitable for the target area. For example, in the case of the face-to-face traffic, a GPS road map for indicating the running direction of a car, an opposite-car running prediction camera system and the like are used for that purpose. For example, a supporting role function to display both the enlarged road map and the running data of the opposite car on the screen of a GPS using vector, and the specifications of supporting structures for intention accomplishment and a recognition function are defined. Data about the running characteristic of the two cars that are not defined in a template structure are assigned in data drive by a selective feature 237.

A controllable operation amount is defined with complaints by the intention implementing operation 234, and in the case of face-to-face traffic, the handling amount that is available at the current running speed of a car is added as one constraint. Then, when data are inputted from an intention goal 235, an intention implementing operation 234 and a selective feature 237, a strategy/tactics network 238 determines a strategy/tactics.

So far, the object network, extensible WELL system, an intention expression system, hierarchical structures of an object and the like, which are the premises of the present invention, have been described. Next, the security system of a service provision system, which is the target of the present invention, is described in more detail.

First, the general security of a WELL system is described. This security problem includes the security problem of the WELL system itself, in particular a WELL kernel, and the security problem of an application field. The security problems of the application field are classified into two problems: a security problem at an expert level of planning an application and designing an object network and a security problem at a level of an object network that is operated by a user.

There is also a risk problem due to the environmental conditions of hardware. As the problem of a WELL system itself, there is a problem on how to cope with the destruction of a kernel due to the mischief of a hacker. Furthermore, there is the security problem of communications function related to the specification of the WELL system, such as an authentication problem, including the prevention of illegal access and illegal invasion.

Since in the execution control part of the specification of the WELL system, an object network plays a central role, matching constraints influencing both the event drive and data drive operation related to the operation of an object network perform control of security. Specifically, in this preferred embodiment, the matching constraints are set with the main objective of guaranteeing the right process of the intention of related persons.

As persons related to the system, there are an expert that has the duty of specifying services to be provided by the system and a user that intends to receive services implemented by the system. In the case of either of the persons concerned, it is important to hierarchically structure intention on a service and to specify the overall security structure.

In this case, there is a sequential intention series for sequentially fulfill specific service requests as the intention of a client. If it is found that there is no intention matching in the execution process, a process for coping with the lack of matching is performed. For example, a data value needed for a service to be provided by the system is requested of an appropriate person concerned in relation to the matching constraints. Such a process includes a variety of types ranging from the stoppage of services to the recommendation of appropriate data.

Although the execution process flow of the system is stipulated by the dynamic change of an object and is controlled by the operations of both event drive and data drive, many security problems occur in connection with such operations.

Of such security problems, in particular, as problems related to a network, there are a variety of problems, such as an access right, a copyright, an authentication function, a protocol/cipher/digital signature/waterwork/time stamp in security communications and the like. However, in particular, the identification of the name of a person concerned in the network is important.

Access management, such as security, a measure to counter virus and the like, is the first gateway in the case where a client as a person concerned makes a request for providing services to the system, and here the person concerned attaches an attribute structure related to the execution request of a function. If the content of the attribute structure related to the function requested by the client is not sufficient, the system requests a necessary data value to the client. For example, in the case of communications services, first, agreement on data about communications attributes between a client and the system is needed. Such an operation is described later with reference to FIGS. 37 and 38.

Figure 36:
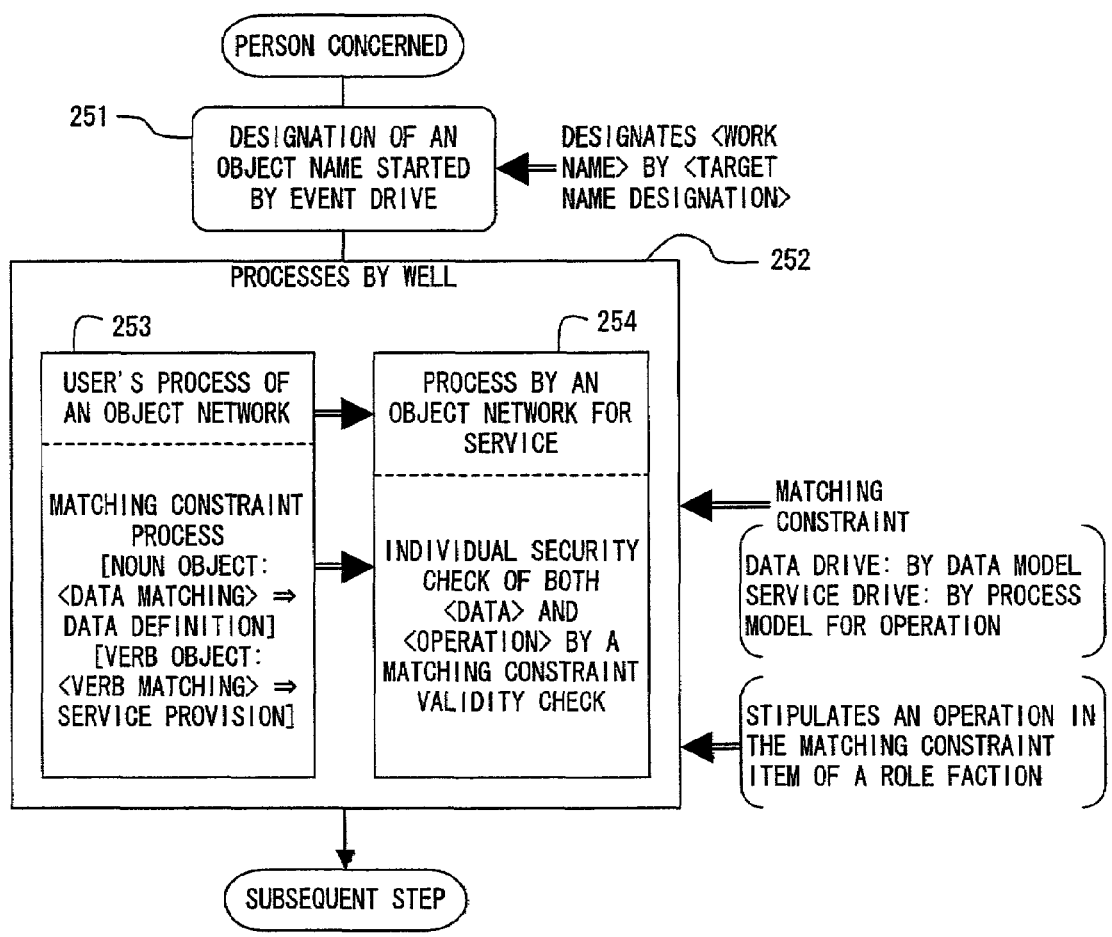
FIG. 36 shows a basic security system in a service provision system.

FIG. 36 shows the basic security system of the service provision system in the preferred embodiment of the present invention. In FIG. 36, if a person concerned, for example, a client, designates an object name in event drive (251), the WELL system executes the job (252), which corresponds to the job shown in FIG. 27. In this execution by the WELL 252, a "work name" is specified by a "target name designation", as described with reference to FIG. 28, and "matching constraints" are checked.

The execution by the WELL system comprises the user process of an object network 253 and the execution process 254 by an object network for service 254. In the data drive of these processes, a data model checks the matching constraints, as described with reference to FIG. 32. In the service drive for providing services as event drive, the matching constraints are checked by a process model for operation, as described with reference to FIG. 33. As for a matching constraint item in a role function, matching constraints for stipulating an operation are checked, as described with reference to FIGS. 29 through 31.

In the user process of an object network 253, as for a noun object, "data matching" is checked, and a data definition operation is performed as a matching constraint process. As for a verb object, "operation matching" is checked, and a service provision operation is performed.

In the execution process by an object network for service 254, the individual security of both the "data" and "operation" are checked in order to check the validity of the matching constraints.

Figure 37:
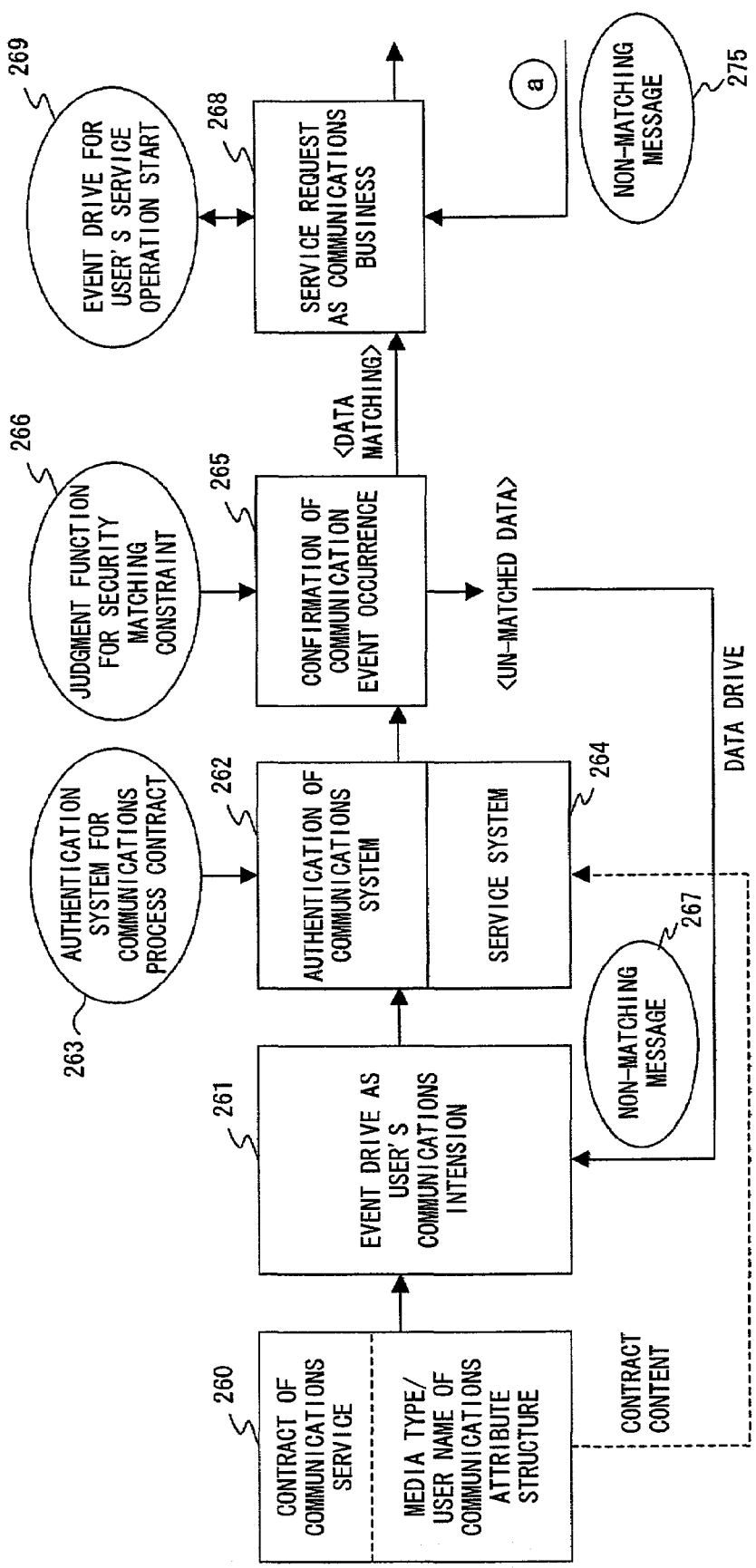
FIG. 37 shows a security system using communications service as an example (No. 1)

The security system in the preferred embodiment is described below using a communication service as an example and with reference to FIGS. 37 and 38. In FIG. 37, if first, in the contract of communication services 260, an agreement is made using a media type, such as a telephone line type, PHS, a communications attribute structure, the identification name of a person concerned of use and the like, and then an event drive operation 261 is performed in order to express the intention to communicate of the person concerned of use, the authentication operation of a communications system 262 is performed. Although this authentication operation is performed by the authentication system for communications process contract 263, the authentication operation is supported by a service system 264 using the content of the communications service contract 260, as required.

Then, in the occurrence confirmation of communication event 265, the check function of the matching constraint 266 checks data matching. If "data non-matching" is detected, a non-matching message 267 is issued in response to the event drive operation as intention to communicate of a person concerned of use 261. If "data matching" is confirmed, a service request as communications business 268 is issued in relation to the event drive for the service operation start of a person concerned of use 269.

Figure 38:
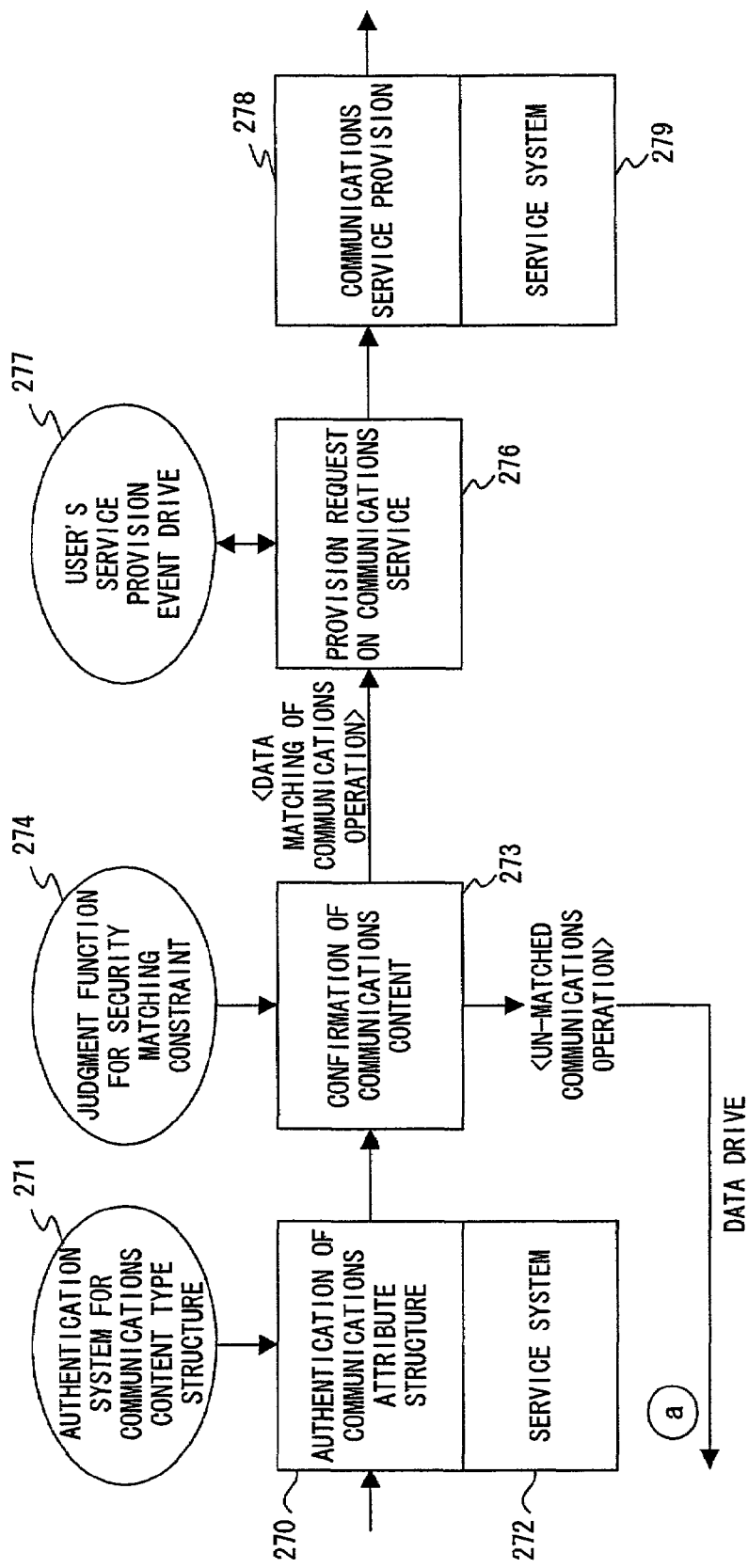
FIG. 38 shows a security system using communications service as an example (No. 2)

FIG. 38 shows a communications service provision process following the service request as communications business 268 shown in FIG. 37. In FIG. 37, in response to the service request as communications business 268, the authentication operation of a communications attribute structure 270 is performed. Although this authentication operation is performed by the authentication system for communications content-type structure 271, the operation is also supported by a service system 272, as required.

Then, the confirmation of a communications content structure 273 is made. This is a content confirmation process. For example, in this process it is judged that full communication content is written in capital letters. The confirmation is made by the check function of matching constraints 274. If the "non-matching of a communications operation" is detected, in response to the service request as communications business 268 shown in FIG. 37, a non-matching message 275 is issued. This non-matching message is the non-matching message on a communications content structure.

If the "non-matching of a communications operation" is confirmed by the confirmation of a communications content structure 273, the provision request 276 of a communications service is fulfilled. This provision request responds to the event drive as a service provision process of a person concerned of use 277, and in response to this provision request 276, a communications service is provided (278). A service system 279 supports this service provision.

As described earlier, in this preferred embodiment, an object network is composed of four layers: a data model an object model, a role model and a process model. As for data, the combination and succession relation of the template of an object determine the hierarchical relationship between objects.

As for the matching constraint item of the intention between persons concerned, if, for example, a person concerned accesses a noun object, the validity conditions of a data set stored in the template of the noun object when the noun object is accessed, is checked in relation to matching constraints attached to the noun object, and access control is exercised over the noun object.

Specifically, if matching constraints are met, interaction is conducted with a corresponding person concerned by "data drive" in order to obtain necessary data. If the matching constraints are not met, a person concerned that accesses the noun object is notified of the access non-permission and the reaction is waited for.

As for matching constraint items attached to a verb object, the validity of the matching constraints of a related data set in the provision preparation state of an operation corresponding to the object is checked in a layer for defining the verb object and managing the template.

As described above, each of a noun object and a verb object has a different hierarchical structure even if they have the same object name. For example, a common noun, "picture" is general, each "line" is sequentially defined by a name series of a point, a point sequence, a line segment and a line in the element network of the WELL system, a region segment and a region are defined by an aggregate of lines and an "outline" as the sketch of a picture is formed. Definitely modified items, such as a colored "picture" are located in these attribute structures and an element picture is plotted as a colored "region".

From the viewpoint of a template, a point has a template with (x, y) coordinates as a cell, while a color point has a detailed template structure as follows. (x, y, luminance, grad of luminance, chrominance vector)

As known from this example, in a hierarchical model adopted in the WELL system, a cell for storing the content of definite modification is added to the attribute structure of the template of a noun name or a verb name as a basic word. The process of such a template structure is performed, for example, by the name management function 32 in the name object management mechanism shown in FIG. 5, and a bundle structure, which begins with a basic word name and is generated by definite modification relation.

For example, if a picture is restricted, the restriction method of a cell picture and the restriction method of a textured picture are different. In this case, the bundle structure is generated in the template structure using the following classification method by modifiers (1) through (5).

(1) A noun object modified by a noun word for indicating usage. For example, in a cell picture, a cell in a texture is used as a usage name.

(2) A noun object obtained by definitely modifying a basic object after target noun designation. For example, a "textured picture" is a noun object with a definitive word, which indicates that a texture process is applied to a picture. For example, this is used as a high-level noun object generated as a result of the integration process between noun objects, such as a cell picture, a flow line and the like.

(3) A definite modifier, which has an attribute structure indicating a relationship with a target word. For example, in the case of "textured", a cell picture and a flow line are definite modifiers.

(4) A verb word indicating the relationship between the noun word from which an arrow mark starts in FIG. 3A and a noun word to be modified which is located at the end of the arrow, as an execution process content.

(5) A noun object modified by the series words of both a noun word and a modifier.

A noun object generated in this way can be further hierarchically structured by hierarchical modification. In this case, the same modifier can be used. To clarify the difference between words modified by the same modifier, a cell name is attached to the same object name depending on the environment in order to identify each word. There are a format model and a feature model as an object model of a noun object. The former restricts the structure of a template, and in the latter, a constraint corresponding to the environment is stipulated as a predicative, based on the attribute value of an object (cell content of the template).

Figure 39:
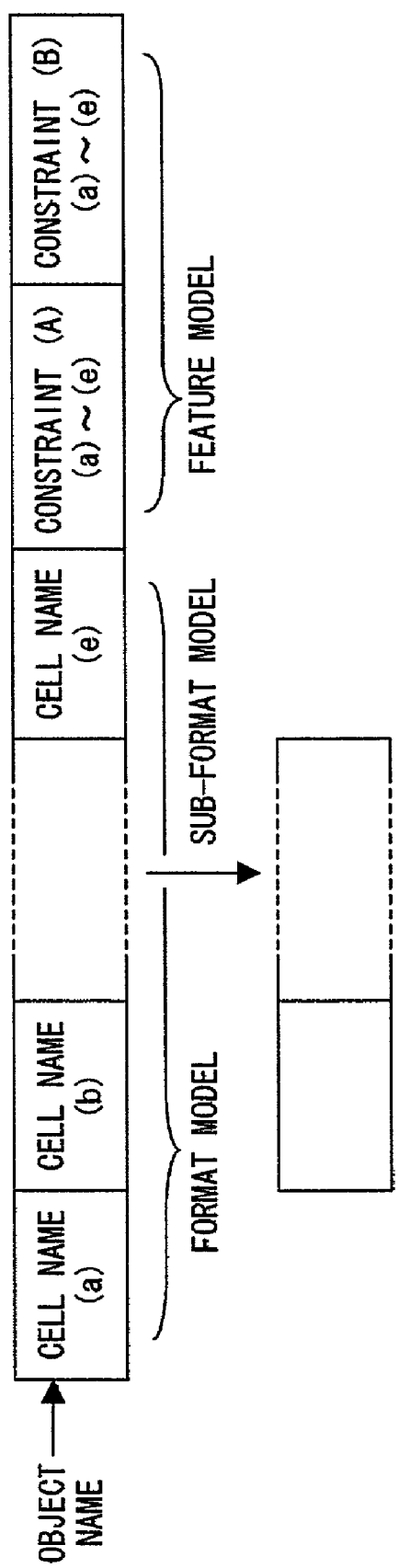
FIG. 39 shows how to express both a format model and a feature model in the template of an object.

FIG. 39 shows a cell structure as the expression model of both a format model and a feature model in a template of an object. In FIG. 39, cell names (a) through (e) are used when data are expressed as a list of cells and it is assumed that a link is established in that order. For example, if luminance is taken as the attribute of a specific point, a link, such as a coordinate value, luminance data and a luminance gradient is set based on the object name. A sub-format model corresponds to a link to a secondary tree structure as the sub-structure of a format model when an attribute structure is formed in a tree shape and has a structure composed of a cell name series. Furthermore, constraints (A) and (B) indicates matching constraint items as the features of environments A and B, respectively.

The noun word for indicating usage in the classification method (1) described earlier stipulates the template format of a target word as the format model shown in FIG. 39. In the classification method (2), a function to attach a necessary cell to a template is activated to definitely modify a noun object as a target word. In the classification method (3), since a necessary cell for a attribute structure already exists, an operation of requesting data for a person concerned attended by the system is performed as the intention of the system. As for a verb word in the classification method (4), the operation of a verb object that starts from a noun object group from which arrow begins and reaches the end word is performed in cooperation with a person concerned as the operation of a service item of the system.

By the operations related to the classification methods (1) through (4), series words in a modification relation as described in the classification method (5) are generated. As for these series words, as for words with the same name, words with the same meaning/content must be distinguished from different peculiar words. Using such a request as a constraint, sentence structure analysis is conducted on the structure of the series words and a bundle structure is generated.

Figure 40:
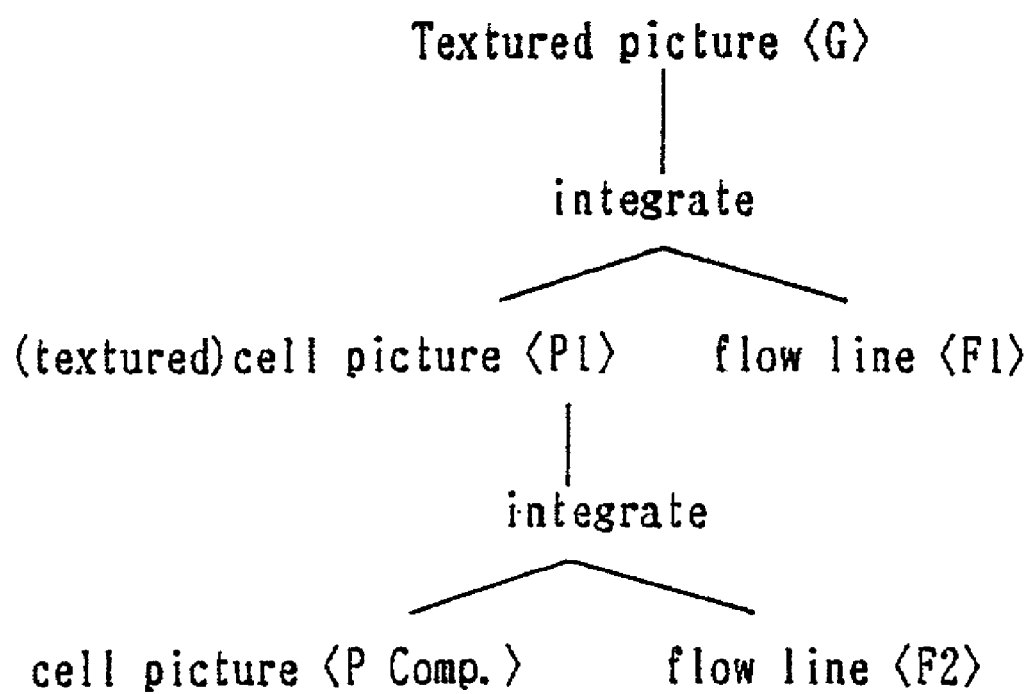
FIG. 40 shows the bundle structure of textured pictures.

FIG. 40 shows an example of a bundle structure. Although in a sentence format, this structure is expressed as follows, the network structure shown in FIG. 40 is easier to understand than the sentence format.

(Textured picture<G> integrates (cell picture<P1> integrates (cell picture<P Comp.>, flow line<F2>), flow line<F1>))

The bundle structure shown in FIG. 40 is related to the classification method by a modifier described earlier, and the usage of an object is stored in the cell name (a) as a modifier name directly connected to an object name in FIG. 39. To facilitate a client's reference, it is allowed to input symbols, such as G, F1 and the like, to a cell for convenience' sake. The validity check of the matching constraints of each word is hierarchically conducted from the bottom to the top based on the flow of the bundle structure shown in FIG. 40.

As described with reference to FIG. 40, the word structure of a noun object using a modifier follows the grammatical regulations of a quasi-natural language as one specification descriptive method of the software architecture of WELL. Therefore, sentence structure analysis can be easily made, and it is also true for the structure of the modifier of a verb object. Thus, the sentence structure analysis of a simple sentence composed of a noun object and a verb object can also be easily made.

Simple sentence structure analysis means that reciprocal conversion between a quasi-natural language as the specification descriptive method of WELL, a graphic structure and an inclusion logical expression can be easily made.

To ensure the security of a service system using this fact, as described with reference to FIGS. 32 and 33, matching constraint items as the attribute items of all objects to be used are defined as cells in a template, and by detecting the matching or non-matching of the matching constraint items of each object by a matching process function to check the validity of these matching constraint items, the bundle structure of validity can be obtained.

By extracting the result of a service provision process, the result of validity check and the problem points of the service request operation of a user as a client requesting the service provision using the validity bundle structure described above and making sentence structure analysis, countermeasures as a system can be determined.

Figure 41:
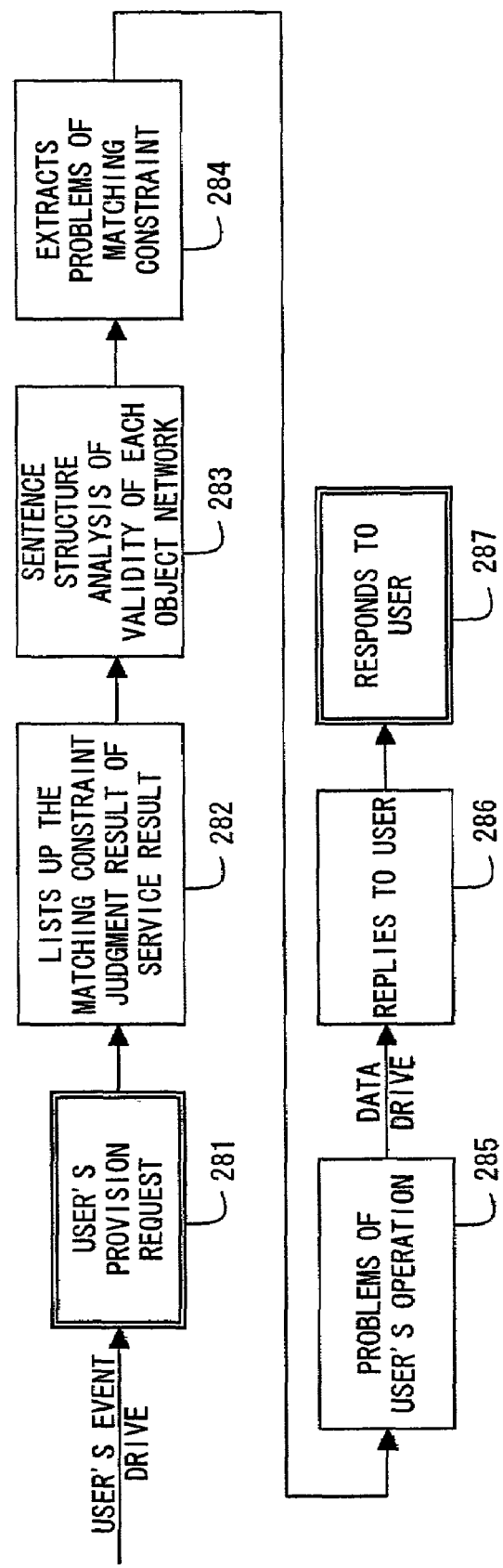
FIG. 41 shows both the analysis of the bundle structure of a matching constraint item and the user's response process.

FIG. 41 shows both such an analysis of the bundle structure of matching constraint items and the user's response process. In FIG. 41, first, a user's provision request 281 is issued by user's event drive, the check results of the matching constraints of an object after service provision are listed up (282), the sentence structure analysis of the validity of each object network 283 is made and the extraction of the problem points of the matching constraints 284 is conducted. Then, the problem points of a user operation 285 are designated as the content of a reply to the user 286 as data drive, and a response to the user 287 is made.

Figure 42:
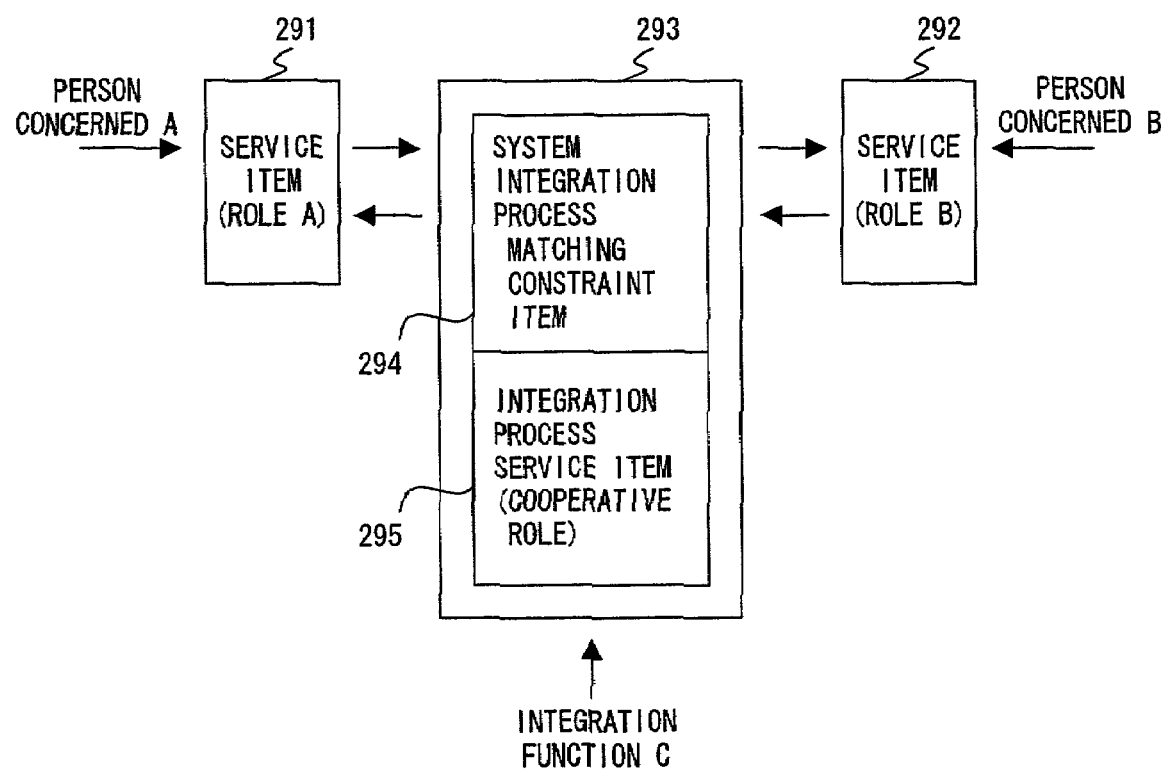
FIG. 42 shows an integration process function in an intention process system to which a plurality of persons concerned are related.

Next, the integration process function as the security method of an intention processing system in which a plurality of persons concerned are involved is described. FIG. 42 shows such an integration process function. In FIG. 42 it is assumed that there are two persons concerned A and B and the process result of service items of both the persons is adjusted by an integration process function C.

It is assumed that persons concerned A and B play a role A 291 and a role B 292, respectively, as a service item and the service processes of both the persons are matched by the integration process function C 293. The integration process function C 293 comprises a matching constraint item 294 as a system integration process and a service item as an integration process, that is, a cooperative role 295. It can also be considered that the constraints (A) and (B) shown in FIG. 39 indicate the conditions of persons concerned A and B.

In FIG. 42, each of persons concerned A and B can designate or refer to the content of a target object at the respective service item of persons concerned A and B. An access right to the content for modification is given only to a person that is authenticated as a person concerned in a system integration process matching constraint item 294. However, if a target object belongs only to an object network peculiar to one of the persons concerned, the person concerned can freely access the matching constraint item as an attribute of the target.

In FIG. 42, each of persons concerned A and B having respective service items performs a service provision process while ensuring security required by a matching constraint as the attribute structure of an object related to a service item in his/her charge. However, if each of persons concerned A and B performs in parallel a respective provision process, there is the possibility that there is contradiction to a cooperative parallel process from the viewpoint of the interface between roles as a cooperative parallel process. Thus, the results of the execution processes by two persons concerned A and B must be adjusted by the integration process function C 293.

Although, as described earlier, the data content of reciprocally related target objects can be designated and referenced by both the persons concerned A and B, the integration process function C 293 accesses both the matching constraint items related to these target objects and the data content, and designates/refers to them from the viewpoint of cooperation. Furthermore, to efficiently ensure security, a system integration process matching constraint item 294 is set as the attribute item for the integration process service item (cooperative role) 295, and the execution results by the role functions of the respective service items of persons concerned A and B are collected in the integration process function C 293 as a content needed for the setting by a communications function.

Figure 43:
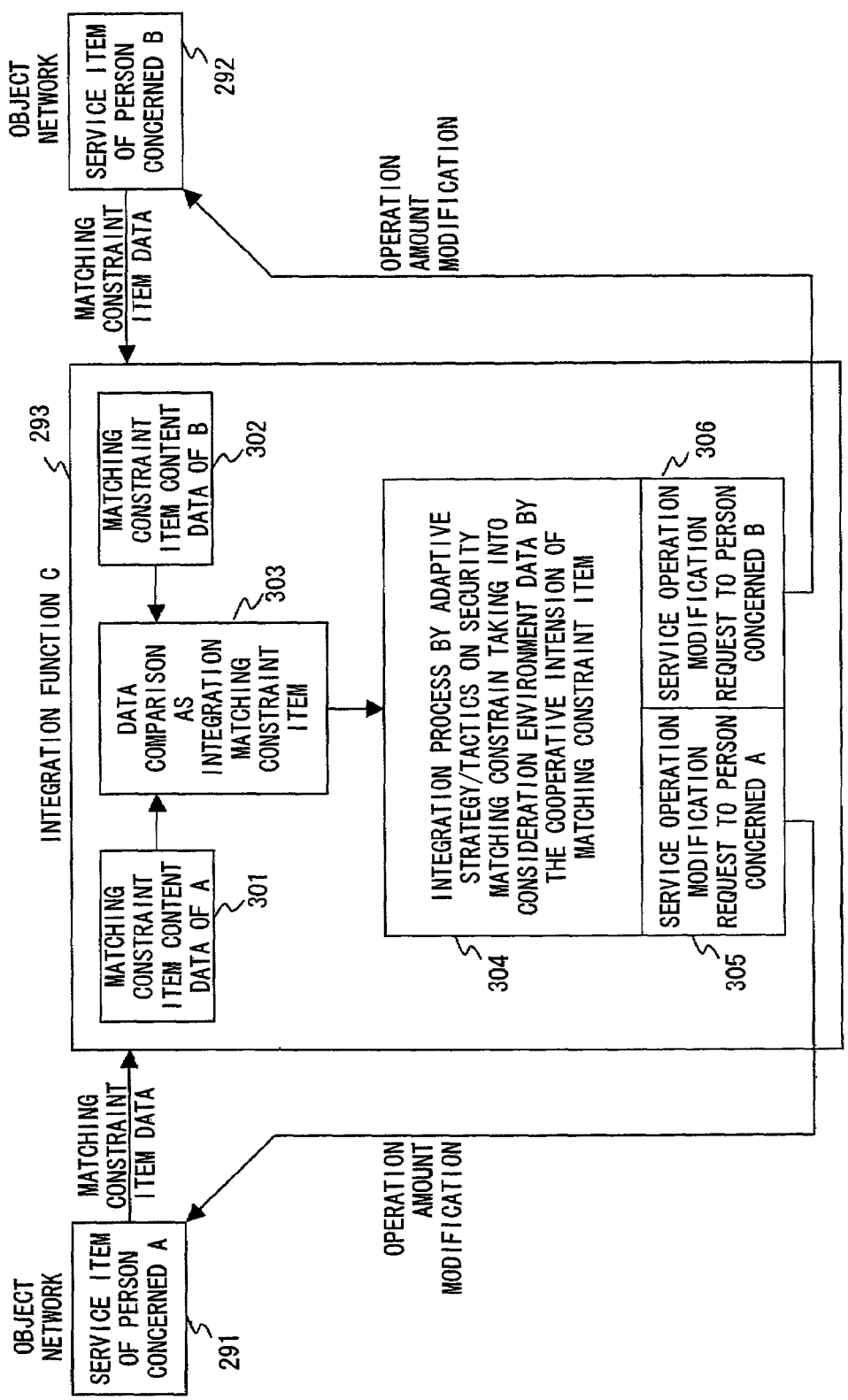
FIG. 43 shows the detailed process of the integration process function.

FIG. 43 shows a detailed process by the integration process function shown in FIG. 42. In FIG. 43, if matching constraint item data are forwarded to the integration process function C 293 in relation to the process result of the service item from each of persons concerned A and B, data comparison as an integration process matching constraint item 303 is conducted using the respective matching constraint item content data 301 and 302, the difference between the two pieces of content data is extracted, an integration process 304 by adaptive strategy/tactics on security matching constraints taking into consideration environment data by the cooperative intention of matching constraint item is performed, the respective modification requests of service operations to persons concerned A and B, 305 and 306 are obtained by this process and the respective modification of operation amounts are requested to the respective persons concerned A and B.

The cooperative parallel process described above can ensure the security of a service provision process as a team. In other words, although persons concerned A and B cooperate to carry out security measures for a user, the security measures include two measures: security measures for a cooperative parallel process as a service for a user and security measures for a system to cope with a user's illegal action against the security of a cooperative parallel process service function. As described with reference to FIG. 43, each of these two cases can be coped with by issuing the modification request of an operation amount to the persons concerned. For that purpose, in order to sustain an ability to verify the legality of the object networks of persons concerned A and B it is necessary for the integration function process C293 to have an environmental adaptability to the adaptive strategy/tactics.

Next, both a security check on access to a matching constraint item and the function extension of a matching constraint item are described. First, since, as described earlier, a matching constraint item is attached to a template as the attribute item of a noun or verb object, access to a matching constraint item accompanied by the execution process of a client or server is classified into two groups.

The first access accompanies event drive. When a client or another server intentionally requests an execution process, the system judges whether the intentional request is legal. Whether the description of intentional request matches the system is a condition for this check. If the description matches the system, the intentional request is allowed to access the system by a gate operation. The validity of the description can be judged by whether the description conforms to a specific format, whether a password is correct, whether the description is suitable for a cryptogram, or the like.

The second access accompanies data drive. This data drive is performed as a data request to request a cell content required by an object template when the process is performed and the system performs the drive for a client. The system judges whether a data value provided by the client meets the matching constraint of a feature model as the attribute of an object, and judges whether the flow should proceed to a subsequent step as described with reference to FIG. 27. If the flow proceeds to a subsequent step, the system waits for a subsequent event drive operation.

Both the modification of the described content and functional extension of a matching constraint item are further described. Such described content and functional extension occur in the following cases.

In the first case, the system configuration is optimized to accomplish the cooperative intention of a plurality of persons concerned. In this case, in order to accomplish the cooperative intention, as shown in FIGS. 29 through 31, the cooperative operation is facilitated by the execution support of the related operation of each object network in the role function of each person concerned by a supporting role function corresponding to the described content of a matching constraint item, the validity study and the time-phase control and the like. If it is a parallel process for adapting a cooperative operation to the change of an environment and the like, the process by the integration process function as shown in FIG. 42 is performed.

In the second case, a plurality of persons concerned have conflicting intention against each other. In this case, sometimes a maliciously or mischievously intended process between a client and the system gives a bad social influence. The case where a plurality of persons concerned have conflicting intention against each other also includes the case where a person concerned and the system have a conflicting relationship. Specifically, by also regarding the system as a person concerned, the relationship can be uniformly regarded as the relationship between object networks corresponding to persons concerned described with reference to FIGS. 29 through 31.

Figure 44:
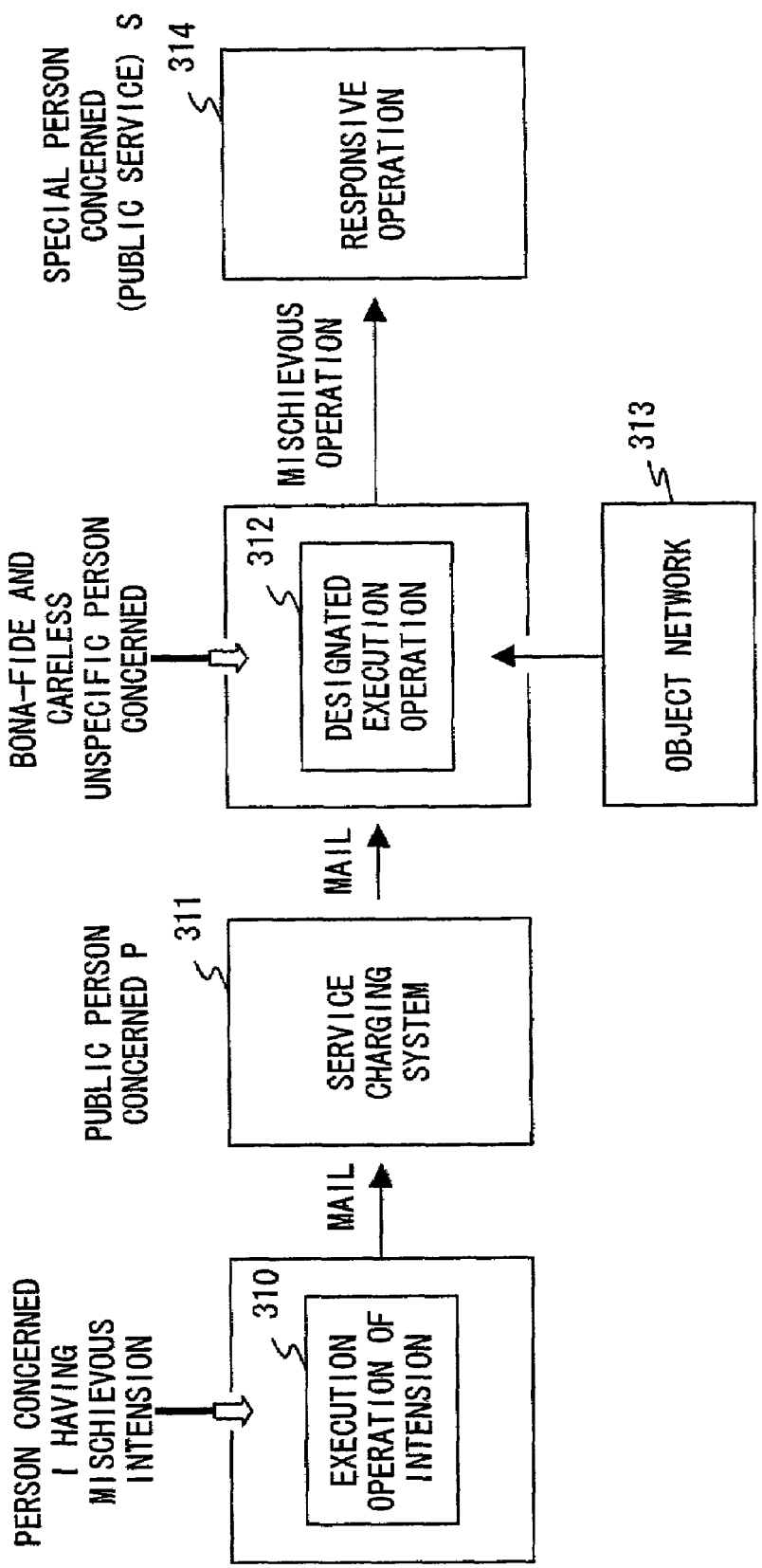
FIG. 44 shows how to prevent the mischief of a malicious person from being made for a service system.

Furthermore, in a recent case where a phenomenon with conflicting relationship is caused against a specific person concerned that constitutes an environment, if e-mail is issued and a person concerned that receives the mail performs a specific operation, a malicious behavior is conducted against a specific subsequent person concerned. FIG. 44 shows such a case.

In FIG. 44, if a person concerned I with mischievous intention issues mail to the service charging system 311 of a public person concerned P as the intention accomplishing operation 310, the service charging system 311 transfers the mail to an unspecific bona-fide and careless person concerned without any process since the service charging system has a public characteristic. Since this unspecific person concerned performs the designated provision operation 312 using an object network 313, a mischievous operation is instructed for a specific person concerned, for example, a person concerned performing a public service S and a corresponding operation 314 is performed. For example, as a result, there will be virus infection.

To cope with such mischief, the system cannot request the unspecific bona-fide and careless person concerned to fully cooperate. If the specific person concerned S provides a public service, it is also difficult to stop the service by judging whether the service is mischief since the public service in charge has universality.

The service charging system 311 of the public person concerned provides a public service, and as a rule, is requested to provide a service with universality. However, since the system 311 receives mail for performing a malicious implementation operation under the cover of public interest in the first place, the system 311 must detect such mail using the matching constraint item of the execution process function of an object network of the system.

Therefore, the validity of a matching constraint item for, for example, a pair of a specific word and a specific operation in mail that is the cause of a conflicting action must be checked as described with reference to FIG. 32, a new check role function must be activated by a data drive operation, as required and the check operation must also be further advanced by stages based on the execution result of the function.

For the specific word and operation, for example, a phrase "I love you" and an operation to "dial a number "110"", respectively, are used. In this case, in response to the mail data of "I love you", a software module for dialing a number "110" is operated.

The third case of the function extension of a matching constraint item is a malicious conflicting operation between the system and a social environment. Such an operation includes the case where a specific object is reproduced by the system or the case where the software module of an object in the system is reproduced. Such reproduction is a kind of wiretap operation. To prevent such an operation, access to a matching constraint item must be carefully checked, the validity of a matching constraint on the feature model of an object must be carefully checked and the subsequent execution processes must be prohibited if such a wiretap operation is detected. Simultaneously, the history of the past intentional requests of the person concerned must be tracked and the use of the system by the person concerned must be prohibited. The analysis of such a history will be used as the countermeasure of the system in the future as an extension function for optimization.

If an object generated by the system flows out of the system to the society and there is the possibility of doing damage to the third party bona-fide person concerned, the persons concerned of the system must have a function to check the validity of the object, that is, a check function. A person concerned having a judging ability or a check system performs such a function. For such an example, there is a check by electronic waterwork.

Although in electronic waterwork, a waterwork pattern is reproduced in the pre-determined position of basic patterns, that is, original patterns, printing is conducted based on the relationship between the attribute values, such as the reciprocal location relation, density, color and the like as the attributes of those patterns. Such a relationship between the attribute values must be stipulated in the system as a matching constraint item between patterns, and both a supporting function to embed patterns so as to meet such a matching constraint and a check function to check the validity of, for example, a pattern brought in from outside the system, that is, a sample pattern must be effectively exercised.

Figure 45:
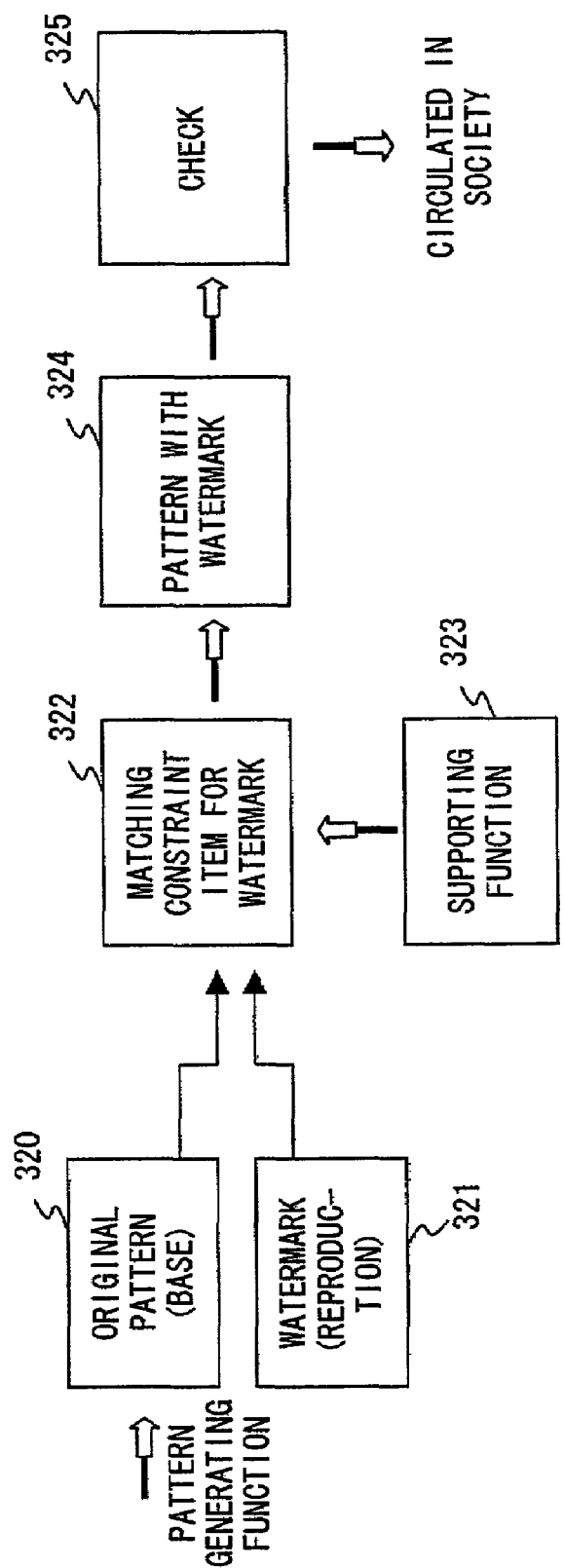
FIG. 45 shows an electronic waterwork embedding process.

FIG. 45 shows the electronic waterwork embedding process. If in FIG. 45, a pattern generation process is activated, a pattern with waterwork 324 is generated using both an original pattern 320 as a base and a reproduction waterwork pattern 321 based on a waterwork matching constraint item 322 and is checked (325) while being supported by a supporting function 323 and is circulated in the society.

Figure 46:
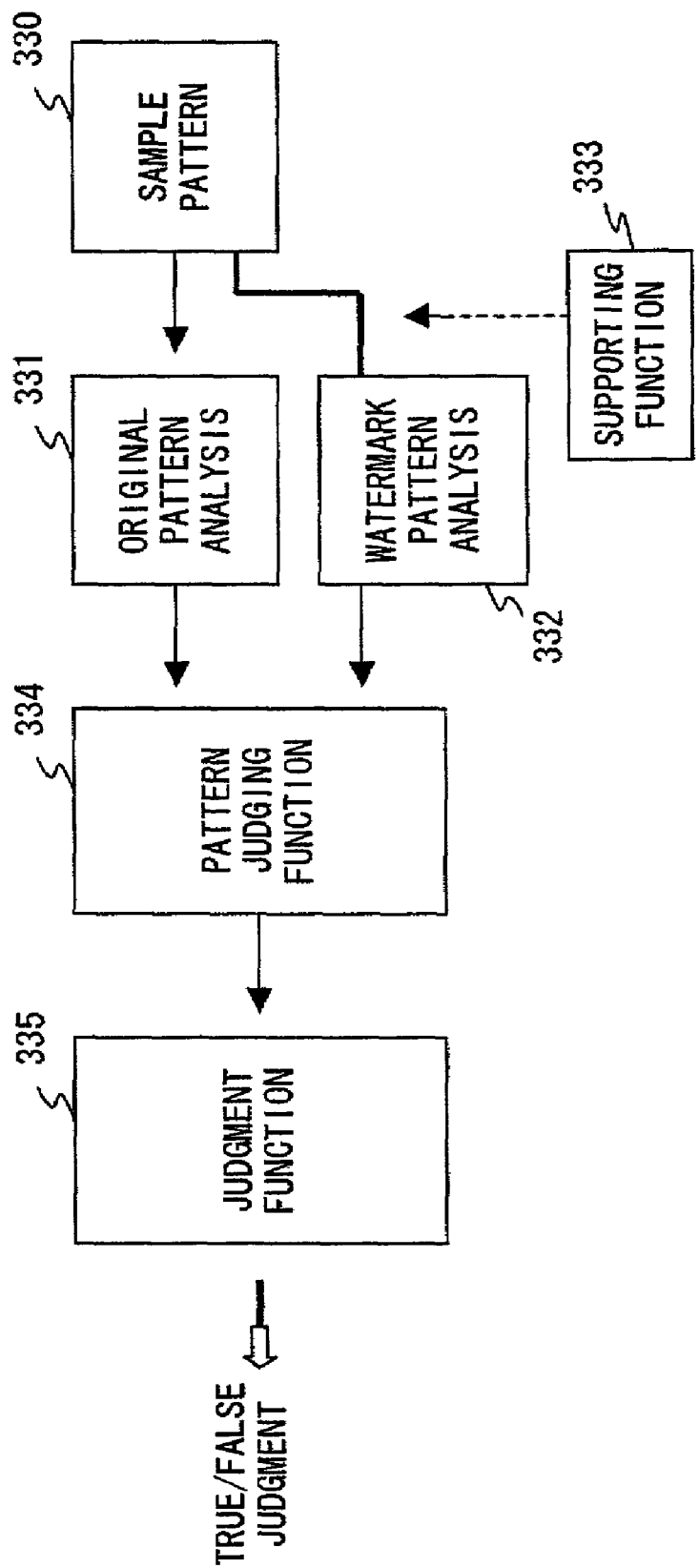
FIG. 46 shows a sample-pattern identification process.

FIG. 46 shows the check process of a sample pattern. In FIG. 46, both the original pattern analysis 331 and waterwork pattern analysis 332 of a sample pattern 330 are made. For example, the waterwork pattern analysis 332 is supported by a supporting function 333. Then, whether the sample pattern is true/false is judged by both a pattern check function 334 and a check function 335.

In such a waterwork embedding and check, both the waterwork supporting function and waterwork check function must win the technology war with a person concerned that generates a false pattern. In that sense, a conflicting relationship occurs between the system and a false pattern generating person, and both the supporting function and check function as a relationship technology with the surrounding environment must be always improved, that is, the effort to optimize the relationship must be always continued.

Although the preferred embodiments of the security method of the present invention has been described so far, a security system to ensure security will become the indispensable infra-structure technology of a basic social system in a service business in the future. The system will be improved by incorporating an idea based on a new technology into the system in the wisdom war between persons concerned and will be the drive force of the system improvement. A person concerned will be developed from the relationship between individuals to groups and eventually nations. The degree of the effective adaptation of the security system technology to the reality will determines the future technology development and become an important factor to contribute the entire society.

As described in detail, according to the present invention, in a system comprising an object network and a common platform that provides services intentionally requested by a client, judging the matching constraints attached to the template of an object can ensure the security of the system.

There is no need to provide a security system for ensuring security in addition to the service provision system. Security can be ensured without using another object in order to ensure security. The present invention greatly contributes to the security insurance as an infrastructure technology in a service business.

What is claimed is:

1. A service provision system comprising a common platform as an interface function with a client and an object network for communicating through the platform and providing a service intentionally requested by the client, said object network further comprising:
    a hierarchical structure, comprising:
        a data model in which an attribute structure of the object network is determined as a template;
        an object model that is positioned higher in rank than the data model and has a matching constraint on security;
        a role model that is positioned higher in rank than the object model and expresses a content of a process to be performed in an environment as an aggregate of a plurality of object models;

a process model that is positioned highest in rank and defines a dynamic process to be cooperatively performed by a plurality of role models as one process; and a security matching constraint check unit ensuring security of a system by checking a security constraint attached to the template, wherein said object model further comprises, a format model which expresses patterns of both a noun object and a verb object as objects in formats, a feature model, which expresses a feature of an object, based on an attribute value of the object and to which a constraint is attached based on an environment, an object network model with a graphic structure having a name of the noun object and a name of the verb object as a node and a branch, respectively, and a cell in which the security matching constraint for indicating a relationship in a system between the format model and feature model in a template corresponding to the format and feature models is described, wherein said security matching constraint check unit ensures a security of a system by checking the matching constraint described in the cell.

2. The service provision system according to claim 1, wherein the security matching constraint check unit checks access to a system that does not provide sufficient data to authenticate intension of an appropriate execution process.

3. The service provision system according to claim 1, wherein the communications of a system is implemented by a communications role function corresponding to the role model, and said security matching constraint check unit further comprises gate means for checking attribute structure data of the communications medium with a security constraint in a role model corresponding to the communications role function.

4. The service provision system according to claim 1, wherein when a service intentionally requested by the client is provided, said security matching constraint check unit checks an access right to a system of a person concerned related to the intention.

5. The service provision system according to claim 1, further comprising sentence structure analyzing means for improving visibility for a client by analyzing a sentence structure of the object and displaying a sentence structure obtained by the analysis on said common platform in order to sustain a security of a system.

6. The service provision system according to claim 1, further comprising integration processing means for improving efficiency of an entire process of a system using a security matching constraint attached to the template when a process to be cooperatively performed by the plurality of role models.

7. The service provision system according to claim 1, further comprising conflicting operation modeling means for generating a model against a conflicting operation that has the possibility of executing a malicious service against a client receiving a service from the service provision system as a result, wherein said conflicting operation modeling means is based on said security matching constraint, and said security matching constraint check unit checks the conflicting operation using the model.

8. The service provision system according to claim 7, wherein said conflicting operation-modeling means describes the matching constraint based on a relationship between a specific word and a specific operation.

9. The service provision system for executing a service using a watermark pattern according to claim 1, wherein said matching constraint check unit judges a target pattern using a matching constraint, wherein the matching constraint includes location information of a watermark pattern embedded in an original pattern and a reproduction watermark pattern.

10. The service provision system according to claim 1, which restricts communications services, conducts event drive as communications intention of an operating person concerned, authenticates a communications system, confirms occurrence of a communication event based on a security matching constraint, requests a service as communications business, if data are matched, authenticates a communications attribute structure and confirms the service request based on a security matching constraint of a communications content structure, and requests the communications service when data of a communications operation are matched.

11. The service provision system according to claim 10, which issues a data non-matching message if data are not matched when the data are checked based on both the occurrence of a communications event and the security constraint, and issues a data non-matching message if data are not matched when the data are checked based on the security matching constraint of a communications content structure.

12. An object network system, comprising:

a hierarchical structure, comprising:

a data model in which an attribute structure of the object network is set as a template;

an object model that is positioned higher in rank than the data model and has a unit setting a security matching constraint in each object; and a unit checking the security matching constraint; wherein the object model further comprises:

a format model which expresses patterns of both a noun object and a verb object as formatted objects, a feature model, which expresses a feature of an object, based on an attribute value of the object and to which a constraint is attached based on an environment, an object network model with a graphic structure having a name of the noun object and a name of the verb object as a node and a branch, respectively, and a cell in which the security matching constraint having a means for indicating a relationship in a system between the format model and feature model in a template corresponding to the format and feature models is described, wherein said security matching constraint check means for ensuring security of a system by checking the matching constraint described in the cell.

13. A service provision system comprising a common platform as an interface function with a client and an object network for communicating through the platform and providing a service intentionally requested by the client, said object network further comprising:

a hierarchical structure, comprising:

a data model in which an attribute structure of the object network is determined as a template;

an object model that is positioned higher in rank than the data model and has a matching constraint on security;

a role model that is positioned higher in rank than the object model and expresses a content of a process to be performed in an environment as an aggregate of a plurality of object models;

a process model that is positioned highest in rank and defines a dynamic process to be cooperatively performed by a plurality of role models as one process; and a security matching constraint check means for ensuring security of a system by checking a security constraint attached to the template, wherein said object model further comprises, a format model which expresses patterns of both a noun object and a verb object as objects in formats, a feature model, which expresses a feature of an object, based on an attribute value of the object and to which a constraint is attached based on an environment, an object network model with a graphic structure having a name of the noun object and a name of the verb object as a node and a branch, respectively, and a cell in which the security matching constraint having a means for indicating a relationship in a system between the format model and feature model in a template corresponding to the format and feature models is described, wherein said security matching constraint check means for ensuring security of a system by checking the matching constraint described in the cell.

14. An object network system, comprising:

a hierarchical structure, comprising:

a data model in which an attribute structure of the object network is set as a template;

an object model that is positioned higher in rank than the data model and has means for setting a security matching constraint in each object; and means for checking the security matching constraint; wherein the object model further comprises:

a format model which expresses patterns of both a noun object and a verb object as formatted objects, a feature model, which expresses a feature of an object, based on an attribute value of the object and to which a constraint is attached based on an environment, an object network model with a graphic structure having a name of the noun object and a name of the verb object as a node and a branch, respectively, and a cell in which the security matching constraint having a means for indicating a relationship in a system between the format model and feature model in a template corresponding to the format and feature models is described, wherein said means for setting the security matching constraint for ensuring security of a system by checking the matching constraint described in the cell.

* * * * *